United States Patent
Krasner et al.

(10) Patent No.: US 9,291,712 B2
(45) Date of Patent: *Mar. 22, 2016

(54) CELL ORGANIZATION AND TRANSMISSION SCHEMES IN A WIDE AREA POSITIONING SYSTEM (WAPS)

(75) Inventors: Norman Krasner, Sunnyvale, CA (US); Arun Raghupathy, Sunnyvale, CA (US)

(73) Assignee: NextNav, LLC, Sunnyvale, CA (US)

( * ) Notice: Subject to any disclaimer, the term of this patent is extended or adjusted under 35 U.S.C. 154(b) by 873 days.

This patent is subject to a terminal disclaimer.

(21) Appl. No.: 13/565,732

(22) Filed: Aug. 2, 2012

(65) Prior Publication Data

US 2013/0063307 A1    Mar. 14, 2013

Related U.S. Application Data

(63) Continuation-in-part of application No. 13/535,626, filed on Jun. 28, 2012, and a continuation-in-part of application No. 13/412,487, filed on Mar. 5, 2012, now Pat. No. 8,629,803, which is a continuation of (Continued)

(51) Int. Cl.
*G01S 5/04* (2006.01)
*G01S 19/11* (2010.01)
(Continued)

(52) U.S. Cl.
CPC ............. *G01S 19/11* (2013.01); *G01S 19/05* (2013.01); *G01S 19/07* (2013.01); *G01S 19/45* (2013.01); *G01S 19/48* (2013.01)

(58) Field of Classification Search
CPC .............. G01S 1/24; G01S 1/08; G01S 5/04; G01S 19/07; G01S 19/45; G01S 19/19
USPC .................................................. 342/387, 386
See application file for complete search history.

(56) References Cited

U.S. PATENT DOCUMENTS

| 5,327,144 A | 7/1994 | Stilp |
| 5,406,091 A | 4/1995 | Burba |

(Continued)

FOREIGN PATENT DOCUMENTS

| CN | 1140942 A | 1/1997 |
| CN | 1942008 A | 4/2007 |

(Continued)

OTHER PUBLICATIONS

B.W. Parkinson, J.J. Spilker: "The Global Positioning System: Theory and Applications, vol. 1", Jan. 1, 1996, American Institute of Aeronautics and Astronautics, Cambridge Massachusetts, XP002686935, pp. 121-133, the whole document.

(Continued)

*Primary Examiner* — Harry Liu

(57) ABSTRACT

A position location system comprises transmitters that broadcast positioning signals. Each broadcasted positioning signal comprises a pseudorandom ranging signal. The position location system includes a remote receiver that acquires and measures the time of arrival of the positioning signals received at the remote receiver. During an interval of time, at least two positioning signals are transmitted concurrently by the transmitters and received concurrently at the remote receiver. The two positioning signals have carrier frequencies offset from one another by an offset that is less than approximately twenty-five percent of the bandwidth of each positioning signal of the two positioning signals. Cross-interference between the positioning signals is reduced by tuning the remote receiver to a frequency of a selected signal of the two positioning signals and correlating the selected signal with a reference pseudorandom ranging signal matched to a transmitted pseudorandom ranging signal of the selected signal.

45 Claims, 49 Drawing Sheets

Related U.S. Application Data application No. 12/557,479, filed on Sep. 10, 2009, now Pat. No. 8,130,141, application No. 13/565,732, which is a continuation-in-part of application No. 13/296,067, filed on Nov. 14, 2011, now Pat. No. 9,057,606, which is a continuation-in-part of application No. 12/557,479.

(60) Provisional application No. 61/514,369, filed on Aug. 2, 2011.

(51) Int. Cl.
  *G01S 19/05* (2010.01)
  *G01S 19/07* (2010.01)
  *G01S 19/45* (2010.01)
  *G01S 19/48* (2010.01)

(56) References Cited

U.S. PATENT DOCUMENTS

| | | |
|---|---|---|
| 5,416,800 A | 5/1995 | Frank |
| 5,600,706 A | 2/1997 | Dunn |
| 5,604,765 A | 2/1997 | Bruno |
| 5,652,592 A | 7/1997 | Sanderford et al. |
| 5,754,657 A | 5/1998 | Schipper |
| 5,758,288 A | 5/1998 | Atherly |
| 5,822,363 A | 10/1998 | Leroy |
| 5,912,644 A | 6/1999 | Want |
| 5,924,037 A | 7/1999 | Mao |
| 5,959,580 A | 9/1999 | Maloney |
| 5,999,124 A | 12/1999 | Sheynblat |
| 6,094,168 A | 7/2000 | Duffett-Smith |
| 6,097,336 A | 8/2000 | Stilp |
| 6,101,178 A | 8/2000 | Beal |
| 6,127,975 A | 10/2000 | Maloney |
| 6,160,837 A | 12/2000 | Bruno |
| 6,172,644 B1 | 1/2001 | Stilp |
| 6,184,829 B1 | 2/2001 | Stilp |
| 6,201,803 B1 | 3/2001 | Munday |
| 6,266,013 B1 | 7/2001 | Stilp |
| 6,275,705 B1 | 8/2001 | Drane |
| 6,285,321 B1 | 9/2001 | Stilp |
| 6,288,675 B1 | 9/2001 | Maloney |
| 6,288,676 B1 | 9/2001 | Maloney |
| 6,317,081 B1 | 11/2001 | Stilp |
| 6,342,854 B1 | 1/2002 | Duffett-Smith |
| 6,353,390 B1 | 3/2002 | Beri |
| 6,366,241 B2 | 4/2002 | Pack |
| 6,400,320 B1 | 6/2002 | Stilp |
| 6,433,739 B1 | 8/2002 | Soliman |
| 6,483,460 B2 | 11/2002 | Stilp |
| 6,518,918 B1 | 2/2003 | Vannucci et al. |
| 6,522,890 B2 | 2/2003 | Drane |
| 6,525,688 B2 | 2/2003 | Chou |
| 6,529,165 B1 | 3/2003 | Duffett-Smith |
| 6,559,800 B2 | 5/2003 | Rabinowitz |
| 6,564,064 B1 | 5/2003 | Ciganer et al. |
| 6,603,428 B2 | 8/2003 | Stilp |
| 6,661,379 B2 | 12/2003 | Stilp |
| 6,665,541 B1 | 12/2003 | Krasner |
| 6,735,542 B1 | 5/2004 | Burgett et al. |
| 6,741,578 B1 | 5/2004 | Moon |
| 6,771,625 B1 | 8/2004 | Beal |
| 6,782,264 B2 | 8/2004 | Anderson |
| 6,831,943 B1 | 12/2004 | Dabak |
| 6,865,394 B2 | 3/2005 | Ogino |
| 6,873,290 B2 | 3/2005 | Anderson |
| 6,876,859 B2 | 4/2005 | Anderson |
| 6,894,644 B2 | 5/2005 | Duffett-Smith |
| 6,900,758 B1 | 5/2005 | Mann |
| 6,937,866 B2 | 8/2005 | Duffett-Smith |
| 6,959,032 B1 | 10/2005 | Richards |
| 6,996,392 B2 | 2/2006 | Anderson |
| 6,999,780 B1 | 2/2006 | Zhao |
| 7,006,834 B2 | 2/2006 | Gaal |
| 7,023,383 B2 | 4/2006 | Stilp |
| 7,031,722 B2 | 4/2006 | Naghian |
| 7,126,527 B1 | 10/2006 | Bajikar |
| 7,126,536 B2 | 10/2006 | Rabinowitz et al. |
| 7,167,713 B2 | 1/2007 | Anderson |
| 7,203,499 B2 | 4/2007 | Wigren |
| 7,251,562 B1 | 7/2007 | Brodie |
| 7,260,407 B2 | 8/2007 | Duffett-Smith |
| 7,271,765 B2 | 9/2007 | Stilp |
| 7,315,745 B2 | 1/2008 | Duffett-Smith |
| 7,327,310 B2 | 2/2008 | Abraham |
| 7,340,259 B2 | 3/2008 | Maloney |
| 7,359,719 B1 | 4/2008 | Duffett-Smith |
| 7,423,580 B2 | 9/2008 | Markhovsky |
| 7,433,321 B2 | 10/2008 | Grilli |
| 7,508,883 B2 | 3/2009 | Duffett-Smith |
| 7,561,048 B2 | 7/2009 | Yushkov |
| 7,593,736 B1 | 9/2009 | Duffett-Smith |
| 7,616,155 B2 | 11/2009 | Bull |
| 7,636,061 B1 | 12/2009 | Thomas |
| 7,639,179 B2 | 12/2009 | Hansen |
| 7,652,622 B2 | 1/2010 | Hansen |
| 7,706,328 B2 | 4/2010 | Mukkavilli |
| 7,706,754 B2 | 4/2010 | Krasner |
| 7,751,949 B2 | 7/2010 | Alanen et al. |
| 7,760,132 B1 | 7/2010 | Markhovsky |
| 7,783,299 B2 | 8/2010 | Anderson |
| 7,787,886 B2 | 8/2010 | Markhovsky |
| 7,796,549 B2 | 9/2010 | Grilli |
| 7,797,000 B2 | 9/2010 | Anderson |
| 7,804,448 B2 | 9/2010 | Bull |
| 7,822,424 B2 | 10/2010 | Markhovsky |
| 7,826,343 B2 | 11/2010 | Krasner |
| 7,852,267 B2 | 12/2010 | Duffett-Smith |
| 7,872,583 B1 | 1/2011 | Yushkov |
| 7,876,265 B2 | 1/2011 | Black |
| 7,893,873 B2 | 2/2011 | Black |
| 7,903,633 B2 | 3/2011 | Grilli et al. |
| 7,911,988 B2 | 3/2011 | Riley et al. |
| 7,912,057 B2 | 3/2011 | Petry |
| 7,956,804 B2 | 6/2011 | Jin |
| 7,961,717 B2 | 6/2011 | Lee et al. |
| 7,962,162 B2 | 6/2011 | McNair |
| 7,969,311 B2 | 6/2011 | Markhovsky |
| 7,978,136 B2 | 7/2011 | Duffett-Smith et al. |
| 8,013,788 B2 | 9/2011 | Duffett-Smith et al. |
| 8,041,505 B2 | 10/2011 | Pierce et al. |
| 8,050,687 B2 | 11/2011 | Duffett-Smith et al. |
| 8,059,028 B2 | 11/2011 | Boyer et al. |
| 8,102,317 B2 | 1/2012 | Lee et al. |
| 8,103,294 B2 | 1/2012 | Duffett-Smith |
| 8,106,828 B1 | 1/2012 | Do |
| 8,109,168 B2 | 2/2012 | Wurm |
| 8,130,141 B2 | 3/2012 | Pattabiraman |
| 8,150,415 B2 | 4/2012 | Kim et al. |
| 8,154,442 B2 | 4/2012 | Alanen et al. |
| 8,160,610 B2 | 4/2012 | Harper et al. |
| 8,165,064 B2 | 4/2012 | Mukkavilli |
| 8,233,091 B1 | 7/2012 | Rabinowitz |
| 8,233,911 B2 | 7/2012 | Charbit et al. |
| 8,242,959 B2 | 8/2012 | Mia et al. |
| 8,243,712 B2 | 8/2012 | Krasner |
| 8,244,275 B2 | 8/2012 | Islam |
| 8,249,619 B2 | 8/2012 | Kong |
| 8,253,628 B2 | 8/2012 | Duffett-Smith |
| 8,255,160 B2 | 8/2012 | Duffett-Smith |
| 8,279,116 B2 | 10/2012 | Duffett-Smith |
| 8,295,853 B2 | 10/2012 | Heikkila |
| 8,305,215 B2 | 11/2012 | Markhovsky |
| 8,306,523 B2 | 11/2012 | Fischer |
| 8,306,676 B1 | 11/2012 | Ingvalson et al. |
| 8,325,661 B2 | 12/2012 | Montojo |
| 8,335,522 B2 | 12/2012 | Mate et al. |
| 8,390,512 B2 | 3/2013 | Ische |
| 8,401,033 B2 | 3/2013 | Palanki |
| 8,401,111 B2 | 3/2013 | Sampath |
| 8,401,570 B2 | 3/2013 | Wigren et al. |
| 8,412,227 B2 | 4/2013 | Edge |
| 8,412,239 B1 | 4/2013 | Palanki |

(56) References Cited

U.S. PATENT DOCUMENTS

| | | |
|---|---|---|
| 8,472,971 B2 | 6/2013 | Rowe |
| 8,489,124 B2 | 7/2013 | Mukkavilli |
| 2002/0087628 A1 | 7/2002 | Rouse |
| 2002/0181565 A1 | 12/2002 | Boyd |
| 2003/0174090 A1 | 9/2003 | Spilker |
| 2004/0180669 A1 | 9/2004 | Kall |
| 2004/0242205 A1 | 12/2004 | Yamane |
| 2005/0052318 A1 | 3/2005 | Jendbro |
| 2005/0078032 A1 | 4/2005 | Gilkes |
| 2005/0176441 A1 | 8/2005 | Jurecka |
| 2005/0228613 A1 | 10/2005 | Fullerton |
| 2005/0254558 A1 | 11/2005 | Dutka |
| 2005/0278120 A1 | 12/2005 | Manfred |
| 2005/0285790 A1 | 12/2005 | Gagnon |
| 2006/0050625 A1* | 3/2006 | Krasner ........................ 370/208 |
| 2006/0111840 A1 | 5/2006 | Van Diggelen |
| 2007/0013584 A1 | 1/2007 | Camp |
| 2007/0016346 A1 | 1/2007 | Alanen |
| 2007/0030841 A1 | 2/2007 | Lee |
| 2007/0063896 A1 | 3/2007 | Alban |
| 2007/0110003 A1* | 5/2007 | Tujkovic et al. .............. 370/335 |
| 2007/0133391 A1 | 6/2007 | Roh |
| 2007/0142013 A1 | 6/2007 | Bucknor |
| 2007/0157283 A1 | 7/2007 | Setlur |
| 2007/0168124 A1 | 7/2007 | Dossas |
| 2007/0218823 A1 | 9/2007 | Wolf |
| 2008/0022352 A1 | 1/2008 | Seo |
| 2008/0032706 A1 | 2/2008 | Sheynblat |
| 2008/0166974 A1 | 7/2008 | Teo |
| 2008/0304520 A1 | 12/2008 | Hannuksela |
| 2008/0309557 A1 | 12/2008 | Mailaender |
| 2009/0121927 A1 | 5/2009 | Moshfeghi |
| 2009/0146871 A1 | 6/2009 | Abraham |
| 2009/0196177 A1 | 8/2009 | Teyeb |
| 2009/0225816 A1 | 9/2009 | Cheng |
| 2009/0256750 A1 | 10/2009 | Mathews |
| 2009/0286556 A1 | 11/2009 | Yumoto |
| 2010/0039316 A1 | 2/2010 | Gronemeyer |
| 2010/0049469 A1 | 2/2010 | Wirola et al. |
| 2010/0073229 A1 | 3/2010 | Pattabiraman |
| 2010/0130229 A1 | 5/2010 | Sridhara et al. |
| 2010/0204916 A1 | 8/2010 | Garin |
| 2010/0250134 A1 | 9/2010 | Bornstein et al. |
| 2010/0260154 A1 | 10/2010 | Frank et al. |
| 2010/0309057 A1 | 12/2010 | Edge et al. |
| 2011/0057836 A1 | 3/2011 | Ische et al. |
| 2011/0227790 A1 | 9/2011 | Li |
| 2011/0235684 A1* | 9/2011 | Dahlman et al. .............. 375/135 |
| 2011/0317613 A1 | 12/2011 | Gerstenberger |
| 2012/0013475 A1 | 1/2012 | Farley et al. |
| 2012/0027110 A1 | 2/2012 | Han et al. |
| 2012/0072110 A1 | 3/2012 | Venkatraman |
| 2012/0122478 A1 | 5/2012 | Siomina et al. |
| 2012/0182180 A1 | 7/2012 | Wolf |
| 2012/0290253 A1 | 11/2012 | Barrett et al. |
| 2012/0316831 A1 | 12/2012 | Klinghult |
| 2013/0023285 A1 | 1/2013 | Markhovsky et al. |
| 2013/0033999 A1 | 2/2013 | Siomina et al. |
| 2013/0045759 A1 | 2/2013 | Smith |
| 2013/0057434 A1 | 3/2013 | Krasner |
| 2013/0057436 A1 | 3/2013 | Krasner |
| 2013/0063302 A1 | 3/2013 | Krasner |
| 2013/0063307 A1 | 3/2013 | Krasner |
| 2013/0063308 A1 | 3/2013 | Krasner |
| 2013/0122930 A1 | 5/2013 | Woo et al. |
| 2013/0169484 A1 | 7/2013 | Raghupathy |
| 2013/0252629 A1 | 9/2013 | Wigren et al. |
| 2013/0271324 A1 | 10/2013 | Sendonaris et al. |

FOREIGN PATENT DOCUMENTS

| | | |
|---|---|---|
| DE | 10107133 A1 | 8/2002 |
| JP | 2008-51808 A | 3/2008 |
| WO | WO2006029276 A1 | 3/2006 |
| WO | WO 2007011334 A1 | 1/2007 |
| WO | WO 2007096683 A1 | 8/2007 |
| WO | WO 2008069712 A1 | 6/2008 |
| WO | WO 2010030825 A1 | 3/2010 |
| WO | WO2011019357 A1 | 2/2011 |
| WO | WO 2011020083 A1 | 2/2011 |
| WO | WO 2012065184 A2 | 5/2012 |
| WO | WO 2013003492 A1 | 1/2013 |
| WO | WO 2013003636 A2 | 1/2013 |
| WO | WO 2013019986 A1 | 2/2013 |

OTHER PUBLICATIONS

Form PCT/ISA/220, PCT/US2009/056572, "Notification of Transmittal of the International Search Report and the Written Opinion of the International Searching Authority, or the Declaration", 1 pages; Form PCT/ISA/210, PCT/US2009/056572, "International Search Report", 2 pages; Form PCT/ISA/237, PCT/US2009/056572, "Written Opinion of the International Searching Authority", 3 pages.

Form PCT/ISA/220, PCT/US2011/060655, "Notification of Transmittal of the International Search Report and the Written Opinion of the International Searching Authority, or the Declaration", 1 pages; Form PCT/ISA/210, PCT/US2011/060655, "International Search Report", 6 pages; Form PCT/ISA/237, PCT/US2011/060655, "Written Opinion of the International Searching Authority", 22 pages.

Form PCT/ISA/220, PCT/US2012/044452, "Notification of Transmittal of the International Search Report and the Written Opinion of the International Searching Authority, or the Declaration", 1 pages; Form PCT/ISA/210, PCT/US2012/044452, "International Search Report", 5 pages; Form PCT/ISA/237, PCT/US2012/044452, "Written Opinion of the International Searching Authority", 10 pages.

Form PCT/ISA/220, PCT/US2012/049390, "Notification of Transmittal of the International Search Report and the Written Opinion of the International Searching Authority, or the Declaration", 1 pages; Form PCT/ISA/210, PCT/US2012/049390, "International Search Report ", 2 pages; Form PCT/ISA/237, PCT/US2012/049390, "Written Opinion of the International Searching Authority", 15 pages.

"Extended GPS Navigation Bits Message", 3GPP2 Draft; C16-20040112-005 QCOM NAV BIT MSG, $3^{rd}$ Generation Partnership Project 2, 3GPP2, 2500 Wilson Boulevard, Suite 300, Arlington, Virginia 22201, vol. TSGC, Jan. 16, 2004, XP062049825.

"Digital cellular telecommunications system (Phase 2+); Location Services (LCS); Mobile Station (MS)—Serving Mobile Location Center (SMLC) Radio Resource LCS Protocol (RRLP) (3GPP TS 44.031 version 10.0.0 Release 10", Technical Specification, European Telecommunications Standards Institute (ETSI), 650, Route Des Lucioles; F-06921 Sophia-Antipolis; France, vol. 3GPP GERAN 2, No. V 10.0.0, May 1, 2011, XP014066483.

Form PCT/ISA/220, PCT/US2013/044147, "Notification of Transmittal of the International Search Report and the Written Opinion of the International Searching Authority, or the Declaration", 1 page; Form PCT/ISA/210, PCT/US2013/044147, "International Search Report", 4 pages; Form PCT/ISA/237, PCT/ US2013/044147, "Written Opinion of the International Searching Authority", 8 pages.

Japanese Office Action, Dec. 11, 2012. [Rough Translation].

Chinese Office Action, Apr. 15, 2013. [Rough Translation].

Form PCT/ISA/220, PCT/US2013/036634, "Notification of Transmittal of the International Search Report and the Written Opinion of the International Searching Authority, or the Declaration", 1 page; Form PCT/ISA/210, PCT/US2013/036634, "International Search Report", 7 pages; Form PCT/ISA/237, PCT/US2013/036634, "Written Opinion of the International Searching Authority", 11 pages.

Form PCT/ISA/206, PCT/US2013/036634, "Invitation to Pay Additional Fees and, Where Applicable, Protest Fee", 5 pages.

Form PCT/ISA/220, PCT/US2012/044719, "Notification of Transmittal of the International Search Report and the Written Opinion of the International Searching Authority, or the Declaration", 1 page; Form PCT/ISA/210, PCT/US2012/044719, "International Search Report", 2 pages.

European Patent Office, Supplemental European Search Report, European Application No. EP 12819763.9, 9 pages, Mailing Date Jun. 16, 2015.

(56) References Cited

OTHER PUBLICATIONS

Angel, Jose et al., On Generalized Signal Waveforms for Satellite Navigation, Jun. 30, 2008, pp. 1-408, XP055190597, Retrieved from the Internet: URL: http://137.193.32.1/research/docs/phd_Jose_Angel_Avila_Rodriguez.pdf [retrieved on May 20, 2015].

Progri Ilir F et al., Indoor Geolocation Using FCDMA Pseudolites: Signal Structure and Performance Analysis, Navigation, Institute of Navigation, Fairfax, VA, US, vol. 54, No. 3, Dec. 1, 2007, pp. 241-256, XP056004534, ISSN: 0028-1522.

Applicant, Response to Supplemental European Search Report, European Application No. EP 12819763.9, 15 pages, Dated Dec. 22, 2015.

* cited by examiner

| Multiplexing Nomenclature | #PN Codes Per Group (Gold or ML) | #Groups with Different PN Codes | Total # PN Codes | Total # Freqs | # Frames Integrated | Code Rejection (At 0 Doppler) | Multi-Frame Integration Gain (At 0 Doppler) | Worst Case Frame Integration Gain (dB) @ Various Velocities Differential MPH | | |
|---|---|---|---|---|---|---|---|---|---|---|
| | | | | | | | | 6 | 30 | 100 |
| 7G/7G | 7G | 7G | 49 | 1 | Any | 23.9 | 0 | 0 | 0 | 0 |
| 1G/7G | 1G | 7G | 7 | 1 | Any | 23.9 | 0 | 0 | 0 | 0 |
| 7G/7G-7F | 7G | 7G | 49 | 7 | 6 | 19.9- 23.5 | 15.6 | 12.8 | 6 | 0 |
| 7G/7G-7F | 7G | 7G | 49 | 7 | 7 | 19.9- 23.5 | ∞ | 24 | 8.8 | 0 |
| 7G/7G-7F | 7G | 7G | 49 | 7 | 9 | 19.9- 23.5 | 14.0-26.1 | 13.1 | 12.9 | 0 |
| 1G/7G-7F | 1G | 7G | 7 | 7 | 6 | 19.9-23.0 | 15.6 | 12.8 | 6 | 0 |
| 1G/7G-7F | 1G | 7G | 7 | 7 | 7 | 19.9-23.0 | ∞ | 24 | 8.8 | 0 |
| 1G/7G-7F | 1G | 7G | 7 | 7 | 9 | 19.9-23.0 | 14.0-26.1 | 13.1 | 12.9 | 0 |
| 7G/7F | 7G | 1G | 7 | 7 | 6 | 17.9; 19.9-23.0 | 15.6 | 12.8 | 6 | 0 |
| 7G/7F | 7G | 1G | 7 | 7 | 7 | 17.9; 19.9-23.0 | ∞ | 24 | 8.8 | 0 |
| 7G/7F | 7G | 1G | 7 | 7 | 9 | 17.9; 19.9-23.0 | 14.0-26.1 | 13.1 | 12.9 | 0 |
| 1M/7F | 1M | 1M | 1 | 7 | 6 | 17.9;25.6 | 15.6 | 12.8 | 6 | 0 |
| 1M/7F | 1M | 1M | 1 | 7 | 7 | 17.9;25.6 | ∞ | 24 | 8.8 | 0 |
| 1M/7F | 1M | 1M | 1 | 7 | 9 | 17.9;25.6 | 14.0-26.1 | 13.1 | 12.9 | 0 |

Figure 6

| Integer Part of Frequency Offset (Units of Frame Rate) | Bandwidth/ % Increase (kHz) | Worst Cross Correlation at 0 Lag (dB) | Required Extra Bandwidth (kHz) |
|---|---|---|---|
| 2 | 12/ 0.6 | -17.8 | 8 6/7 |
| 3 | 18/0.9 | -20.8 | 18 6/7 |
| 4 | 24/1.2 | -23.0 | 24 6/7 |
| 5 | 30/1.5 | -24.7 | 30 6/7 |
| 6 | 36/1.8 | -26.2 | 36 6/7 |

| Preferential Order | Delay Between Codes | Equivalent Fill | +/-1 Sidelobe Run Length |
|---|---|---|---|
| 1 | 853 | 1000100001 | 25 |
| 2 | 714 | 0011111100 | 23 |
| 3 | 797 | 0011000101 | 22 |
| 4 | 602 | 1110110011 | 21 |
| 5 | 1012 | 0101101001 | 18 |
| 6 | 536 | 0111100110 | 18 |
| 7 | 456 | 1110101011 | 18 |
| 8 | 422 | 0010110011 | 18 |
| 9 | 76 | 0011111110 | 18 |
| 10 | 476 | 1000000011 | 17 |

Figure 10

CELL ORGANIZATION AND TRANSMISSION SCHEMES IN A WIDE AREA POSITIONING SYSTEM (WAPS)

RELATED APPLICATIONS

This application claims the benefit of U.S. Patent Application No. 61/514,369, filed Aug. 2, 2011.

This application is a continuation in part of U.S. patent application Ser. No. 13/535,626, filed Jun. 28, 2012.

This application is a continuation in part of U.S. patent application Ser. No. 13/412,487, filed Mar. 5, 2012, which is a continuation of U.S. patent application Ser. No. 12/557,479, filed Sep. 10, 2009, now U.S. Pat. No. 8,130,141.

This application is a continuation in part of U.S. patent application Ser. No. 13/296,067, filed Nov. 14, 2011, which is a continuation in part of U.S. patent application Ser. No. 12/557,479, filed Sep. 10, 2009, now U.S. Pat. No. 8,130,141.

TECHNICAL FIELD

The disclosure herein relates generally to positioning systems. In particular, this disclosure relates to a wide area positioning system.

BACKGROUND

Positioning systems like Global Positioning System (GPS) have been in use for many years. In poor signal conditions, however, these conventional positioning system can have degraded performance.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 6 shows a table detailing performance comparisons of various cell configurations, under an embodiment.

FIG. 7 shows a table of cross-correlation at 0 lag offset for 7G/7F and 1M/7F configurations, under an embodiment.

FIG. 10 shows a preferential Gold Code list, based upon run length (i.e. how many consecutive phases on either side of the peak have autocorrelation $\frac{1}{1023}$ times the peak), under an embodiment.

FIG. 50 shows a 32-bit shift register implementation derived from two 16-bit shift register primitives with parallel random access read capabilities, under an embodiment.

DETAILED DESCRIPTION

Figure 1:
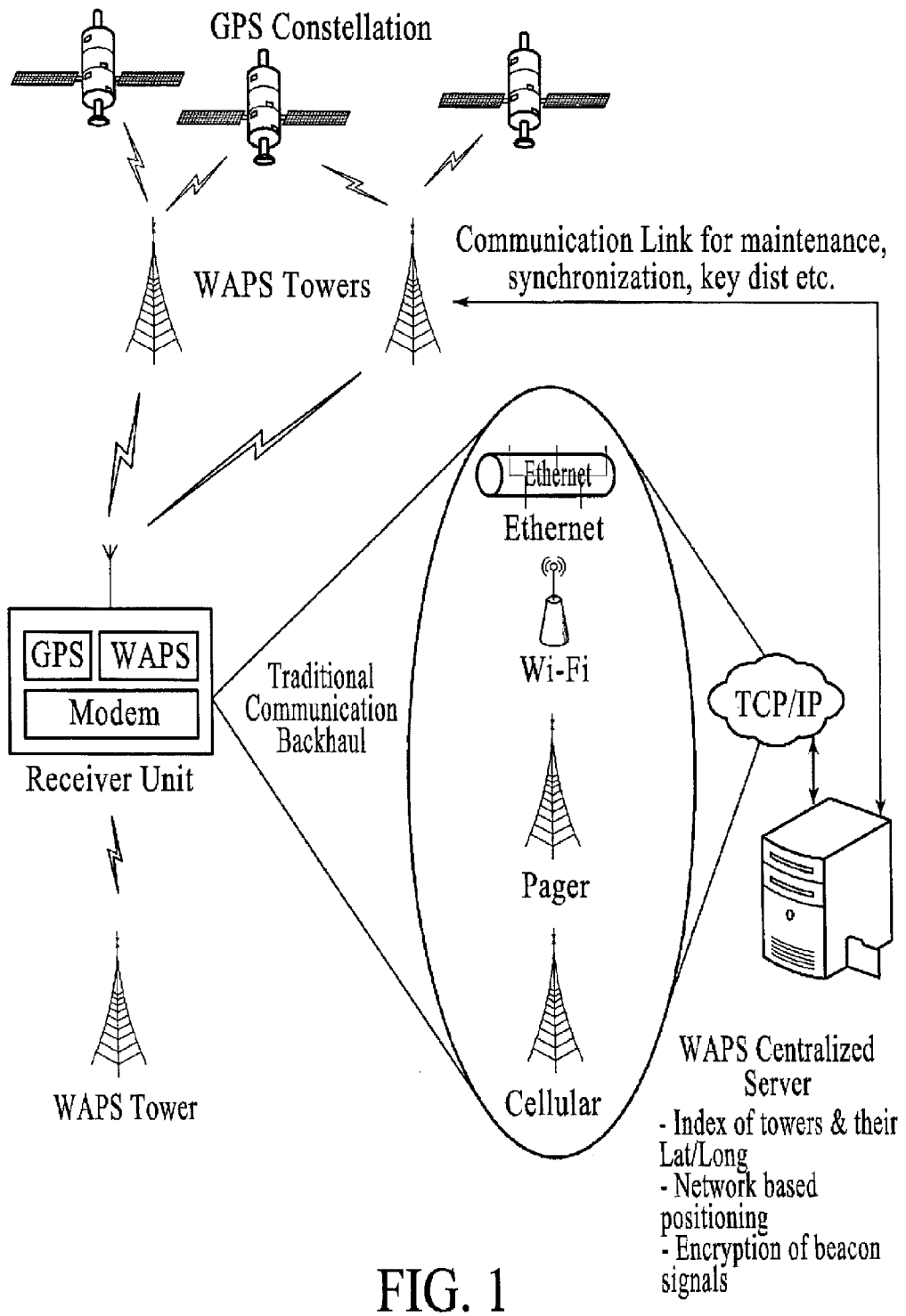
FIG. 1 is a block diagram of a wide area positioning system, under an embodiment.

Systems and methods are described for determining the position of a receiver. The positioning system of an embodiment comprises a transmitter network including transmitters that broadcast positioning signals. The positioning system comprises a remote receiver that acquires and tracks the positioning signals and/or satellite signals. The satellite signals are signals of a satellite-based positioning system. A first mode of the remote receiver uses terminal-based positioning in which the remote receiver computes a position using the positioning signals and/or the satellite signals. The positioning system comprises a server coupled to the remote receiver. A second operating mode of the remote receiver comprises network-based positioning in which the server computes a position of the remote receiver from the positioning signals and/or satellite signals, where the remote receiver receives and transfers to the server the positioning signals and/or satellite signals.

A method of determining position of an embodiment comprises receiving at a remote receiver at least one of positioning signals and satellite signals. The positioning signals are received from a transmitter network comprising a plurality of transmitters. The satellite signals are received from a satellite-based positioning system. The method comprises determining a position of the remote receiver using one of terminal-based positioning and network based positioning. The terminal-based positioning comprises computing a position of the remote receiver at the remote receiver using at least one of the positioning signals and the satellite signals. The network-based positioning comprises computing a position of the remote receiver at a remote server using at least one of the positioning signals and the satellite signals.

A position location system is described that comprises transmitters that broadcast positioning signals. Each broadcasted positioning signal comprises a pseudorandom ranging signal. The position location system includes a remote receiver that acquires and measures the time of arrival of the positioning signals received at the remote receiver. During an interval of time, at least two positioning signals are transmitted concurrently by the transmitters and received concurrently at the remote receiver. The two positioning signals have carrier frequencies offset from one another by an offset that is less than approximately twenty-five percent of the bandwidth of each positioning signal of the two positioning signals. Cross-interference between the positioning signals is reduced by tuning the remote receiver to a frequency of a selected signal of the two positioning signals and correlating the selected signal with a reference pseudorandom ranging signal matched to a transmitted pseudorandom ranging signal of the selected signal.

In the following description, numerous specific details are introduced to provide a thorough understanding of, and enabling description for, the systems and methods described. One skilled in the relevant art, however, will recognize that these embodiments can be practiced without one or more of the specific details, or with other components, systems, etc. In other instances, well known structures or operations are not shown, or are not described in detail, to avoid obscuring aspects of the disclosed embodiments.

FIG. 1 is a block diagram of a positioning system, under an embodiment. The positioning system, also referred to herein as the wide area positioning system (WAPS), or "system", includes a network of synchronized beacons, receiver units that acquire and track the beacons and/or Global Positioning System (GPS) satellites and optionally have a location computation engine, and a server that comprises an index of the transmitting beacons (e.g. towers with transmitters). The WAPS also includes a billing interface, a proprietary encryption algorithm, and optionally a location computation engine. The system operates in the licensed/unlicensed bands of operation and transmits a proprietary waveform for the purposes of location and navigation purposes. The WAPS system can be used alone, in conjunction with other positioning systems for better location solution, or to aid other positioning systems. In the context herein, a positioning system includes a system that localizes one or more of latitude, longitude and altitude coordinates.

In the description herein, reference to the term "GPS" is in the broader sense of GNSS (Global Navigation Satellite System). GNSS as used herein may include other existing satellite positioning systems such as Glonass as well as future positioning systems such as Galileo and Compass/Beidou, to name a few.

Good performance of WAPS, when the systems are operating in a relatively small area, may be achieved by use of time division multiplexing (TDMA). In TDMA the transmissions from different beacons are distinguished from one another by transmitting in different time slots. A multiplicity of time slots (plus, optionally, auxiliary information, such a sync information) are generally arranged into a time multiplexing frame and often (although not always) a beacon transmits in one or more time slots per multiplexing frame. TDMA is efficient when a small number of time slots (e.g., 10) are allocated per second for transmission. When operating in a larger geographical area, however, unless a relatively large number of slots are allocated (e.g. 50 to 100), it can be the case that the transmission from multiple towers will simultaneously be received by users. In fact it is highly probable that a receiver will receive at least two concurrent transmissions from different towers or transmitters, and these concurrent transmissions are to be distinguished from one another by additional coding methods. Thus, such a modified system will no longer be a TDMA system, but a hybrid system incorporating TDMA and additional multiplexing methods.

The additional multiplexing methods of an embodiment may include code division multiplexing (CDMA) in which different beacons are assigned different pseudorandom (PN) spreading codes, with good cross correlation properties from one to another. Examples of such PN codes are Gold codes, which are utilized in GPS and in many other communications systems. Alternatively, or additionally, the multiplexing method may include a method referred to herein as "frequency offset multiplexing" (FOM) in which small carrier frequency shifts are used to distinguish the transmissions from different beacons. In an embodiment, some combination of TDMA, CDMA and/or FOM are used to distinguish transmissions from beacons that may be concurrently received by a positioning receiver.

It should be noted that the nonrepeating period of a pseudorandom spreading code is called the PN frame period and the nonrepeating sequence is called the PN frame. This is to be distinguished from the time multiplexing frame associated with TDMA described above, especially when CDMA and TDMA are combined into hybrid systems. As an example, a system may use 100 PN frames per time slot and 10 time slots per (time) multiplexing frame. In this case the time multiplexing frame period equals 1000 PN frame periods. In the following description the terms multiplexing frame and PN frame are used to distinguish the TDMA and PN frames. When the context is clear the terms "PN" and "multiplexing" may be deleted when referring to frames.

It should be noted that in WAPS, as compared to multiple access cellular communication systems, there is a need for a positioning receiver to receive and measure arrival times of signals from a multiplicity of transmitters. In fact, there is a need to receive energy from four or more geographically spread beacons. In many environments, such as suburban and urban, signal blockage and attenuation result in the received power levels from these sources being spread over a high dynamic range, perhaps 40 dB or more. This places a much greater constraint on the ability of a positioning receiver to distinguish received signals from one another. Hence there is a need for a positioning receiver operating in such an environment to receive and process signals received over a large dynamic range. Furthermore, such receivers also detect and process signals received from a large number of beacons concurrently.

Another consideration concerns the effects of cross-interference upon position location accuracy. In cellular communications systems a primary concern is demodulating data streams with low probability of error. Through the use of error correction coding, the effects of an interfering signal upon a desired signal are minimized. However for WAPS systems the interfering signal not only affects data but reduces the accuracy of the position measurement, so there is a need to reduce the amount of cross-interference. Following interference removal, it is desirable that the remaining signal of interest have energy 30 dB or more relative to background noise and residual interference. This allows accurate ranging measurements to be made, particularly in multipath environments. No such constraint typically exists for cellular communications systems.

Examples herein show that a number of beacons in excess of 50 may be required for detection and processing by positioning receivers operating in an urban or wide area environment. As indicated above, if pure TDMA were used to accomplish this, a large number of time slots, e.g. 50 or more, would be required to serve a large geographical area. Such a large number of time slots would have various negative consequences. For example, each beacon must send data including its position and various timing corrections. A large number of time slots results in a very long overall frame period needed to receive all requisite data. If data is sent at a high rate to overcome this issue, then the system sensitivity suffers. The hybrid multiplexing methods described herein overcome these problems. This is because only a small number of time slots are used, but this results in positioning receivers concurrently receiving signals from multiple beacons. The hybrid multiplexing methods described herein provide the signal separation capability to distinguish these concurrently received signals.

In order to clearly describe the concepts of the embodiments herein, a particular configuration of beacons, or transmitters, each centered in a hexagonal-shaped geographical region is provided herein. The embodiments described herein are not limited to this configuration, but are demonstrated with clarity through this example. In particular the description herein assumes that a basic TDMA group is a seven-cell "group" arranged in a hexagonal pattern, and each group utilizes 7 time slots. In addition it is assumed that each transmitter utilizes PN codes of length 1023 with frame period 1 msec. Again, this limitation is introduced only for this example, and other PN code lengths and frame periods are equally applicable.

Figure 2:
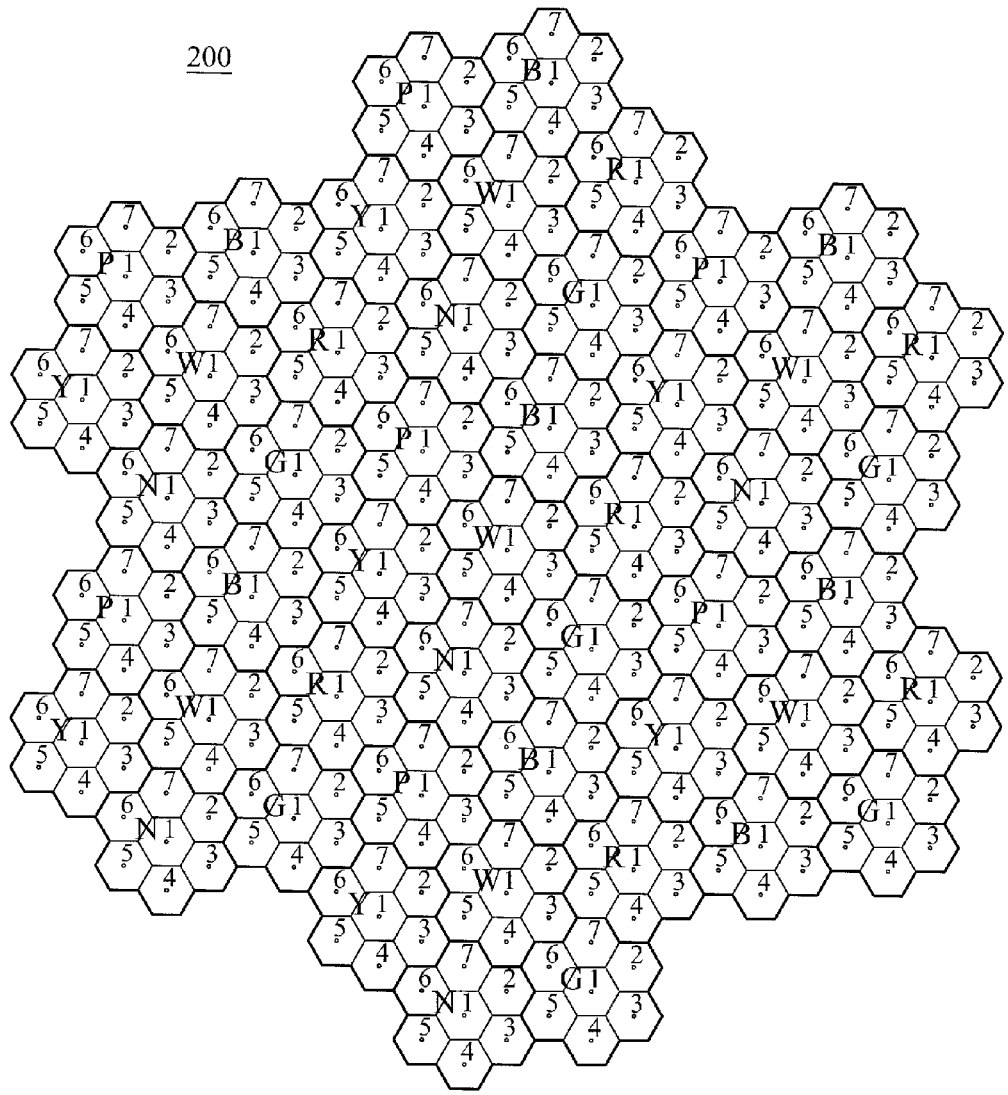
FIG. 2 shows an example cell organization including multiple groups of cells with each group being a seven-cell group, under an embodiment.

FIG. 2 shows an example cell organization 200 including numerous groups (e.g., B, G, N, P, R, W, Y) of cells or transmitters with each group being a seven-cell group, under an embodiment. A particular group, say one marked with W, together with six similar groups surrounding it (each with a different letter nomenclature e.g., R, B, P, Y, N, G) is termed a "supergroup." An exemplary TDMA/CDMA configuration uses seven (7) time slots and seven (7) PN Codes such that each seven-cell group may be assigned one Gold Code and the numbers shown in each cell represent different slots. The assigned Gold Code differs from one group to the next in a supergroup. Hence, in this example configuration, only seven codes are required to provide a unique slot/code pair to each cell in the supergroup, which in this example contains a total of 49 cells. The distance between cells having the same code and slot is approximately seven cell widths. This configuration is referred to as 1G/7G to indicate that each group uses only one Gold code and that the supergroup uses seven (7) total Gold codes.

In an alternative configuration each of the seven (7) groups making up the supergroup are assigned a different frequency offset (typically a few kHz). If this is used in conjunction with the 1G/7G system described above, it is referred to as 1G/7G-7F. Hence in this case different groups are distinguished not only by having a different assigned PN, but also a different frequency offset. As described herein, the use of frequency offsets substantially improves cross interference rejection.

In yet another alternative configuration, referred to herein as 1G/7F, only one PN code is used for all cells in a supergroup. Each cell in a group (e.g., seven cells) is distinguished by a separate time slot and each group is distinguished from one another by having a different frequency offset.

In still another alternative embodiment, each cell in a group is assigned a different PN code, but different groups utilize the same set of seven (7) PN codes. Different groups also use different frequency offsets. This configuration is referred to as 7G/7F.

In a further alternative configuration each cell in a supergroup is assigned a unique Gold code. Each group is further distinguished from one another via a different frequency offset. This configuration is referred to as 7G/7G-7F.

The various configurations above provide various degrees of cross-interference performance. In addition the different configurations have implications in terms of signal acquisition methodology and time, as well as system complexity. A performance comparison of some of these configurations is described herein with reference to the table of FIG. 6. Note that the acquisition complexity and time is proportional to the product of the total number of codes and total number of frequencies.

Although Gold codes were used as PN codes in the above example, other codes are possible. For example, an embodiment includes a code comprising a single maximal length PN sequence (e.g., the first of the two maximal length sequences used to form a Gold code). The codes are distinguished within a cell group by the transmit slot number and between cell groups by the offset frequency. This is a variation of the 1G/7F system described above, and is referred to herein as 1M/7F. These codes have relatively better cross-correlation properties than similar configurations using Gold Codes (by approximately 5 to 6 dB).

Figure 3:
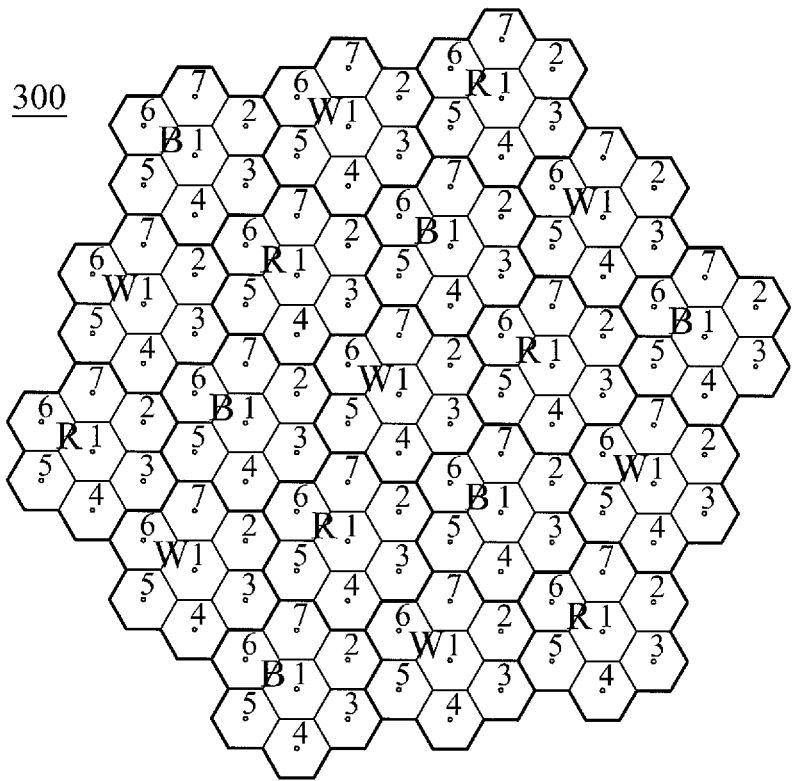
FIG. 3 shows an example cell organization using a single maximal length code used with a three-group repeat pattern, under an embodiment.

FIG. 3 shows an example cell organization 300 using a single maximal length code used with a three-group (e.g., B, R, W) repeat pattern, under an embodiment. Each seven-cell group of this configuration 300 is assigned a maximal length code with a given frequency offset (out of a set of three offsets) and in each cell group the numbers shown represent different slots. This configuration is referred to herein as 1M/3F, where the M specifies "maximal length" code, as compared to the prior "G" for Gold code.

Each cellular layout embodiment may be characterized by at least two measures of performance. The first measure of performance is the ratio (R) of the distance between transmitters using identical transmission parameters (e.g. slot number, code number, frequency offset and code phase) and the cell radius. The gain associated with R is $R^{3.5}$, assuming a 3.5 loss exponent, and this provides an indication of how much rejection to expect, based upon geometry, for a distant transmitter relative to a nearby transmitter. Different loss exponents may be used to model different signaling environments (e.g. urban, suburban, rural, etc.); however, for simplicity of illustration only a 3.5 loss exponent is used herein. An approximate 40 dB gain, measured at a particular cell's radius, generally provides adequate margin in most situations, accounting for other factors, such as building blockage, etc. The cellular configuration 200 described above with reference to FIG. 2 has a (minimum) repeat ratio of 13.8, implying a rejection of $13.8^{3.5}$, or 39.9 dB. Note that this does not mean that cross-interference rejection will be at least 39.9 dB, but does mean that a distant cell will be attenuated by this number relative to a nearby cell (i.e. one at distance equal to cell radius) having the same multiplexing parameters. The multiplexing methods themselves have the burden of cross interference rejection among cells by assignment of different multiplexing parameters, when signals are received from cells at comparable distances from a receiver.

Figure 4:
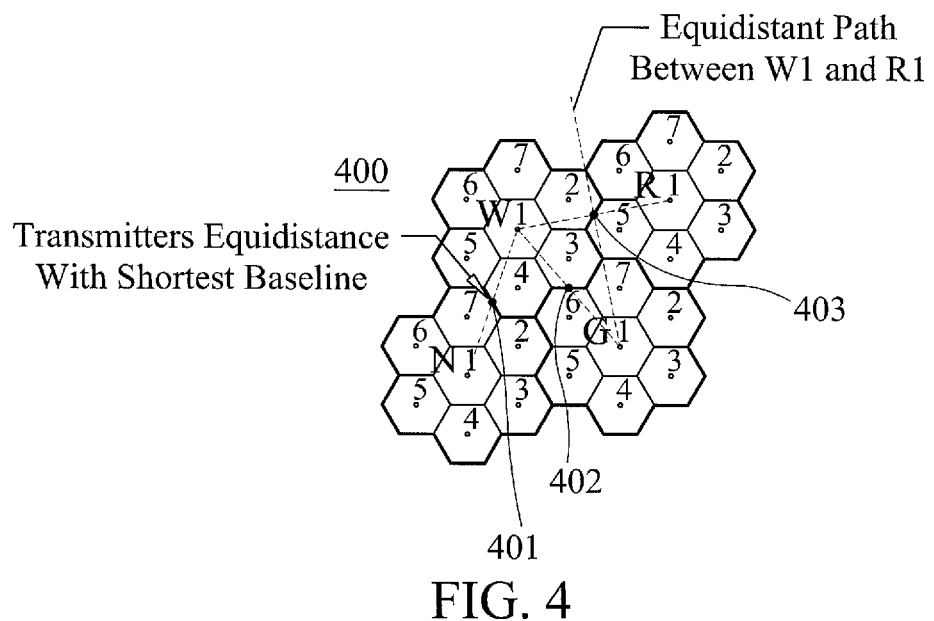
FIG. 4 shows an example configuration comprising three receivers located midway between transmitters emitting during slot 1, under an embodiment.

The second measure of performance is referred to herein as the "straddle rejection." Assuming that a receiver is midway, or near midway, between two transmitters occupying the same time slot, which is a common condition, the ability to process one or the other of the received signals then depends upon the rejection provided by the multiplexing method being employed. FIG. 4 shows an example configuration 400 comprising three receivers 401-403 (small black circles) positioned midway between transmitters emitting during slot 1, under an embodiment. The receivers 401-403 are at the point closest to the two transmitters, such that receiver 401 is at the point closest to the slot 1 transmitters of cell groups N and W, receiver 402 is at the point closest to the slot 1 transmitters of cell groups G and W, and receiver 403 is at the point closest to the slot 1 transmitters of cell groups R and W. A perpendicular line ("Equidistant Path") indicates the equidistant trajectory, in the latter case The receiver 402 located on the line between cell 3 of cell group W and cell 6 of cell group G is located a distance of approximately 2.55 cell radii from either of the slot 1 transmitters of cell groups W and G. A receiver located at 402 will in an unobstructed environment typically see the strongest signals from cells 3 and 4 of group W and cells 6 and 7 of group G. The distance to these cells are 1, 1.78, 1 and 1.78, respectively. Thus, signals received from cell 1 of W and cell 1 of G, at distance 2.55, are ideally only attenuated between 5 and 14 dB relative to the nearby cells. Therefore, the signals from these transmitters are generally observable and comparable in signal strength to at least two of the four nearest transmitters. Furthermore, the received signal strengths corresponding to these two transmitters may be quite comparable due to their equal distance from 402. Accordingly they may be critical in obtaining a position fix, especially in blockage situations. Consequently, it is desirable that the received signals be uncorrelated following signal processing.

For Gold Codes, the correlation rejection between such equidistance cells, the "straddle rejection," is approximately 24 dB, and can be less if Doppler is present. For a maximal length code where different cell groups transmit at different frequencies, spaced by a multiple of the frame rate, this rejection is 30 dB. In order to achieve additional rejection, the signal processing of an embodiment may take advantage of the fact that coherent processing may be performed over a period of time equal to a multiplicity of PN frame periods, as described in detail below. It is shown below that frequency spacing the groups at integral multiples of the frame rate does not allow gain through coherent addition of multiple frames. However, certain integer plus fractional spacing does provide substantial gain. Therefore, integer plus fractional spacing can improve the straddle rejection to levels of 40 dB and beyond. The gains through coherent integration over multiple frames are described below.

Coherent integration across multiple PN frames can reduce the cross-correlation between two codes if their carrier frequencies are different. However, this should be considered in light of the fact that having different carriers typically yields somewhat higher cross correlation per PN frame. The summation of a number M of PN frames effectively acts as a filter for a signal having frequency δf relative to that of a desired signal. The amplitude response of this filter is given by $$A(f) = \left| \sum_{k=0}^{M-1} \exp(j2\pi k \delta f T_f) \right| = \left| \frac{\sin(M\pi \delta f T_f)}{M \sin(\pi \delta f T_f)} \right| \quad (1)$$

Equation (1) is periodic in frequency with period $1/T_f$, where $T_f$ is the PN frame period, and hence the integration reduction need only be considered over the region $[0, 1/T_f]$.

The overall crosstalk reduction is a product of the reduction associated with PN codes and that associated with the coherent integration over multiple frames. In order to understand this crosstalk reduction, consider that a receiver is receiving a PN signal from a transmitter in a cell with PN code p(t) and frequency $f_1$ and also a PN signal from another transmitter in a different cell with PN code q(t) and frequency $f_2$. The codes p and q may be the same, as in the above example, or may be different. Then if the receiver is hypothesizing the first signal, it will correlate the received signal energy with a replica of p(t). The crosstalk due to the presence of q(t) may be shown to be:

$$\int_0^{MT_f} p(t) \exp(j2\pi f_1 t + j\theta) q*(t-\tau) \exp(-j2\pi f_2 t - j\varphi + j2\pi f_2 \tau) dt = \quad (2)$$

$$C \frac{\sin(\pi(f_1-f_2)MT_f)}{M\sin(\pi(f_1-f_2)T_f)} \int_0^{T_f} p(t) q*(t-\tau) \exp(j2\pi(f_1-f_2)t) dt$$

where the correlation is assumed to be done over a period of time equal to a number M of PN frames (M=7 in the above example) each of duration $T_f$. Here θ and φ are assumed reference and carrier phase angles and τ represents the time offset between the frame boundaries of the reference and received (crosstalk) signal. In equation (1) the quantity C is a complex, constant magnitude term that is a function of θ, φ, τ, $f_1$, $f_2$, M and $T_f$. The term within the integral is the circular crosscorrelation between (one frame of) the two PN codes, including the frequency difference $f_1-f_2$. It should be noted that this crosscorrelation rejection level is typically similar in value whether or not p(t) and q(t) are the same as long as $f_1-f_2$ is somewhat greater than the frame rate. The term prior to the integral, neglecting the constant C, is an additional rejection due to correlation over multiple frame periods (here assumed 7), and has magnitude equivalent to equation (1), using the identification $\delta f = f_2 - f_1$. Good choices of δf produce the best crosscorrelation rejection under a variety of situations, as described in detail below.

When selecting the set of frequency offsets, they can be selected such that they are multiples of a minimum offset, say $\delta f_0$. Then, all frequency differences will also be a multiple of this minimum. As described herein, this allows a configuration in which the cross-correlation rejection will be optimized for all pairs of signals which utilize different offsets from one another. Furthermore, choosing δf to be large will reduce any ambiguity that may result from the presence of motion related Doppler shifts.

A good choice of offsets is the set:

$$0, k_0R + R/Q, 2k_0R + 2R/Q, 3k_0R + 3R/Q \ldots, (Q-1)k_0R + (Q-1)R/Q \quad (3)$$

where R is the frame rate, $k_0$ is a small integer (preferably two or greater), and Q is an integer equal to the number of offsets (including 0). If Q is chosen to be M, the number of frames coherently integrated provides excellent cross-correlation results, particularly for low Doppler shifts. Note that if another offset were used in this list it would be $Qk_0R + R$. But this is a multiple of the frame rate R, and hence from the periodicity of (1), it has no frame integration rejection with respect to offset 0.

Figure 5A:
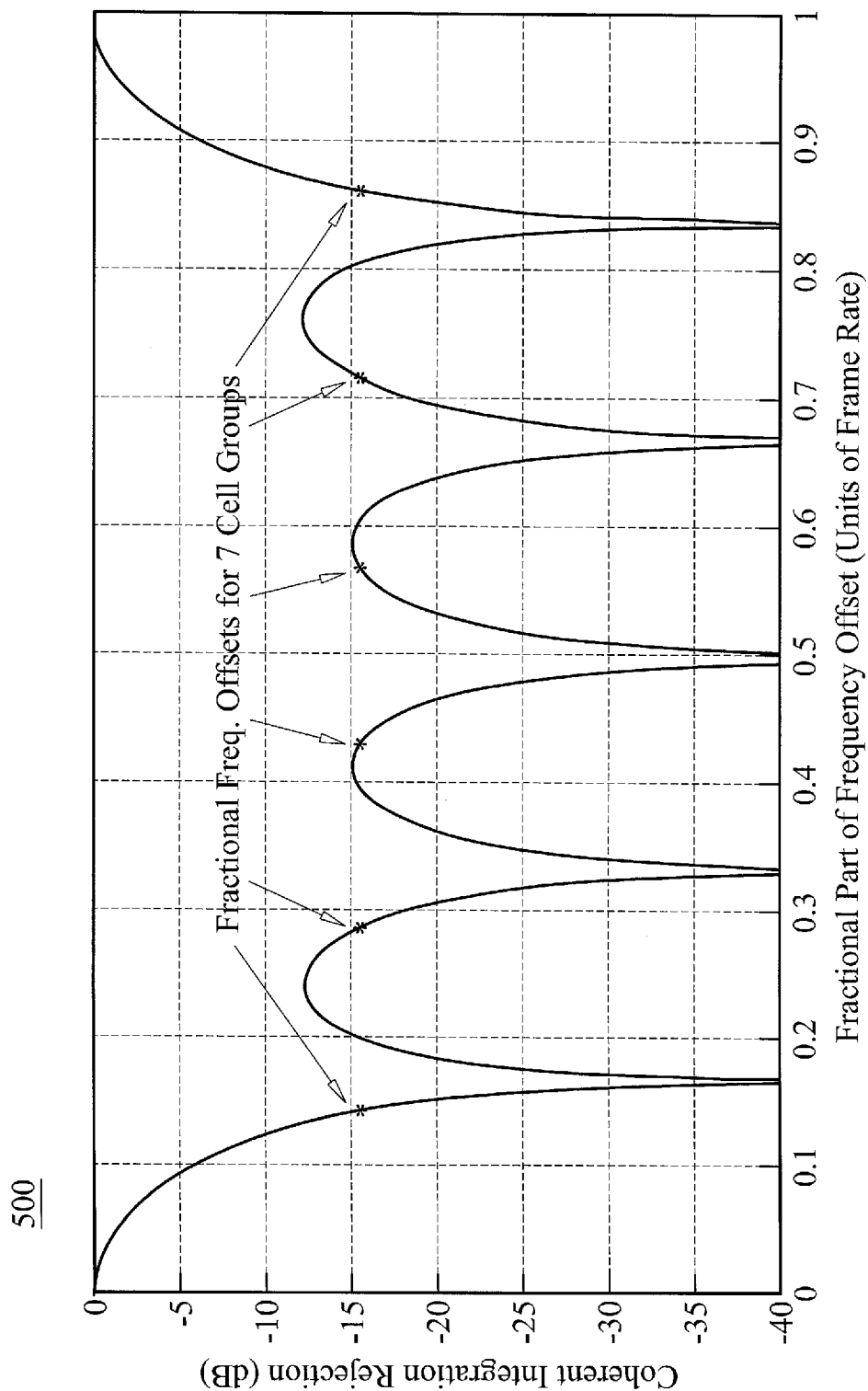
FIGS. 5A and 5B show plots of coherent integration rejection versus carrier frequency offsets (modulo frame rate), under an embodiment.
Figure 5B:
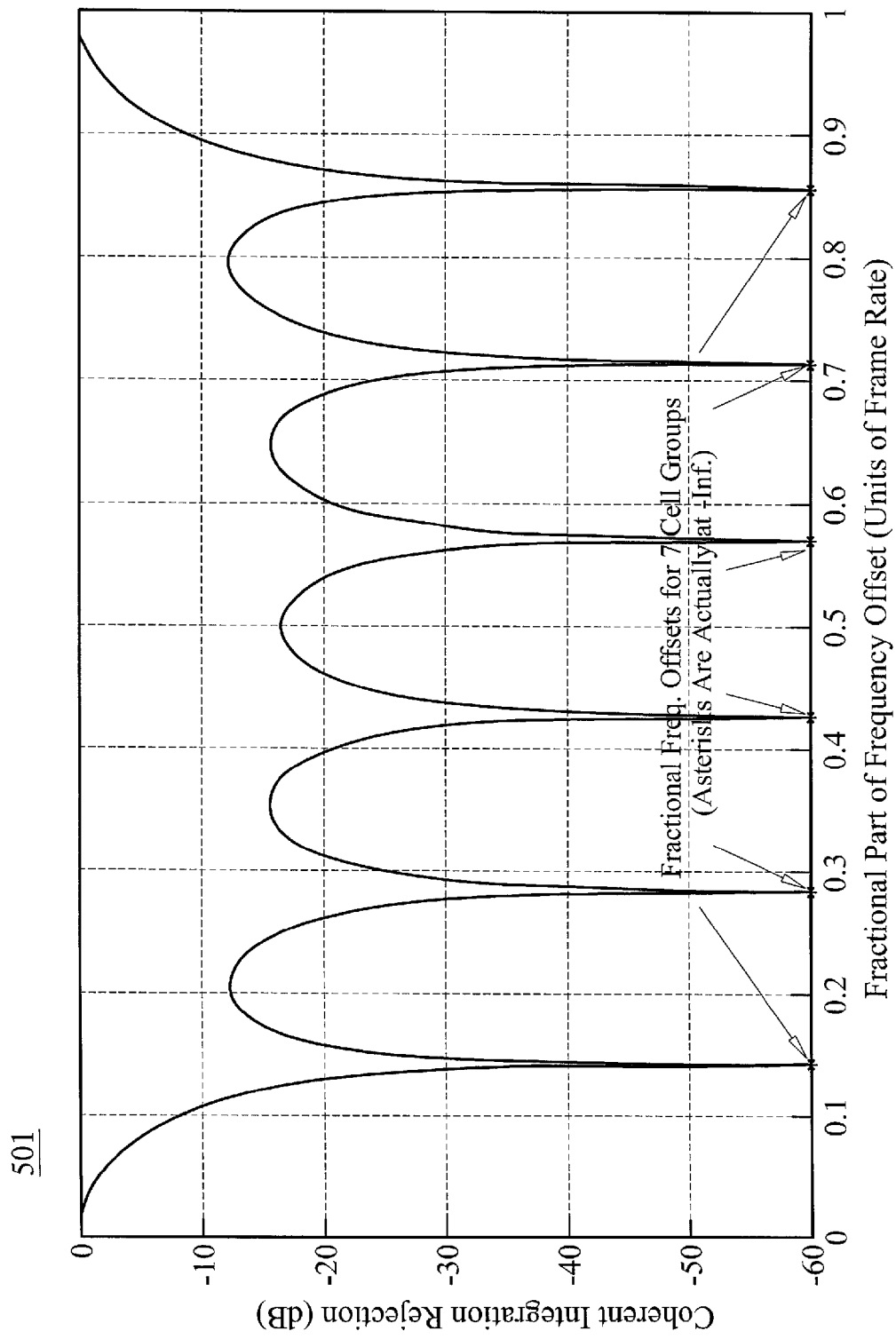

FIGS. 5A and 5B show plots 500 and 501 of coherent integration rejection versus frequency offsets (modulo frame rate), under an embodiment. For plot 501, Q=M, and is selected to be seven (7). Shown on plot 501 are the fractional locations (asterisks) indicating equal frequency offsets that may be assigned to each cell of the seven-cell group described herein. The first cell is assumed to have 0 frequency offset. so, for example, if the integral part of the frequency offset is a multiple of 2*frame rate, the frequency offsets for the cells of the seven-cell group may be chosen to be 0, 2+1/7, 4+2/7, 6+3/7, 8+4/7, 10+5/7 and 12+6/7, where each of these offsets is multiplied by the frame rate (e.g., for 1 kHz frame rate, frequency offset is 0, 2+1/7 kHz, 4+2/7 kHz, etc.). In plot 501, by choosing M to be equal to the number of cell groups in a supergroup, zero cross-correlation can ideally be achieved between any two transmitters in the supergroup. This is the situation shown in plot 501 in which the "asterisks" represent the possible frequency differences between transmitters in one group versus another, within the supergroup. The x-axis may be interpreted as the (fractional part of the) frequency difference corresponding to two transmitters as observed by a receiver. It is noted that the received frequency difference will in general be located at the nulls in plot 501 when there is zero Doppler (when the receiver is undergoing little or no motion, such as in pedestrian situations). By contrast, in 500, Q is selected to be seven (7), but the number of frames integrated M is six (6). The location of the asterisks shows that such a frequency assignment leads to cross correlation reduction of only around 15.6 dB, rather than the infinite reduction for the case Q=M=7. Nevertheless, such a reduction is substantial. For M very large, substantial reduction may be obtained for a variety of values of Q. Such a situation is advantageous in allowing a large number of frequency offsets with good cross correlation reduction, or, alternatively, it may minimize the deleterious effects of Doppler shifts, as discussed. For example, if the number of frames coherently integrated were 50, substantial cross correlation reduction (in the absence of Doppler) could be realized with Q as large as 50. Conversely, if Q is left at a value of seven (7) with this integration time, a differential Doppler of nearly 127 Hz can be tolerated while realizing at least 13 dB cross correlation rejection between any two received signals with different frequency assignments.

In situations in which the receiver is undergoing appreciable motion, the result will be different Doppler shifts between received signals and the relative frequencies will change. For example, the locations of the asterisks on plot 501 can move slightly to the left and right. At low velocity, such as at walking speeds, the degradation due to such Doppler shifts is small. At very high velocity, the advantage of coherent integration can be lost for certain pairs of transmitters.

In terrestrial situations significant reduction in integration gain due to Doppler effects may occur when the assigned frequency differences between two receivers is the minimal nonzero number, e.g., 2 1/7 kHz in the above example or the maximal number 12 6/7 kHz. In other situations, for this example, the gain will be at least equal to the maximum sidelobe level in plot 501, or approximately 12.5 dB. This is a substantial gain. The probability of significant deterioration is found by considering the probability that two cell sites have relative frequency offsets that are the smallest and largest possible (assuming they are nonidentical) and that the differential Doppler of signals received by a receiver from these sites has the correct sign. For the case of M=Q=7, with high Doppler (for example, fast moving receivers) the probability that the coherent integration gain is less than 12.5 dB is less than 16.7%.

When using a maximal length PN sequence instead of a Gold Code, the cross-correlation rejection (ignoring coherent gain integration) when compared to another identical code, offset in frequency by a multiple of the frame rate, is almost exactly the square root of the sequence length, as described in detail below. For a sequence of length 1023 this amounts to 30.1 dB. Thus, this is approximately 6 dB better than two different Gold Codes with zero frequency offset.

Consider the case of a constant amplitude waveform r(t), which is periodic over $T_f$ and includes a maximal length sequence s(n), n=0, ..., L−1 (typically L=1023). Then for q (modulo the code length) any nonzero integer, the product s(n)×s(n+q) is a phase shift of the maximal length sequence. Furthermore, due to the impulsive nature of the circular correlation property of the maximal length code, the (circular) spectrum of s is constant in magnitude (except at DC where it is nearly zero). The result is that when the cross correlation of r(t) is computed with a frequency shifted version of r(t), having a frequency shift that is a multiple of the frame rate, a constant magnitude function is produced. More precisely, $$\left| \int_0^{T_f} r(t) r(t - q t_c) e^{j2\pi ft} \, dt \right| = \left| \int_0^{T_f} r(t - p t_c) e^{j2\pi ft} \, dt \right| = C, \quad (4)$$

$$f = d/T_f, \quad q \neq 0$$

where q is an integer, $t_c$ is the chip duration, p is an integer, and d is a small nonzero integer (if $d/T_f$ is large the chip shape will cause (4) to roll off vs. frequency). Also, it is assumed that the time shift of r is actually a circular rotation. Here C is a constant which is approximately the square root of correlation peak obtained for f=0. Thus for a 1023 length sequence the cross-correlation is uniform in magnitude (except at q=0) where it is zero. Thus the cross-correlation rejection, in dB, is $20 \log_{10}(1/\text{sqrt}(1023)) = -30.1$ dB. This follows from Parceval's theorem, or from conservation of energy.

The above is precise for a frequency shift f which is an integer multiple of the frame rate. That is, the Fourier transform property described above actually applies only to the Discrete Fourier Transform (DFT). For (integer plus) fractional differences, the worst case cross-correlation rejection can be up to 4.5 dB worse, depending upon the frequency shift. This is reflected in table 600 described herein with reference to FIG. 6. When q=0, the cross-correlation gain is poorer than at other lags. Equation 2 shows that for this case the cross-correlation gain is completely determined by the integral of a sinusoid. Choosing large frequency offsets avoids this problem, at the expense of increased signaling bandwidth. The data of table 600 shows that at 0 lag this correlation increase can be almost 8 dB greater than at other lags, for the case of frequency offsets multiples of 2½ times the frame rate. Using multiples of 3½ times the frame rate improves the correlation gain at 0 lag by 3 dB, and using multiples of 4½ times the frame rate improves the correlation gain by yet another 2 dB. Note that the poorer performance at 0 lag applies not only to the maximal length sequence situation, but also to the cases 7G/7F since different groups of a supergroup will have cells whose transmitters use the same PN, only being differentiated by frequency offset.

This (zero lag performance) issue can be avoided by shifting (more precisely rotating) the PN phase for each cellular group. For example, if there are a total of seven cellular groups (of seven cells each), then each cellular group would use a different frequency offset (e.g. a multiple of $(2+\frac{1}{7})/T_f$) and a different PN phase which for the case illustrated previously may be chosen to be a multiple of the PN length divided (approximately) by seven (7). Another method to avoid the zero lag issue, while only using seven (7) PN codes, is to permute the codes relative to slot numbers from one group to the next. This is a variation of 7G/7F, which we might term 7G/P-7F. This is further described by example below.

FIG. 6 shows a table 600 detailing performance comparisons of various cell configurations, under an embodiment. FIG. 7 shows a table 700 of cross-correlation levels at 0 lag offset for 7G/7F and 1M/7F configurations, under an embodiment.

The configurations shown in table 600 have repeat ratio 13.8, assuming a seven-cell hexagonal configuration per group and seven-group configuration per supergroup; frequency offsets are multiples of 2½ times frame rate. Computation of code rejection (at 0 Doppler) in table 600 for configurations 1G/7G-7F and 7G/7F used the first seven (7) Gold codes and searched over all pairs of codes and six (6) frequency offsets. For each pair of codes the highest cross correlation peak was found over all code phases and frequency offsets. This was considered the correlation gain for each pair of codes. For these cases, when a range is shown (for example 19.9-23.5), the numbers correspond to poorest cross correlation gain over all code pairs to best cross correlation gain over all code pairs. These values many change a little with different code selection. The code rejection range shown in table 600 for configurations of 7G/7G-7F corresponds to finding the highest cross-correlation peak versus code phase and frequency for each pair of codes over a set of 49 codes, and then showing the correlation gain range associated with such peaks.

Referring to the code rejection data shown in table 600 for configurations 7G/7F and 1M/7F, the first number only corresponds to relative code phase of zero between pairs of codes and for worst case frequency offset; the first number can be improved through use of an integral part of frequency offset greater than two (2). This worst case occurs when the two codes themselves are the same. The second set of numbers is the correlation gain range as described herein.

The maximal length code has feedback taps [3,10] identical to first of two constituent codes used to form GPS Gold codes.

The worst case frame integration gain shown in table 600 corresponds to a receiver observing a given differential velocity between the two transmitters. The worst case is computed over all nonzero differences in frequency offset. For example the receiver may be traveling at 50 mph towards one transmitter and 50 mph away from a second yielding a total of differential velocity of 100 mph. The differential value 6 mph represents the worst case for walking speed (at most 3 mph). This worst case situation only occurs when the transmitted frequency differences is either 2+⅐ or 2+⁶⁄₇ times the frame rate.

Table 600 provides information assuming that the set of frequency offsets is a multiple of 2⅐ times the frame rate. However, consistent with the description herein, for the 7G/7F and 1M/7F cases (see table footnote 4), there is a substantial degradation in the code rejection for 0 relative code phase (0 Doppler) case, when the PN codes compared are the same. In this case, the correlation operation effectively squares the code and leaves only the difference frequency.

This difference frequency is then integrated over one frame to determine the effective "code rejection." If the difference frequency were an exact multiple of the frame rate, then the rejection (at zero lag only) would be infinite. However, the difference is a multiple of the frame rate plus a fraction of the frame rate.

If the frequency offset is $\delta f$, then the worst case cross correlation (in dB) at zero lag is $20 \log 10(|\text{sinc}(\delta f)|)$. This is listed in table 700 where for each integer part of frequency offset the worst case was determined over the fractional offsets $1/7$ to $6/7$.

With reference to table 600, and the 7G/7F cases described herein, the ranges of rejection are 19.9 dB to 23 dB, except for the 0 lag case. From table 700, the 0 lag rejection equals 23 dB for integer frequency offset 4 times the frame rate. Even at three times the frame rate the rejection is 20.8 dB, which is within the range of rejection for nonzero lag. The only disadvantage of the larger integral offsets is increased total bandwidth. For integral offset 4, the increase in bandwidth is $24\%$ kHz, as seen in table 700. Since this is only about 1.24% of the total signal bandwidth of 2 MHz (for 1 MHz chip rate), the effects of the slight shift in frequency are small. The range of center frequencies would then vary over $+/-12\frac{3}{7}$ kHz. Thus, either a slightly wider transmit and receive filter can be used to ensure capturing the mainlobe of the transmitted signal spectrum, or the signal can be allowed to be slightly more attenuated at the edge. At 1 MHz$+/-12\frac{3}{7}$ kHz, the signal spectrum itself is down 38 dB, not including additional transmitter filtering. Even more revealing, the energy in the region [1 MHz$-12\frac{3}{7}$ kHz, 1 MHz] is only $1.3 \times 10^{-6}$ of the mainlobe energy and hence is negligible.

Figure 5O:
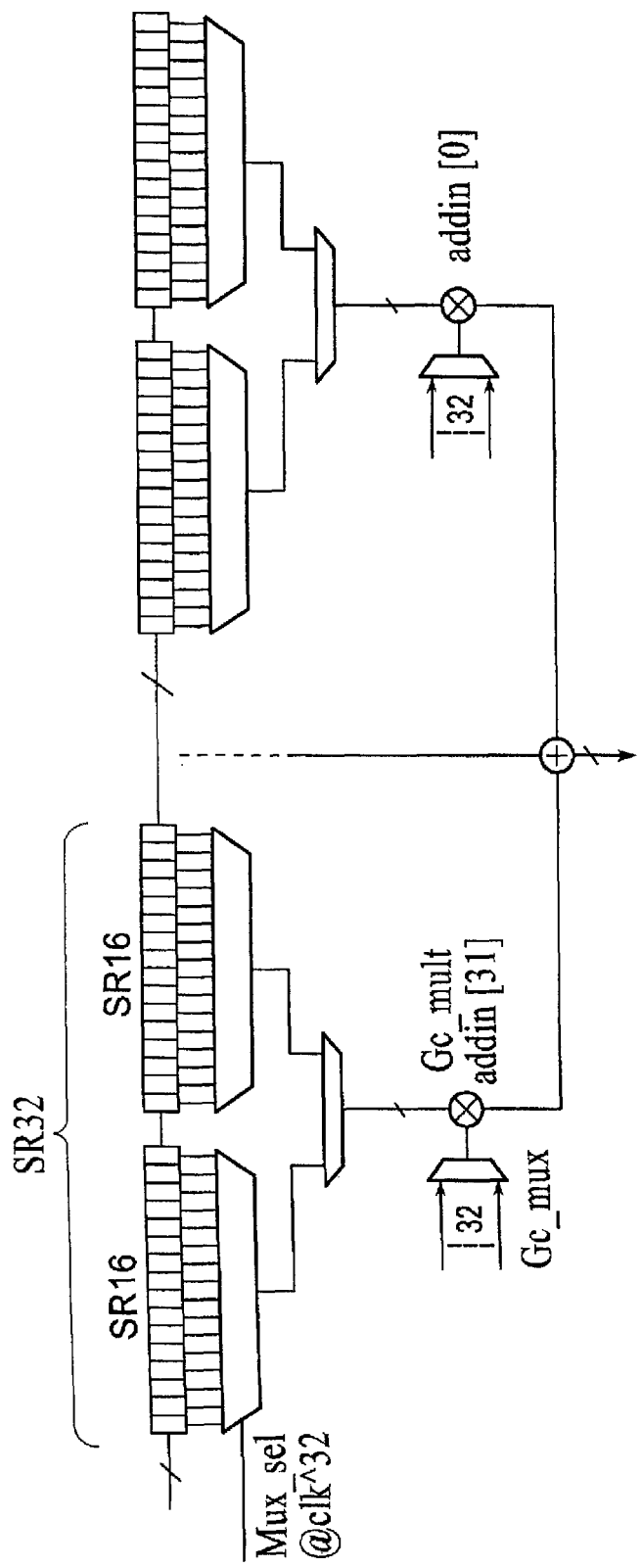

Receiver velocity results in Doppler shifts which in many cases reduces the effective processing gain due to coherent summation, as shown in the last three columns of table 600. More pertinent is the differential Doppler which is the difference in the Doppler of two transmitters as observed by a receiver. At 930 MHz a speed of 60 MPH corresponds to a maximum Doppler, relative to a stationary platform, of 83.2 Hz (0.0895 ppm). In principle then, the differential Doppler between the two stationary platforms can be as poor as 166.4 Hz at 60 MPH. With reference to FIG. 5, this can move the uppermost asterisk to the peak of the curve at approximately 1 kHz, thus producing no frame summation gain, or it can cause the lower asterisk to move to the origin. Each case represents a specific direction of travel for each of the two platforms. The worst case situation may not be unusual, however, since there may be many circumstances when two transmitting towers are along a roadway on which a vehicle is traveling. The cellular groups can be arranged, however, so that the frequency offsets along major roadways do not differ by a fraction $1/7$ or $6/7$, thus minimizing the likelihood of this situation occurring.

Figure 8:
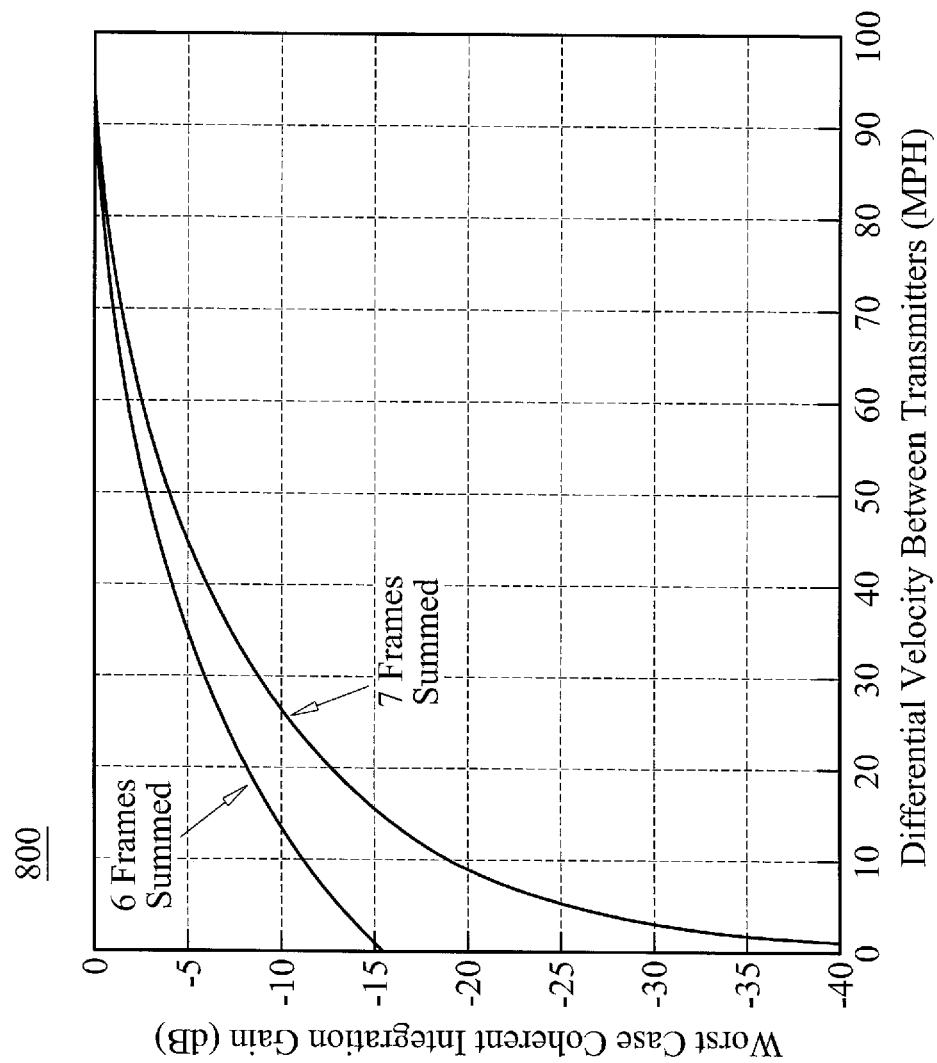
FIG. 8 shows a plot of worst case coherent integration gain by frame integration versus differential velocity between two transmitters, under an embodiment.

At pedestrian walking speeds of say 3 MPH, the maximum differential Doppler would be 8.32 Hz which represents only a small reduction in performance as seen in table 600. FIG. 8 shows a plot 800 of worst case coherent integration gain by frame integration versus differential velocity between two transmitters, when the number of frames summed is 6 or 7.

With reference to FIG. 2, assume the 7G/7F system where each group of the same label (e.g., each B group) has seven (7) PN codes assigned to it, and the different labels (e.g., B, G, N, P, R, W, Y) represent different frequency offsets (e.g., seven (7) offsets). The numbers shown in each cell represent time slots. In this example configuration the repeat ratio is 13.8, at which point a transmitter exists that has the same frequency offset, slot and PN code as another. A much larger repeat ratio is achieved by permuting the seven (7) PN codes. That is, consider a configuration that includes a supergroup that is group of seven (7) groups, each group comprising seven cells, along with six (6) surrounding groups each having seven (7) cells, for a total of 49 cells. Furthermore, six (6) similar supergroups surround any particular supergroup. If the PN codes are permuted from one supergroup to the next so that no PN code in a supergroup is transmitted in the same slot as in any of the surrounding supergroups, then the cross-correlation between cells in adjacent supergroups will be at least reduced by the code cross-correlation rejection (19.9-23 dB, see table 600). The cells may have the same frequency offsets and hence may not gain additionally from coherent integration. In this manner the number of cells not having identical [time slot, frequency offset, PN code] triplets can be extended to a total of $7 \times 49 = 343$. The minimum repeat ratio for cells having identical triplets is approximately 36, thus implying a rejection of a cell with an identical triplet of $36^{3.5}$, or 54.5 dB, which is around 14.6 dB better than that achievable without the permutation of the PN codes. The above configuration may be referred to as 7G/7F/P, since the permutation occurs at the supergroup level. Note that this is distinct from the 7G/P-7F case previously described in which the permutation of PN codes occurred at the group level.

Figure 9:
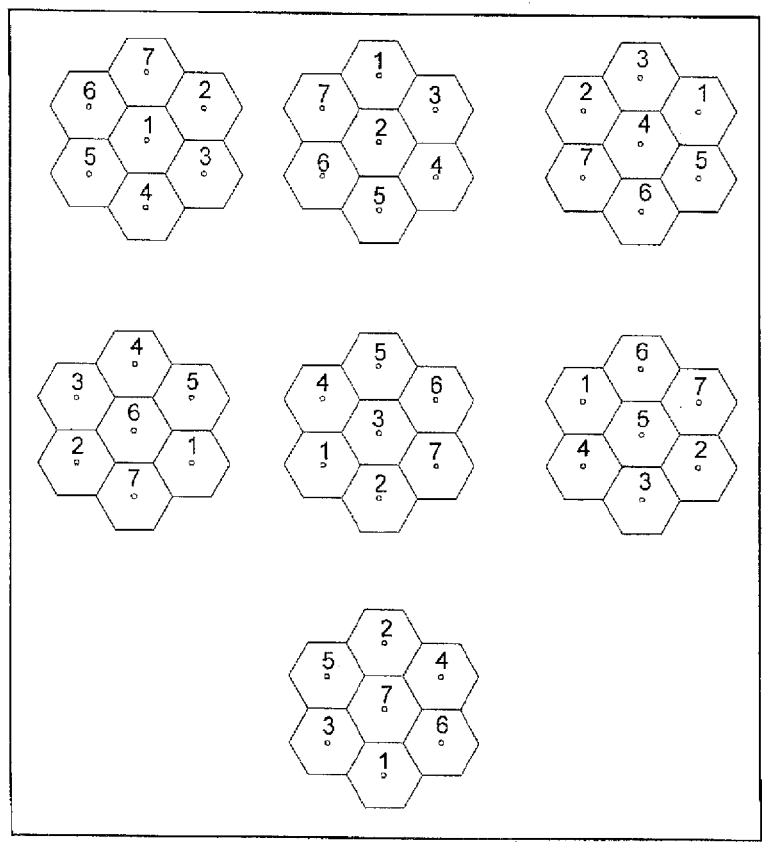
FIG. 9 shows the seven distinct permutations of PN Codes, under an embodiment.

FIG. 9 shows seven distinct permutations 900 of PN Codes, appropriate to the 7G/P-7F case, under an embodiment. These permutations 900 assume that a particular position (e.g. top) in a 7-cell group is associated with a particular slot (e.g. 1) and the numbers represent a PN code index, and no PN number occurs twice in a slot. Another way to achieve distinct permutations is to associate a PN code with a slot for a given group and then assign the PN codes to other groups by a cyclic shift of the PN codes relative to the slot numbers. For example if PN codes 1 to 7 are assigned to slots 1 to 7 respectively, in one group, then another group of the supergroup may assign to slots 1 to 7 PN codes 2, 3, 4, 5, 6, 7, 1. Similarly other groups would be assigned codes with indices that are other cyclic shifts of the 7 codes. As long as the number of codes utilized equals or exceeds the number of slots assigned to transmitters in a group, a supergroup may be formed with a number of groups equal to the number of slots such that no PN code will be concurrently transmitted by more than one member of the supergroup. Such a cyclic shift approach may also be used in the aforementioned 7G/7F/P case as well as another case termed 7G/7G-7F/P, discussed herein.

More than one multiplexing method may be used when the packet is divided into data segments and ranging segments, or alternatively, when alternate packets include data and ranging information. Consider the system 7G/7F with frequency offsets as described above. During the ranging section, assuming six (6) frames are coherently integrated, then the straddle rejection can be on the order of 40 dB or better. During the data section, no benefit is derived from frame integration if a symbol duration is one frame. For the data section the rejection is approximately 21-23 dB. This is adequate for supporting data, especially since the required SNR per symbol is only no more than 8 dB at the minimum signal level (this depends upon the type of error correction coding used). Thus, high data rate and the good rejection properties of coherent integration can be simultaneously achieved. When the receiver is undergoing high speed motion, the overall rejection in some cases may be as poor as 24 dB even with the coherent integration. However, signal levels are expected to be stronger, making positioning easier. Furthermore, the geometry changes rapidly, ensuring a quick transition through a poor cross-correlation environment.

By way of example, one embodiment of the above methods is now described. Under this embodiment a cluster of cells equal to seven (7) is used in a slotted arrangement, in accordance with the 7G/7F/P configuration. Seven frequency offsets (one being 0 frequency) are used to distinguish the seven (7) different groups of seven (7) cells, which make up a supergroup. The offset separation used is a multiple of (4+1/7)/ frame rate, which minimizes the correlation degradation for 0 lag. The seven different supergroups are distinguished using a permutation of the seven (7) PN codes, where each group in a supergroup uses the same permutation. High elevation transmitters may displace the multiplexing assignments corresponding to a number of adjacent cells with a single triplet [time, frequency offset, PN code]; alternatively, one or more particular slots may be reserved for such transmitters.

An alternative configuration, mentioned previously, is the 7G/P-7F configuration. Both frequency offset and PN code permutations are used to distinguish the seven (7) different groups of seven (7) cells, which make up a supergroup. This configuration ensures that the same PN code is not used in the same slot in any of the groups within a supergroup. The supergroups can interfere with each other in that the corresponding cells in the supergroups use the same [slot, PN code, frequency offset] triplet. However, this approach eliminates the possibly large cross-correlation at zero lag between transmitters in a supergroup, having the same PN and different frequency offset. As described herein, this limitation would otherwise have to be eliminated by choosing the frequency offset set to be larger than otherwise necessary.

Another variation termed 7G/7G-7F/P utilizes 49 different PN codes within a given supergroup. Each different group within a supergroup utilizes a different offset frequency. Supergroups are distinguished by a permutation of the 49 PN codes from one supergroup to another in such a manner that no supergroup has a cell with the same slot/frequency/PN assignment as any cell in an adjacent supergroup. This approach avoids the zero lag cross correlation reduction problem over the set of all cells in seven (7) adjacent supergroups.

FIG. 10 shows a preferential Gold Code list 1000, based upon run length (i.e. how many consecutive code phases on either side of the peak have auto correlation magnitude 1/1023 times the peak), under an embodiment. The table 1000 lists the initial fill of the shift register of the second PN code, as well as the delay, with the initial fill specification being the more useful for implementation. The fill of the first PN code is always equal to all 1s. The fill of the second PN code is as specified in table 1000. The fill read from left to right represents the first 10 outputs of the second PN generator. The fill is placed in the shift register from the end of the shift register back to the beginning. The first code has feedback taps at locations three (3) and 10 and is always assumed to have initial fill of all 1s. The second PN code has feedback taps (2, 3, 6, 8, 9, 10), with initial fill as provided in table 1000. It is noted that the two individual maximal length (ML) codes used to construct the Gold codes may also be considered Gold codes, since they share the cross correlation properties associated with the other codes of the Gold code set. If these were included, they would be placed at the head of the table 1000, since being ML codes they have autocorrelation functions with magnitudes 1/1023 times the peak at all locations except for the peak location.

The ten Gold codes of the table 1000 were tested for their cross-correlation properties with frequency offsets that are multiples of 4 1/7 times the frame rate. The peak of the cross-correlation functions over the set of the 10 codes and over the six (6) different offset differences ranged between −20.3 dB and −23.1 dB. This is slightly better than that found in table 600 (described above with reference to FIG. 6) which corresponds to the case of the first 7 GPS codes in order of delay between codes (and frequency offset which were multiples of 2 1/7 times frame rate). Although the table 600 lists ten preferred codes, the list may be continued to be as long as required (up to 1025 for length 1023 Gold codes), and may, alternatively be populated with other types of codes, and/or other code lengths, in order of descending run length.

In the description herein different transmitters in a cellular group typically transmit in different time slots. Similarly located transmitters in different groups transmitted concurrently. However, the methods described herein, particularly those involving the offset frequency multiplexing, are not so limited. There may be cases, for example, in which transmitters in adjacent cells transmit concurrently. For example, some transmitters may transmit in two (often successive) slots. In this case the system of an embodiment relies upon the PN and offset frequency multiplexing to achieve requisite cross-correlation rejection. Transmitting in more than one slot increases the data throughput of that transmitter. Auxiliary data, such as security or authentication data may be sent in the secondary slot. In some cases a transmitter may be assigned a primary slot and a secondary slot, and the transmitter might reduce its transmission level by a small amount, say 6 dB to 10 dB during the secondary slot. If the secondary slot is used primarily to transmit data, and secondarily for ranging purposes, then the lower power level may be adequate. Another reason for transmission in more than one slot is for more rapid synchronization. A receiver would have additional opportunity for initial acquisition of signals in this situation. Yet another reason to have the transmitter occupy multiple slots is to provide additional range and position location measurements per second.

There are situations in which multiple transmitters in the vicinity of one another will transmit identical waveforms concurrently. That is, the PN and frequency offsets plus any data may be common for multiple signals concurrently transmitted. An example of this may occur at the beginning of a time slot during which initial synchronization may occur. A receiver wishing to get an approximate timing will in these cases be able to achieve such timing without having to search over a space of multiple codes and/or frequency offsets. This is sometimes termed a "simulcast" transmission. With such a simulcast transmission it may be desirable to use a PN code that is a maximal length PN code rather than a Gold code. As indicated above such maximal length codes have ideal autocorrelation properties since their circular autocorrelation functions have the same minimal magnitude sidelobes. This property may result in improved probability of detection or reduced false alarm rates. It should be noted that a maximal length code may be implemented by a simple modification of a Gold code generator. The initial fill is preloaded to all zeros in the linear feedback generator of one of the two generators that are used to generate the Gold code. This will produce the maximal length sequence associated with the other generator.

The frequency offset multiplexing of an embodiment has a relatively small frequency offset between transmitters relative to the overall bandwidth of each of the transmitted signals. This ensures that the total bandwidth occupied by all the transmitted signals is not substantially larger than each individual transmitter. The examples provided herein used offsets that were less than 1% of the signal bandwidth. However, an embodiment herein applies to situations in which the difference in frequency offsets between a pair of transmitters are much larger, but less than the signal bandwidth. In order to conserve total signal bandwidth, it is often desirable to keep such offset differences below approximately 25% of the signal bandwidth, and certainly less than 50% of the signal bandwidth. As an example, if 5 different frequency offsets were employed and the difference between adjacent offsets was 25% of the signal bandwidth, then the total passband required would be twice the bandwidth of any of the signals.

Embodiments using larger offsets are applicable for situations in which the signal bandwidth is small and there is appreciable Doppler. In these cases the larger offsets between the signals allow them to be separable in frequency even when undergoing large differential Doppler. It is noted that traditional frequency division multiplexing methods utilize offsets that are at least equal to the signal bandwidths (typically much larger) and orthogonal frequency division multiplexing (OFDM) uses a set of carrier frequencies whose offsets, relative to one another, are approximately half the bandwidth associated with each carrier (as measured by the null-to-null passband width).

In another embodiment, wideband, non-pseudorandom ranging signals are used in substitution for the pseudorandom ranging signals described herein. For example, one might use a set of chirp type signals for ranging, with the set comprising chirp signals having different chirp rates (i.e. frequency vs. time rates). The embodiments described herein apply to this situation. For example, the use of offset frequency multiplexing applies, and in particular equation (2) herein applies with p(t) and q(t) being wideband signals transmitted by different transmitters, $T_f$ the nonrepeating duration of the wideband signals, M the number of repetitions of the signals integrated, and the other quantities as described herein. Similarly, information symbols may be transmitted by appropriately modulating at slow rate the wideband signals (e.g. using phase reversals).

WAPS Systems and Methods

Figure 11:
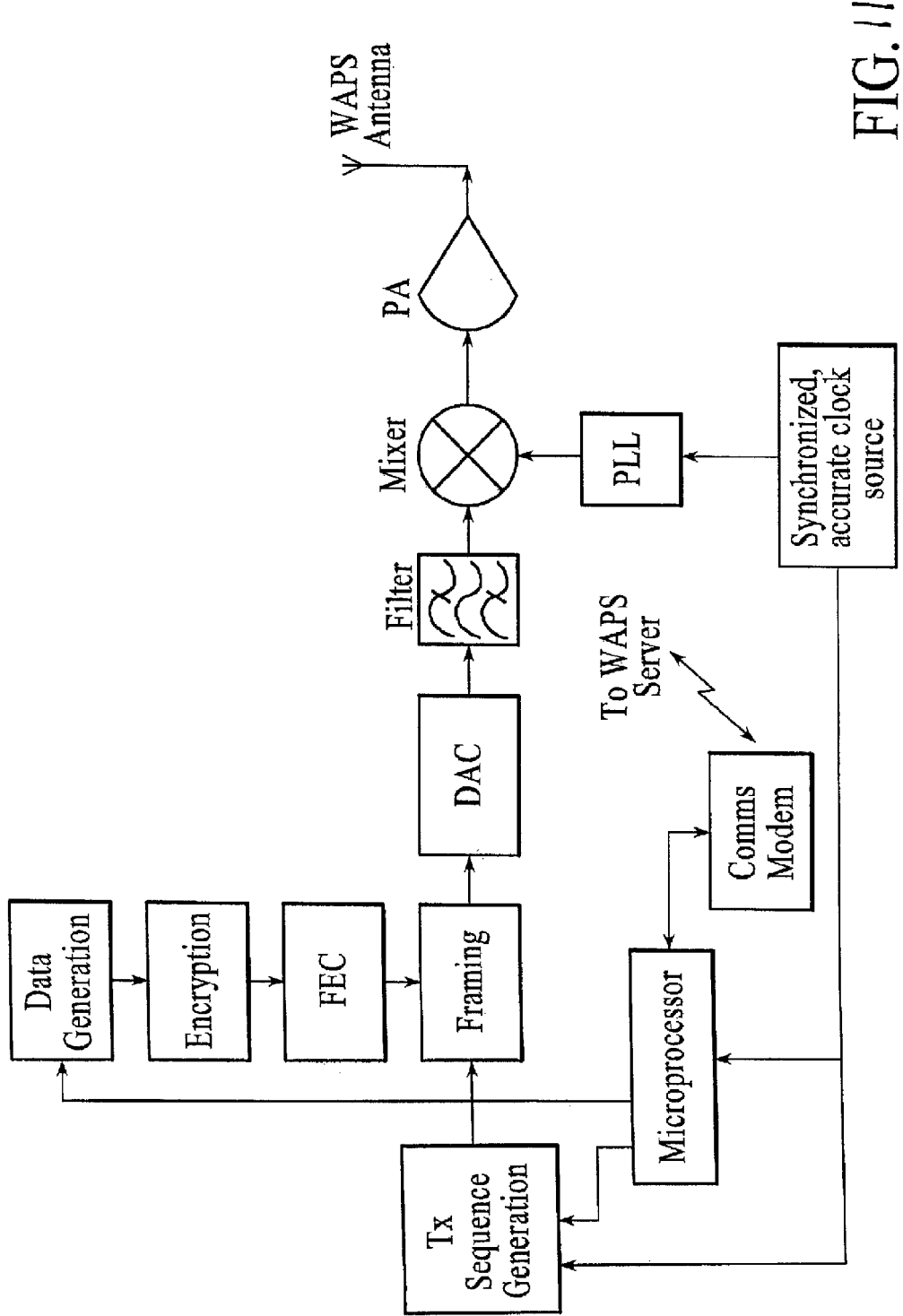
FIG. 11 is a block diagram of a synchronized beacon, under an embodiment.

FIG. 11 is a block diagram of a synchronized beacon, under an embodiment. With reference to FIG. 11 as well as FIG. 1, the synchronized beacons of an embodiment, also referred to herein as beacons, form a CDMA network, and each beacon transmits a signal in accordance with a Pseudo Random Number (PRN) sequence with good cross-correlation properties such as a Gold Code sequence with a data stream of embedded assistance data. Alternatively, the sequences from each beacon transmitter can be staggered in time into separate slots in a TDMA format.

In a terrestrial positioning system, one of the main challenges to overcome is the near-far problem wherein, at the receiver, a far-away transmitter will get jammed by a nearby transmitter. To address this issue, beacons of an embodiment use a combination of CDMA, TDMA techniques, and frequency offset techniques. Such a system is termed a hybrid multiplexing system since it is not one of these methods alone, but a combination. As an example, local transmitters may use separate time slots (and optionally different codes (CDMA)) to alleviate the near-far problem. Transmitters somewhat further afield would be allowed to use the same time slots while using different CDMA codes, and/or frequency offsets. This allows wide-area scalability of the system. The time slotting can be deterministic for guaranteed near-far performance or randomized to provide good average near-far performance. As indicated herein, the carrier signal can also be offset by a small frequency difference (for example, on the order of the Gold code repeat frequency) to improve cross-correlation performance of the codes and hence address 'near-far' issues. When two towers use the same time slot but different codes, and or offset frequencies, the cross-correlation in the receiver can be further rejected by using interference cancellation of the stronger signal before detecting the weaker signal. In the hybrid positioning systems described herein sophisticated planning methods are used to assign to each transmitter combinations of time slots, CDMA codes, and frequency offsets so as to maximize overall system performance. The number of combinations of these parameters is limited in order to allow signal acquisition time by a receiver to be a practical value.

Additionally, the beacons of an embodiment can use a preamble including assistance data or information can be used for channel estimation and Forward Error Detection and/or Correction to help make the data robust. The assistance data of an embodiment includes, but is not limited to, one or more of the following: precise system time at either the rising or falling edge of a pulse, or a specified signal epoch, of the waveform; Geocode data (Latitude, Longitude and Altitude) of the towers; geocode information about adjacent towers and index of the sequence used by various transmitters in the area; clock timing corrections for the transmitter (optional) and neighboring transmitters; local atmospheric corrections (optional); relationship of WAPS timing to GNSS time (optional); indication of urban, semi-urban, rural environment to aid the receiver in pseudorange resolution (optional); and, offset from base index of the PN sequence or the index to the Gold code sequence. In the transmit data frame that is broadcast, a field may be included that includes information to disable a single or a set of receivers for safety and/or license management reasons.

The transmit waveform timing of the transmissions from the different beacons and towers of an embodiment are synchronized to a common timing reference. Alternatively, the timing difference between the transmissions from different towers should be known and transmitted. The assistance data is repeated at an interval determined by the number and size of the data blocks, with the exception of the timing message which will be incremented at regular intervals. The assistance data may be encrypted using an encryption algorithm. The spreading code may also be encrypted for additional security. The signal is up-converted and broadcast at the predefined frequency. The end-to-end delay in the transmitter is accurately calibrated to ensure that the differential delay between the beacons is less than approximately 3 nanoseconds. Using a differential WAPS receiver at a surveyed location listening to a set of transmitters, relative clock corrections for transmitters in that set can be found.

The tower arrangement of an embodiment is optimized for coverage and location accuracy. The deployment of the towers will be arranged in such a way as to receive signals from 3 or more towers in most of the locations within the network and at the edge of the network, such that the geometric dilution of precision (GDOP) in each of these locations is less than a predetermined threshold based on the accuracy requirement. Software programs that do RF planning studies will be augmented to include the analysis for GDOP in and around the network. GDOP is a function of receiver position and transmitter positions. One method of incorporating the GDOP in the network planning is to set up an optimization as follows. Function to be minimized is volume integral of the square of GDOP over the coverage volume. The volume integration is with respect to the (x, y, z) coordinates of the receiver position. The minimization is with respect to the n transmitter position coordinates $(x_1, y_1, z_1)$, $(x_2, y_2, z_2)$, . . . $(x_n, y_n, z_n)$ in a given coverage area subject to the constraints that they are in the coverage volume: $x_{min} < x < x_{max}$, $y_{min} < y < y_{max}$, $z_{min} < z < z_{max}$ for i=1, . . . , n with $x_{min}$, $y_{min}$ and $z_{min}$ being the lower limits and with $x_{max}$, $y_{max}$, and $z_{max}$ being the upper limits of the coverage volume. The function to be minimized can be written as $$f(x_i, y_i, z_i; i = 1, 2, \ldots n) = \iiint_{x \in (xl,xu), y \in (yl,yu), z \in (zl,zu)} GDOP^2(x, y, z, x_i, y_i, z_i; i = 1, 2, \ldots n)$$

Additionally, the function to be minimized may be weighted according to the importance (i.e. performance quality required) of the coverage region $R_j$.

$$f(x_i, y_i, z_i; i = 1, 2, \ldots n) = \sum_j W_j \iiint_{x,y,z \in R_j} GDOP^2(x, y, z, x_i, y_i, z_i; i = 1, 2, \ldots n)$$

An additional constraint on the tower coordinate locations can be based on location of already available towers in the given area. The coordinatization of all coordinates can typically be done in local level coordinate system with average east as positive x, average north as positive y and average vertical up as positive z. The software which solves the above constrained minimization problem will output optimized transmitter positions $(x_1, y_1, z_1), (x_2, y_2, z_2), \ldots (x_n, y_n, z_n)$ that would minimize the function $f$.

$$\arg\min_{x_i, y_i, z_i; i=1,2,\ldots n} (f(x_i, y_i, z_i; i = 1, 2, \ldots n))$$

This technique can be applied for both wide area networks (like in a city) or in a local deployment (like in a mall). In one example configuration, the network of transmitters is separated by a distance of approximately 30 km in a triangular/hexagonal arrangement around each metropolitan area. Each tower can radiate via a corresponding antenna up to a maximum power in a range of approximately 20 W to 1 kW EIRP. In another embodiment, the towers can be localized and can transmit at power levels as low as 1 W. The frequency bands of operation include any licensed or unlicensed band in the radio spectrum. The transmit antenna of an embodiment includes an omni-directional antenna, or multiple antennas/arrays that can help with diversity, sectoring etc.

Adjacent towers are differentiated by using different sequences with good cross-correlation properties to transmit or alternatively to transmit the same sequences at different times. These differentiation techniques can be combined and applied to only a given geographical area. For instance the same sequences could be reused over the networks in a different geographical area.

Local towers can be placed in a given geographical area to augment the wide area network towers of an embodiment. The local towers, when used, can improve the accuracy of the positioning. The local towers may be deployed in a campus like environment or, for public safety needs, separated by a distance in a range of few 10s of meters up to a few kilometers.

The towers will preferably be placed on a diversity of heights (rather than on similar heights) to facilitate a better quality altitude estimate from the position solution. In addition to transmitters at different latitude/longitude having different heights, another method to add height diversity to the towers is to have multiple WAPS transmitters (using different code sequences) on the same physical tower (with identical latitude and longitude) at different heights. Note that the different code sequences on the same physical tower can use the same slots, because transmitters on the same tower do not cause a near-far problem.

WAPS transmitters can be placed on pre-existing or new towers used for one or more other systems (such as cellular towers). WAPS transmitter deployment costs can be minimized by sharing the same physical tower or location.

In order to improve performance in a localized area (such as, for example, a warehouse or mall), additional towers can be placed in that area to augment the transmitters used for wide area coverage. Alternatively, to lower costs of installing full transmitters, repeaters can be placed in the area of interest.

Note that the transmit beacon signals used for positioning discussed above need not be transmitters built exclusively for WAPS, but can be signals from any other system which are originally synchronized in time or systems for which synchronization is augmented through additional timing modules. Alternately, the signals can be from systems whose relative synchronization can be determined through a reference receiver. These systems can be, for example, already deployed or newly deployed with additional synchronization capability. Examples of such systems can be broadcast systems such as digital and analog TV or MediaFlo.

When the WAPS network is configured, some transmit locations may be better than some others in the network (height of the beacon above clutter, power levels) either determined by design or by field measurements. Such beacons can be identified to the receivers either directly or indirectly or by encoding data bits which indicate the "quality" of the beacon which the receivers can then use to weight the signal received from such beacons.

Figure 12:
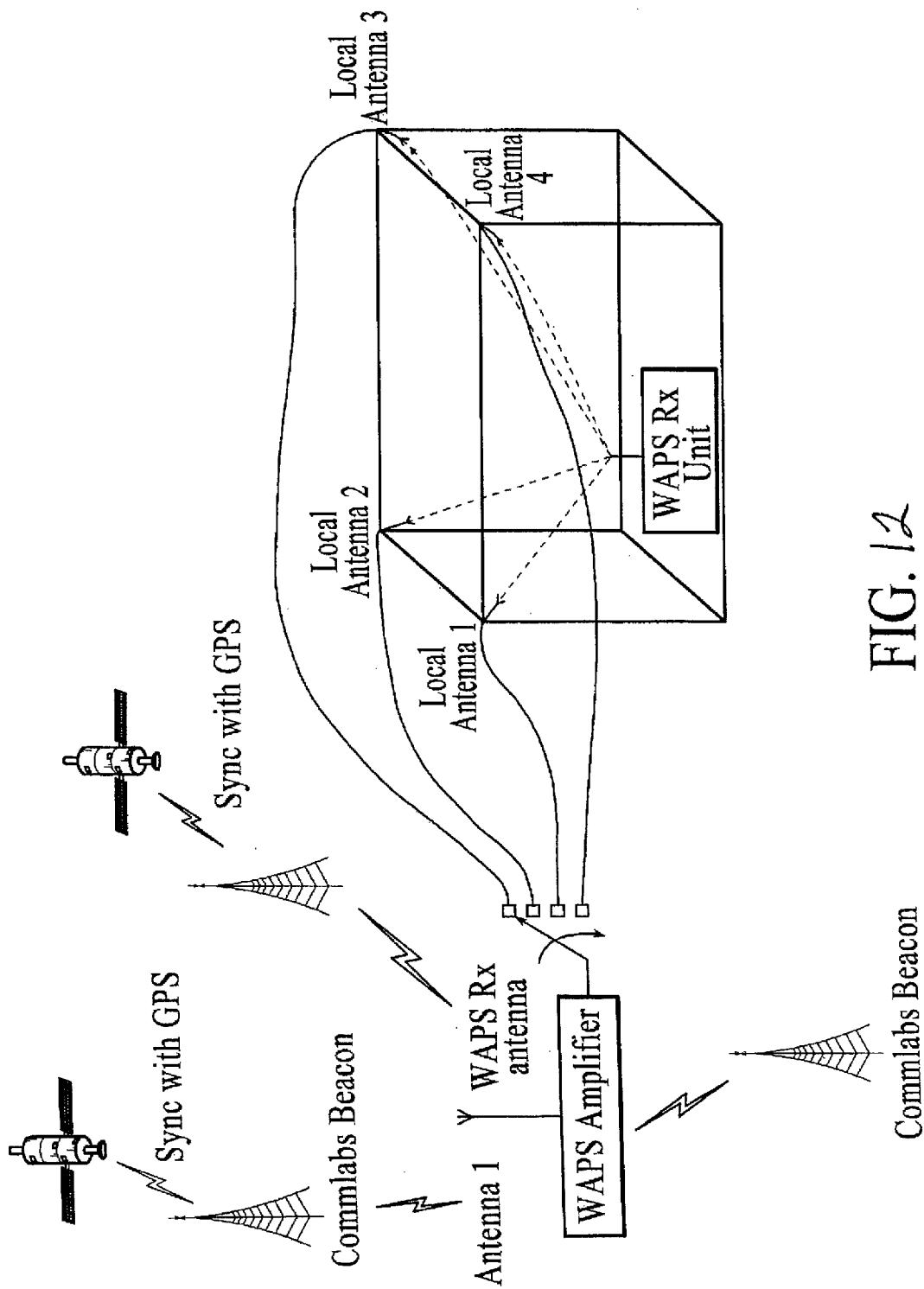
FIG. 12 is a block diagram of a positioning system using a repeater configuration, under an embodiment.

FIG. 12 is a block diagram of a positioning system using a repeater configuration, under an embodiment. The repeater configuration comprises the following components:

1) A common WAPS receive antenna (Antenna 1)

2) An RF power amplifier and a splitter/switch connects to various WAPS transmitter antennas (Local Antennas 1-4).

3) WAPS User Receiver

Antenna1 receives, amplifies and distributes (switches) the composite signal to Local Antennas 1-4. The switching should be done (preferably) in a manner such that there is no overlap (collision) of transmissions from different repeaters at the user receiver. Collision of transmissions can be avoided through the use of guard intervals. The known cable delays from the switch to the transmit antenna should be compensated either by adding delays at the repeater-amplifier-transmitter to equalize the overall delay for all local repeaters or by adjusting the estimated time of arrival from a particular repeater by the cable delay at the user-receiver. When TDMA is used in the wide area WAPS network, the repeater slot switching rate is chosen such that each wide area slot (each slot will contain one wide area WAPS tower) occurs in all repeater slots. One example configuration would use the repeater slot duration equal to a multiple of the wide area TDMA frame duration. Specifically, if the wide area TDMA frame is 1 second, then the repeater slots can be integer seconds. This configuration is the simplest, but is suitable only for deployment in a small, limited area because of requirement of RF signal distribution on cables. The user WAPS receiver uses time-difference of arrival when listening to repeater towers to compute position and works under a static (or quasi static) assumption during the repeater slotting period. The fact that the transmission is from a repeater can be detected automatically by the fact that each WAPS tower signal shows the same timing difference (jump) from one repeater slot to the next one.

Figure 13:
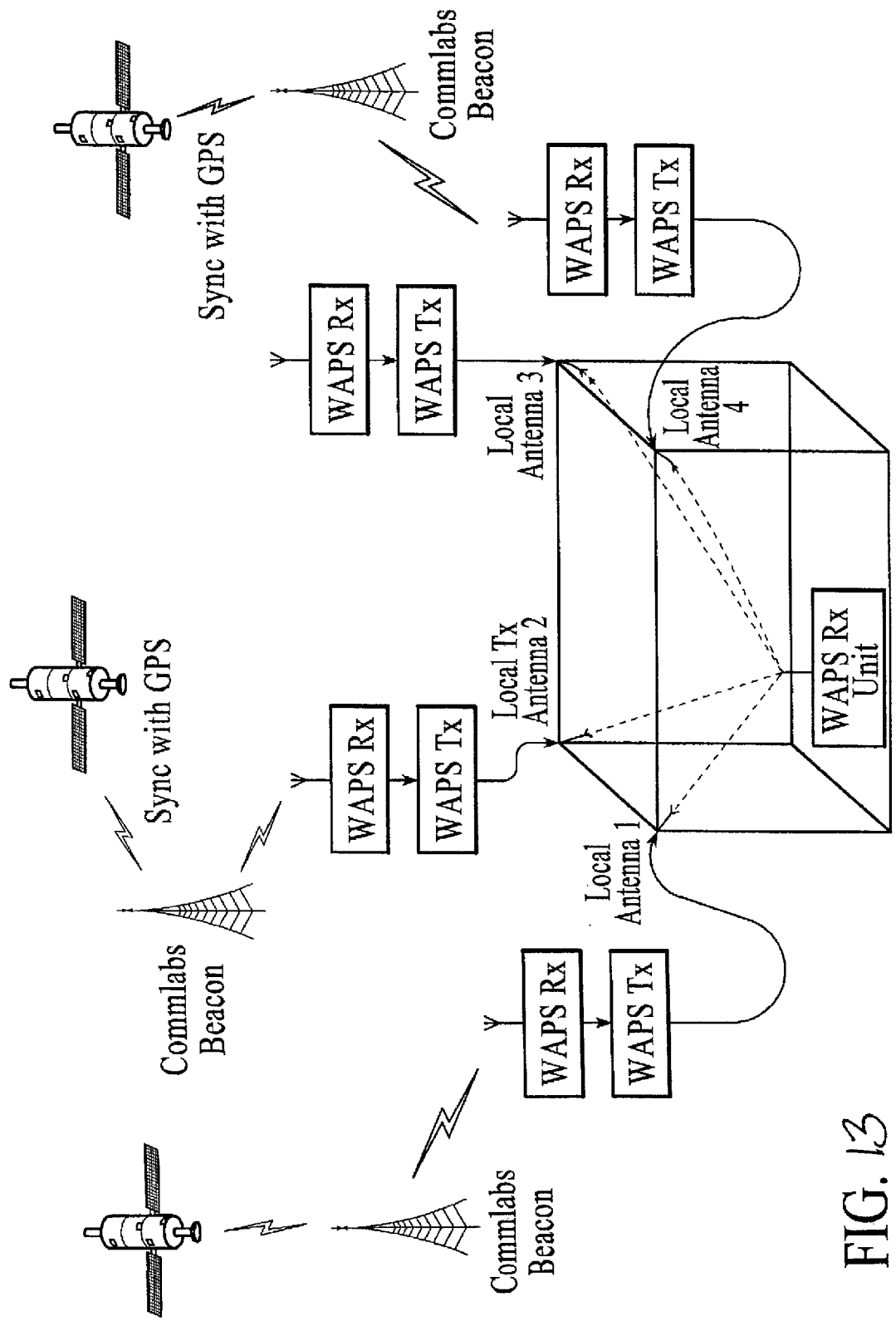
FIG. 13 is a block diagram of a positioning system using a repeater configuration, under an alternative embodiment.

FIG. 13 is a block diagram of a positioning system using a repeater configuration, under an alternative embodiment. In this configuration each repeater comprises a WAPS repeater-receiver and an associated coverage-augmentation WAPS transmitter with local antenna (which can be indoors, for example). The WAPS repeater receiver should be able to extract WAPS system timing information as well as WAPS data stream corresponding to one wide area WAPS transmitter. The WAPS system timing and data corresponding to one wide area WAPS transmitter are passed to the corresponding local area WAPS transmitters which can then re-transmit the WAPS signal (for example, using a different code and the same slot). The transmitter will include additional data in its transmission such as latitude, longitude and altitude of the local antenna. In this configuration, the WAPS user receiver operation (range measurement and position measurement) can be transparent to the fact that the signals are coming from repeaters. Note that the transmitter used in the repeater is cheaper than a full WAPS beacon in that it does not need to have a GNSS timing unit to extract GNSS timing.

Depending on the mode of operation of the receiver unit, either terminal-based positioning or network-based positioning is provided by the system. In terminal based positioning, the receiver unit computes the position of the user on the receiver itself. This is useful in applications like turn-by-turn directions, geo-fencing etc. In network based positioning, the receiver unit receives the signals from the towers and communicates or transmits the received signal to a server to compute the location of the user. This is useful in applications like E911, and asset tracking and management by a centralized server. Position computation in the server can be done in near real time or post-processed with data from many sources (e.g., GNSS, differential WAPS etc.) to improve accuracy at the server. The WAPS receiver can also provide and obtain information from a server (similar, for example, to a SUPL Secure User PLane server) to facilitate network based positioning.

Figure 14:
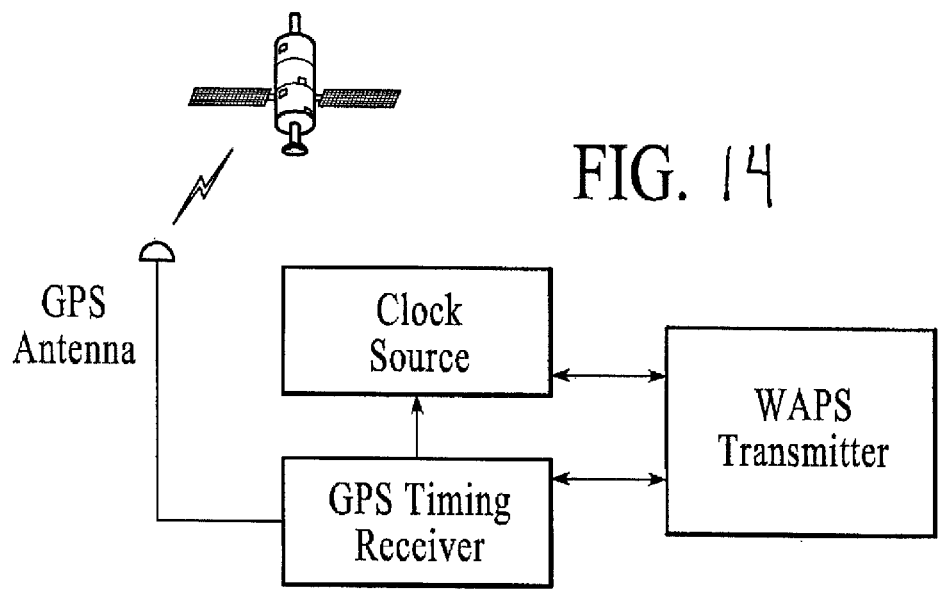
FIG. 14 shows tower synchronization, under an embodiment.

The towers of an embodiment maintain synchronization with each other autonomously or using network-based synchronization. FIG. 14 shows tower synchronization, under an embodiment. The following parameters are used in describing aspects of synchronization:

System transmitter time=$t_{WAPS\_tx}$

Absolute time reference=$t_{WAPS\_abs}$

Time Adjustment=$\Delta_{system}=t_{WAPS\_tx}-t_{WAPS\_abs}$

Note that it is not essential to synchronize WAPS system time to an absolute time reference. However, all WAPS transmitters are synchronized to a common WAPS system time (i.e. relative timing synchronization of all WAPS transmitter). Timing corrections of each transmitter relative to WAPS system time (if any) should be computed. The timing corrections should be made available to the receivers either directly through over the air WAPS assistance transmission or through some other communication means. The assistance can be delivered, for example, to the WAPS receiver through a cellular (or other) modem or through a broadcast data from a system (such as Iridium or digital TV or MediaFlo or broadcast channels of cellular systems). Alternatively, the timing correction can be sent to the server and used when computing position at the server. A description of tower synchronization of an embodiment follows.

Under network based synchronization, the towers synchronize with each other in a local area. The synchronization between towers generally includes transmission of a pulse (which can be modulated using any form of modulation onto a carrier and/or spread using a spreading code for better time resolution which in turn modulates a carrier) and synchronizing to the pulse edge on the receiver, as described in detail herein.

Figure 15:
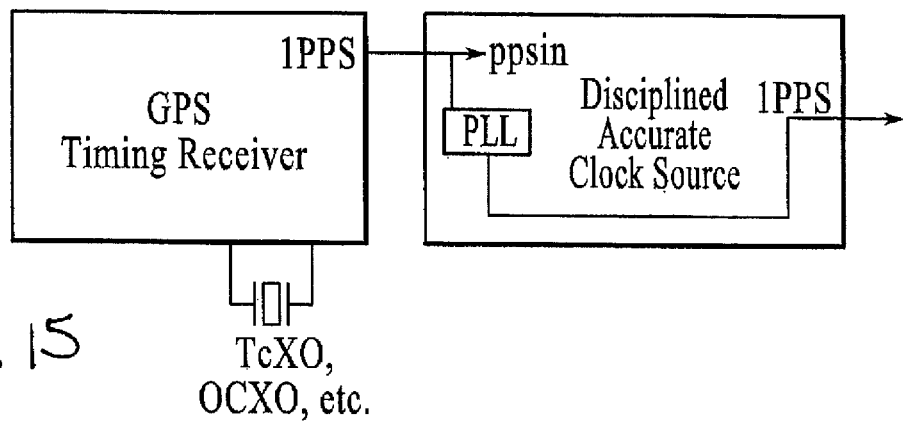
FIG. 15 is a block diagram of a GPS disciplined PPS generator, under an embodiment.
Figure 16:
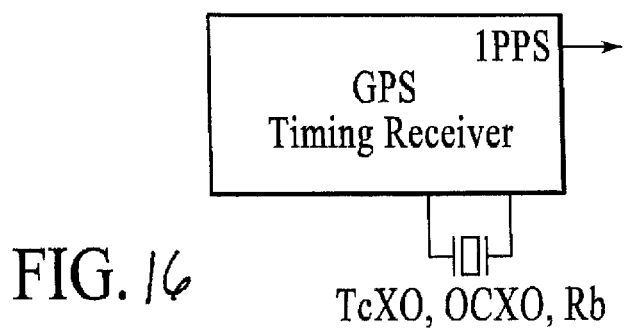
FIG. 16 is a GPS disciplined oscillator, under an embodiment.

In the autonomous synchronization mode of an embodiment, the towers are synchronized using a local timing reference. The timing reference can be one of the following, for example: GPS receivers; highly accurate clock sources (e.g., Atomic); a local time source (e.g., GPS disciplined clock); and, any other network of reliable clock sources. Use of signals from XM satellite radio, LORAN, eLORAN, TV signals etc. which are precisely time synchronized can be used as a coarse timing reference for the towers. As an example in one embodiment, FIG. 15 is a block diagram of a PPS pulse source from a GPS receiver being used to discipline an accurate/stable timing source such as a Rubidium, Caesium or a hydrogen master, under an embodiment. Alternatively, a GPS disciplined Rubidium clock oscillator can be used, as shown in FIG. 16.

With reference to FIG. 15, the time constant of the PLL in the accurate clock source is set to a large enough number (e.g., in the range of 0.5-2 hours) which provides for better short term stability (or equivalently, filtering of the short term GPS PPS variations) and the GPS-PPS provides for longer term stability and wider area 'coarse' synchronization. The transmitter system continuously monitors these two PPS pulses (from the GPS unit and from the accurate clock source) and reports any anomaly. The anomalies could be that after the two PPS sources being in lock for several hours, one of the PPS sources drifts away from the other source by a given time-threshold determined by the tower network administrator. A third local clock source can be used to detect anomalies. In case of anomalous behavior, the PPS signal which exhibits the correct behavior is chosen by the transmitter system and reported back to the monitoring station. In addition, the instantaneous time difference between the PPS input and PPS output of the accurate time source (as reported by the time source) can either be broadcast by the transmitter or can be sent to the server to be used when post processing.

Figure 17:
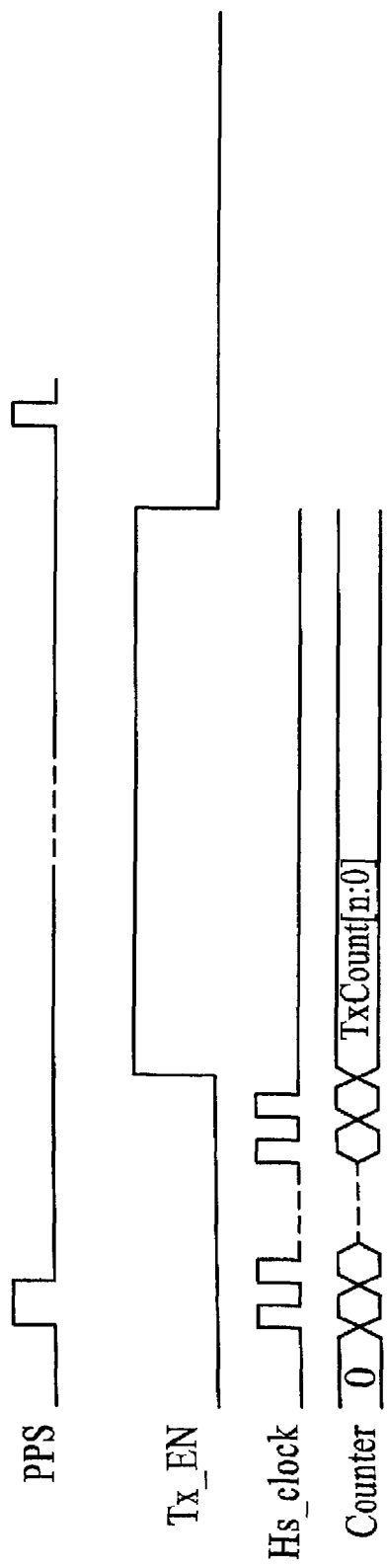
FIG. 17 shows a signal diagram for counting the time difference between the PPS and the signal that enables the analog sections of the transmitter to transmit the data, under an embodiment.

In the transmitter system, the time difference between the rising edge of the PPS pulse input and the rising edge of the signal that enables the analog sections of the transmitter to transmit the data is measured using an internally generated high speed clock. FIG. 17 shows a signal diagram for counting the time difference between the PPS and the signal that enables the analog sections of the transmitter to transmit the data, under an embodiment. The count that signifies that difference is sent to each of the receivers as a part of the data stream. Use of a highly stable clock reference such as a Rubidium clock (the clock is stable over hours/days) allows the system to store/transmit this correction per tower on the device, just in case the device cannot modulate the specific tower data anymore. This correction data can also be sent via the communication medium to the device, if there is one available. The correction data from the towers can be monitored by either reference receivers or receivers mounted on the towers that listen to other tower broadcasts and can be conveyed to a centralized server. Towers can also periodically send this count information to a centralized server which can then disseminate this information to the devices in the vicinity of those towers through a communication link to the devices. Alternatively, the server can pass the information from towers (e.g., in a locale) to neighboring towers so that this information can be broadcast as assistance information for the neighboring towers. The assistance information for neighboring towers may include position (since the towers are static) and timing correction information about towers in the vicinity.

Similar to the transmitter timing correction of an embodiment, when a true PPS is available it can be used to estimate multipath bias and precise true range. The receiver estimates range using samples of the signal, for example from the ADC. The receiver of an embodiment uses a high speed clock to determine the difference between the occurrence of the PPS and the first edge of the sample ADC clock. This allows the range estimated by the receiver based on the ADC samples to be corrected for the difference between when true PPS occurs and when the ADC samples the data, thus allowing for estimation of the true range of the receiver to a precision better than the sample clock resolution of the ADC. In the context of the discussion in the paragraph above, the PPS refers to a pulse whose edge is aligned to or has known offset from a standard timing base such as GPS pulse-per-second (PPS) timing.

Figure 18:
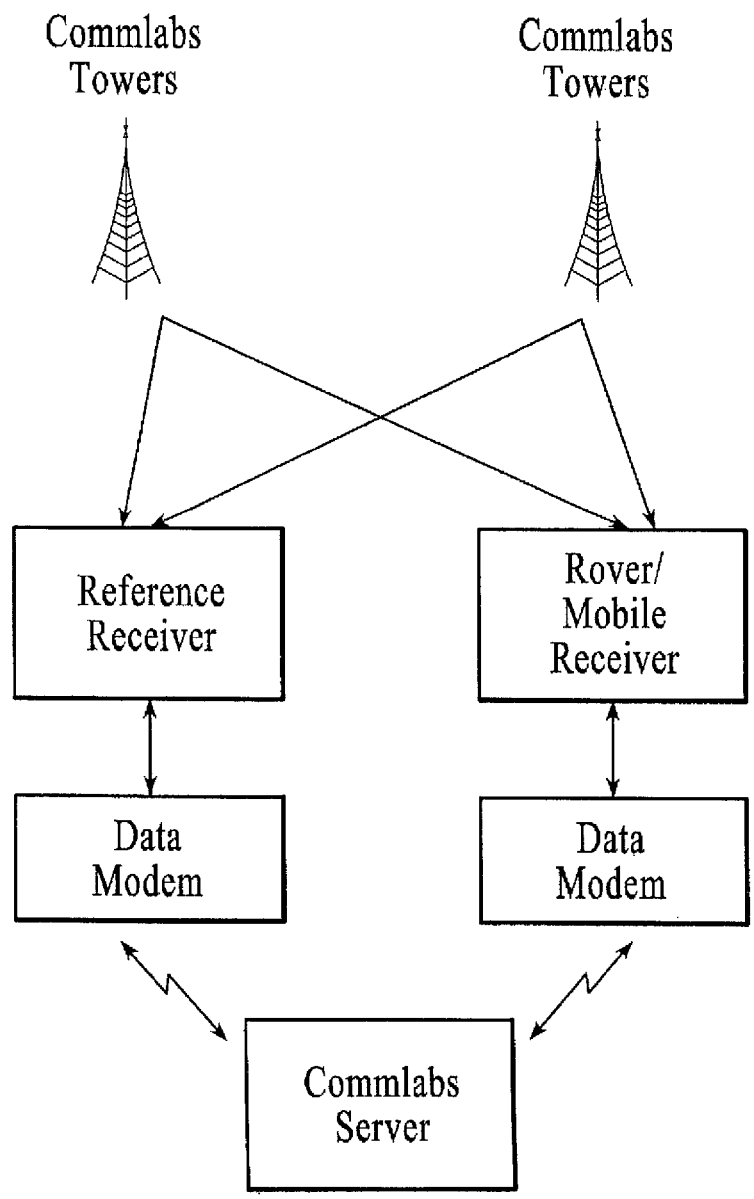
FIG. 18 is a block diagram of the differential WAPS system, under an embodiment.

In another embodiment, a wide area differential positioning system can be used to correct for timing errors from the towers. FIG. 18 is a block diagram of the differential WAPS system, under an embodiment. A reference receiver (located at a pre-surveyed location) is used to receive signals from all the towers in the vicinity. Although the principles of differential GPS are applied in this method, dealing with the effects of non-line-of-sight in the terrestrial case makes it unique. The reference receiver's pseudorange (code phase) measurements for each tower are time-tagged and then sent to the server. The received code phase-based ranges measured at the reference receiver for towers j and i can be written as follows:

$$R_{ref}^j(t) = \rho_{ref}^j + c(dt_{ref} - dt^j) + \epsilon_{R,ref}^j$$

$$R_{ref}^i(t) = \rho_{ref}^i + c(dt_{ref} - dt^i) + \epsilon_{R,ref}^i,$$

where $\rho_{ref}^j$ is the reference receiver to transmit tower j geometric range, $dt_{ref}$ and $dt^j$ are respectively the reference receiver and transmitter clock offsets referred to their respective antennas with respect to a common reference time (say, GPS time), c is the speed of light, and $\epsilon_{R,ref}^j$ is the measurement noise.

The differences in clock timing between the towers i and j, $dt^i - dt^j$ are computed at the server by subtracting the two equations above and using the known geometric ranges from reference receiver to the transmit towers. This allows for elimination of the timing differences between the transmitters in the rover/mobile station measurements. Note that averaging over time can be used to get better (e.g., less noisy) estimates of the time difference $dt^i - dt^j$ when the clocks used in the transmit towers are relatively stable.

The rover/mobile station's pseudorange measurements are also time tagged and sent to a server. The received code phase based ranges measured at the rover/mobile station can be written as:

$$R_m^i(t) = \rho_m^i + c(dt_m - dt^i) + \epsilon_{R,m}^i$$

$$R_m^j(t) = \rho_m^j + c(dt_m - dt^j) + \epsilon_{R,m}^j.$$

By subtracting the two equations above and re-arranging, the result is $$(\rho_m^j - \rho_m^i) = (R_m^j(t) - R_m^i(t)) - c(dt^i - dt^j) + (\epsilon_{R,m}^i - \epsilon_{R,m}^j).$$

Note that $R_m^j(t)$ and $R_m^i(t)$ are measured quantities and the quantity $dt^i - dt^j$ is computed from the reference receiver measurements. Each of $\rho_{ref}^j$ and $\rho_{ref}^j$ can be written in terms of the unknown coordinates of the receiver and the known coordinates of the transmit towers i and j. With three range measurements, two range difference equations can be formed as above to obtain a two-dimensional position solution or with four range measurements, three range difference equations can be formed as above to obtain a three-dimensional position. With additional measurements, a least square solution can be used to minimize the effect of the noise quantities $\epsilon_{R,m}^i$ and $\epsilon_{R,m}^j$.

Alternatively, the timing difference corrections can be sent back to the mobile station to correct for the errors in-situ and to facilitate position computation at the mobile station. The differential correction can be applied for as many transmitters as can be viewed by both the reference and the mobile stations. This method can conceptually allow the system to operate without tower synchronization or alternatively to correct for any residual clock errors in a loosely synchronized system.

Another approach is a standalone timing approach as opposed to the differential approach above. One way of establishing timing synchronization is by having GPS timing receivers at each Transmit tower in a specific area receive DGPS corrections from a DGPS reference receiver in the same area. A DGPS reference receiver installed at a known position considers its own clock as a reference clock and finds corrections to pseudo-range measurements to the GPS satellites it tracks. The DGPS correction for a particular GPS satellite typically comprises total error due to satellite position and clock errors and ionospheric and tropospheric delays. This total error would be the same for any pseudo-range measurement made by other GPS receivers in the neighborhood of the DGPS reference receiver (typically with an area of about 100 Km radius with the DGPS receiver at the center) because line of sight between DGPS reference receiver and GPS satellite does not change much in direction within this neighborhood. Thus, a GPS receiver using DGPS correction transmitted by a DGPS reference receiver for a particular GPS satellite uses the correction to remove this total error from its pseudo-range measurement for that satellite. However in the process it would add the DGPS reference receiver's clock bias with respect to GPS time to its pseudo-range measurement. But, since this clock bias is common for all DGPS pseudo-range corrections, its effect on the timing solutions of different GPS receivers would be a common bias. But this common bias gives no relative timing errors in the timings of different GPS receivers. In particular, if these GPS receivers are timing GPS receivers (at known positions) then all of them get synced to the clock of DGPS reference receiver. When these GPS timing receivers drive different transmitters, the transmissions also get synchronized.

Instead of using corrections from a DGPS reference receiver, similar corrections transmitted by Wide Area Augmentation System (WAAS) satellites can be used by GPS timing receivers to synchronize transmissions of the transmitters which they drive. An advantage of WAAS is that the reference time is not that of the DGPS reference system but it is the GPS time itself as maintained by the set of accurate atomic clocks.

Figure 19:
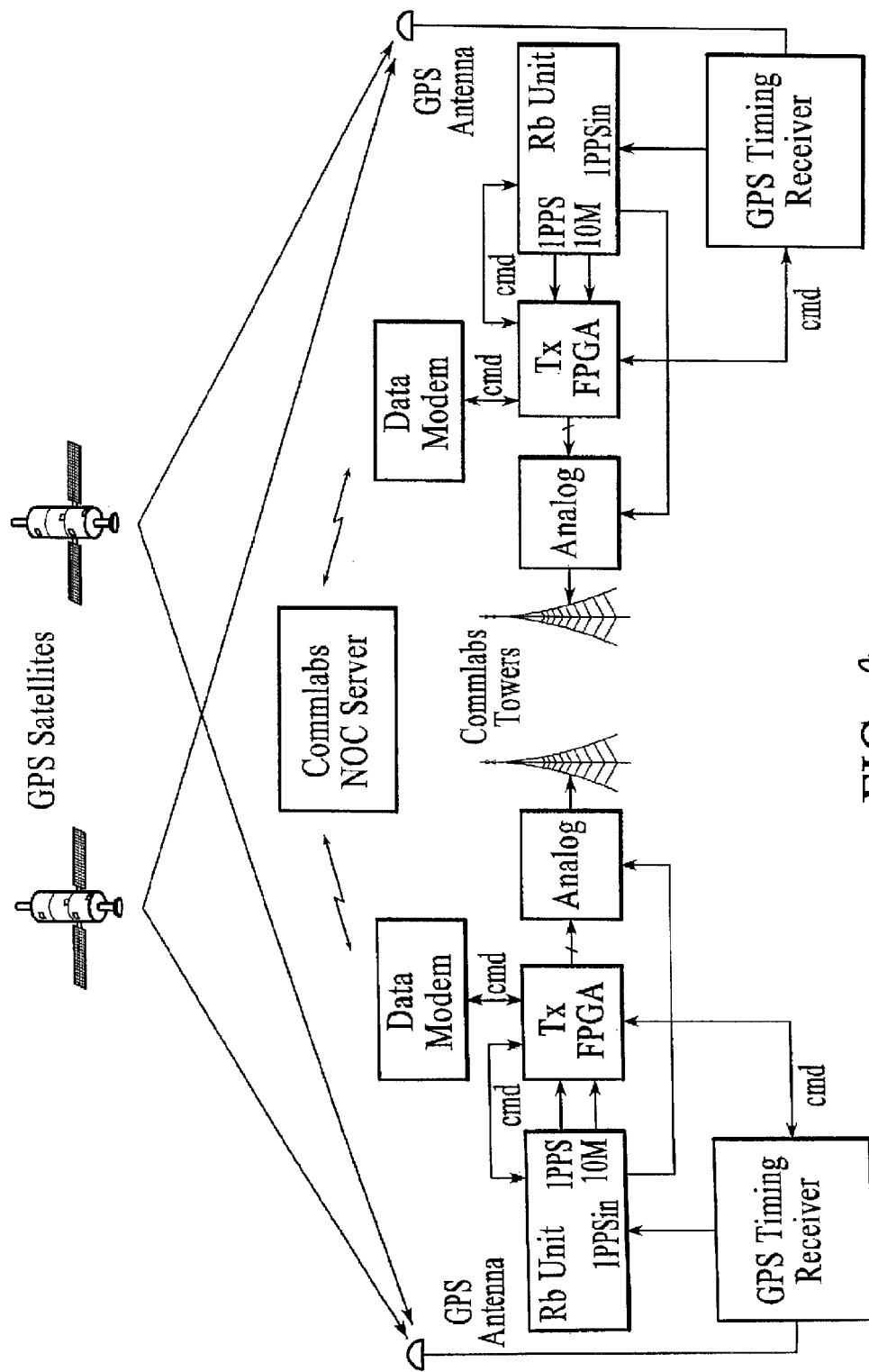
FIG. 19 shows common view time transfer, under an embodiment.

Another approach to achieving accurate time synchronization between the towers across a wide area is to use time transfer techniques to establish timing between pairs of towers. One technique that can be applied is referred to as "common view time transfer". FIG. 19 shows common view time transfer, under an embodiment. The GPS receivers in the transmitters that have the view of a common satellite are used for this purpose. Code phase and/or carrier phase measurements from each of the towers for the satellites that are in common view are time tagged periodically (e.g., minimum of once every second) by the GPS receivers and sent to a server where these measurements are analyzed.

The GPS code observable $R_p^i$ (signal emitted by satellite "i" and observed by a receiver "p") can be written as:

$$R_p^i(t) = \rho_p^i + c(\delta_R^i + \delta_{R,p} + T_p^i + I_p^i) + c(dt_p - dt^i) + \epsilon_{R,p},$$

where $\rho_p^i$, is the receiver-satellite geometric range equal to $|\vec{X}_p - \vec{X}^i|$, $\vec{X}_p$ is the receiver antenna position at signal reception time, $\vec{X}^i$ represents the satellite position at signal emission time, $I_p^i$ and $T_p^i$ are respectively the ionospheric and tropospheric delays, and $\delta_{R_p}$ and $\delta_R^i$ are the receiver and satellite hardware group delays. The variable $\delta_{R_p}$ includes the effect of the delays within the antenna, the cable connecting it to the receiver, and the receiver itself. Further, $dt_p$ and $dt^i$ are respectively the receiver and satellite clock offsets with respect to GPS time, c is the speed of light, and $\epsilon_R$ is the measurement noise.

The common view time transfer method computes the single difference code observable $R_{pq}^i$, which is the difference between code observables simultaneously measured at two receivers (called "p" and "q") as $$R_{pq}^i = \underbrace{\rho_p^i - \rho_q^i}_{\text{geometrical range difference}} + \underbrace{c(dt_p - dt_q)}_{\text{time difference between clocks}} +$$
$$\underbrace{c(T_p^i - T_q^i) + c(I_p^i - I_q^i)}_{\text{Troposhpere \& Ionosphere delay difference}} + \underbrace{c(\delta_{R,p} - \delta_{R,q})}_{\text{Group delay difference between receivers}} + (\epsilon_{R,p} - \epsilon_{R,q})$$

In calculating the single difference observable, the group delay in the satellite as well as the clock error of the satellite gets cancelled. Also, note that in the above equation the tropospheric and ionospheric perturbations cancel (or, can be modeled, for example in cases where the receiver separation is large). Once the group delay differences between the receivers are calibrated, the desired time difference $c(dt_p - dt_q)$ between the receiver clocks can be found from the equation. The single difference across multiple time and satellite measurements can be combined to further improve the quality of the estimated time difference.

In a similar manner, the single difference carrier phase equation for common view time transfer can be written as:

$$\Phi_{pq}^i = \underbrace{\rho_p^i - \rho_q^i}_{\text{geometrical range difference}} + \underbrace{c(dt_p - dt_q)}_{\text{time difference between clocks}} + \underbrace{c(T_p^i - T_q^i) + c(I_p^i - I_q^i)}_{\text{Troposhpere \& Ionosphere delay difference}} +$$
$$\underbrace{c(\delta_{\phi,p} - \delta_{\phi,q})}_{\text{Group delay difference between receivers}} + \underbrace{\lambda(\phi_p^i - \phi_q^i)}_{\text{initial ambiguity in phase}} + \underbrace{\lambda(N_p^i - N_q^i)}_{\text{integer ambiguity in phase measurement}} + (\epsilon_{\phi,p} - \epsilon_{\phi,q}).$$

Note that since initial phase ambiguity and integer ambiguity are present in the above equation, the phase single difference cannot be used to determine the time transfer directly. A combined use of the code and phase observations allows for advantage to be taken of the absolute information about time difference from the codes and the precise information about the evolution of time difference from the carrier phases. The error variance in the carrier phase single difference is significantly better than the code phase single difference leading to better time transfer tracking.

The resulting errors per tower for a given satellite are either sent back to the tower for correction, applied at the tower, sent to the receivers over the communication link for the additional corrections to be done by the receiver, or sent as a broadcast message along with other timing corrections from the tower. In specific instances, it might be such that the measurements from the towers and the receiver are post-processed on the server for better location accuracy. A single channel GPS timing receiver or a multiple channel timing receiver that produces C/A code measurements and/or carrier phase measurements from L1 and/or L2 or from other satellite systems such as Galileo/Glonass can be used for this purpose of common view time transfer. In multiple channel systems, information from multiple satellites in common view are captured at the same instant by the receivers.

An alternative mechanism in "common view time transfer" is to ensure that different timing GPS receivers in the local area (each feeding to its corresponding transmitter) use only common satellites in their timing pulse derivation (e.g., one pulse per second) but no attempt is made to correct the timing pulses to be aligned to the GPS (or UTC) second. The use of common view satellites ensure that common errors in timing pulses (such as common GPS satellite position and clock errors and ionospheric and tropospheric delay compensation errors) pull the errors in timing pulse by about same magnitude and relative errors in timing pulses are reduced. Since, in positioning, only relative timing errors matter, there is no need for any server-based timing error correction. However, a server can give commands to different GPS receivers on which GPS satellites are to be used in deriving timing pulses.

Figure 20:
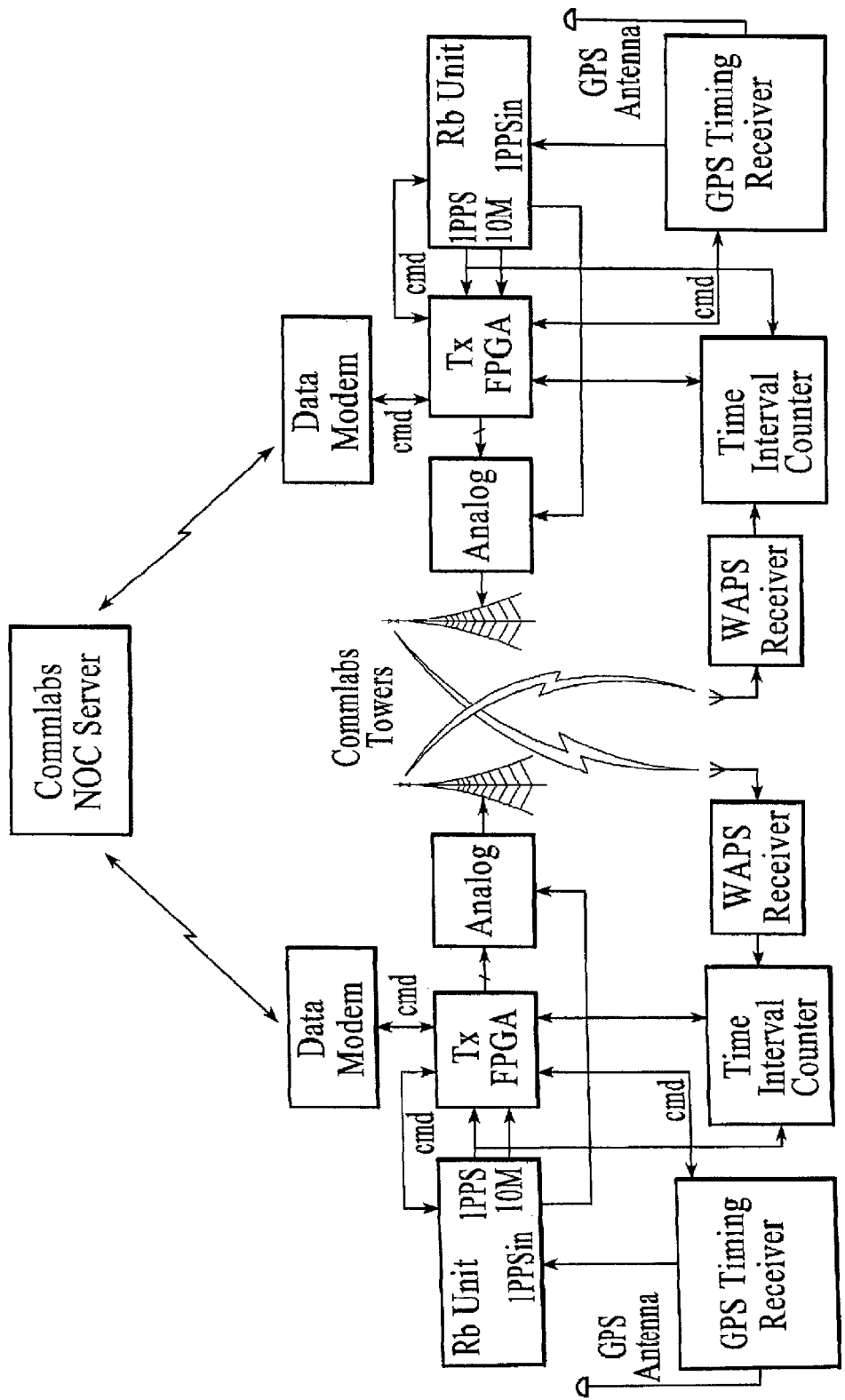
FIG. 20 shows the two-way time transfer, under an embodiment.

An alternative method of time transfer is the "two-way time transfer" technique. FIG. 20 shows the two-way time transfer, under an embodiment. Consider two towers that are used to time against each other. Transmissions from each of the two transmitters starts on the PPS pulse and a time interval counter is started on the receive section (WAPS Receiver) of the transmit towers. The received signal is used to stop the time interval counter on either side. The results from the time interval counter are sent over the data modem link to the WAPS server where these results along with transmit times are compared and the errors in timing between the two towers can be computed. This can then be extended to any number of towers. In this method, the relationship between the counter measurements $\Delta T_i$ at tower i and $\Delta T_j$ at tower j, and the time difference $dt_{ij}$ between the clock in i and j can be represented as $$dt_{ij} = T_i - T_j = \frac{1}{2}(\Delta T_i - \Delta T_j) + \frac{1}{2}[(\tau_i^{Tx} + \tau_j^{Rx}) - (\tau_j^{Tx} + \tau_i^{Rx})],$$

where $\tau_i^{Tx}$ & $\tau_j^{Tx}$ are the transmitter delays of the towers, and $\tau_i^{Rx}$ & $\tau_j^{Rx}$ are the receiver delays of towers. The time difference can be estimated once the transmitter and receiver delays are calibrated.

In addition to the time transfer between towers, the timing of the towers relative to GPS time can be found by the GPS timing receivers used in common view time transfer. Using the range measurement as $$R_p^i(t) = \rho_p^i + c(\delta_R^i + \delta_{R,p} + T_p^i + I_p^i) + c(dt_p - dt^i) + \epsilon_{R,p},$$

the time correction of local clock relative to GPS time $dt_p$ is computed, after accounting for the delay of the receiver, satellite clock errors and ionospheric/tropospheric errors. The delay of the receiver $\delta_{R,p}$ can be calibrated by measurement of the group delay. Information from the GPS satellite navigation message (either obtained through demodulation or from a server) can be used to compute the satellite timing correction which eliminates the effect of $dt^i$ and $\delta_R^i$. Similarly, troposphere and ionosphere delay effects are minimized using the corrections from an external model. Ionospheric corrections can be obtained for example from WAAS messages. Alternatively, a combination of clock and ionospheric/tropospheric corrections can be obtained from RTCM DGPS corrections for the pseudorange, when available.

The offset relative to GPS time can also be sent as part of the data stream from the towers. This enables any WAPS receiver that acquires the WAPS signal to provide accurate GPS time and frequency aiding to significantly reduce GNSS search requirements in a GNSS receiver.

In an embodiment of the system, the broadcast transmitters can be employed ad hoc to provide localized indoor position determination. For example, in a fire-safety application, the WAPS transmitters would be placed on three or more broadcast stations (could be fire trucks, for example). The towers would synchronize to each other by one of the many means described earlier and broadcast signals. The bandwidth and chipping rates would be scaled based on spectrum availability and accuracy requirements in that area for that application at that time. The receivers would be notified of the system parameters through the communication link to the devices.

Figure 21:
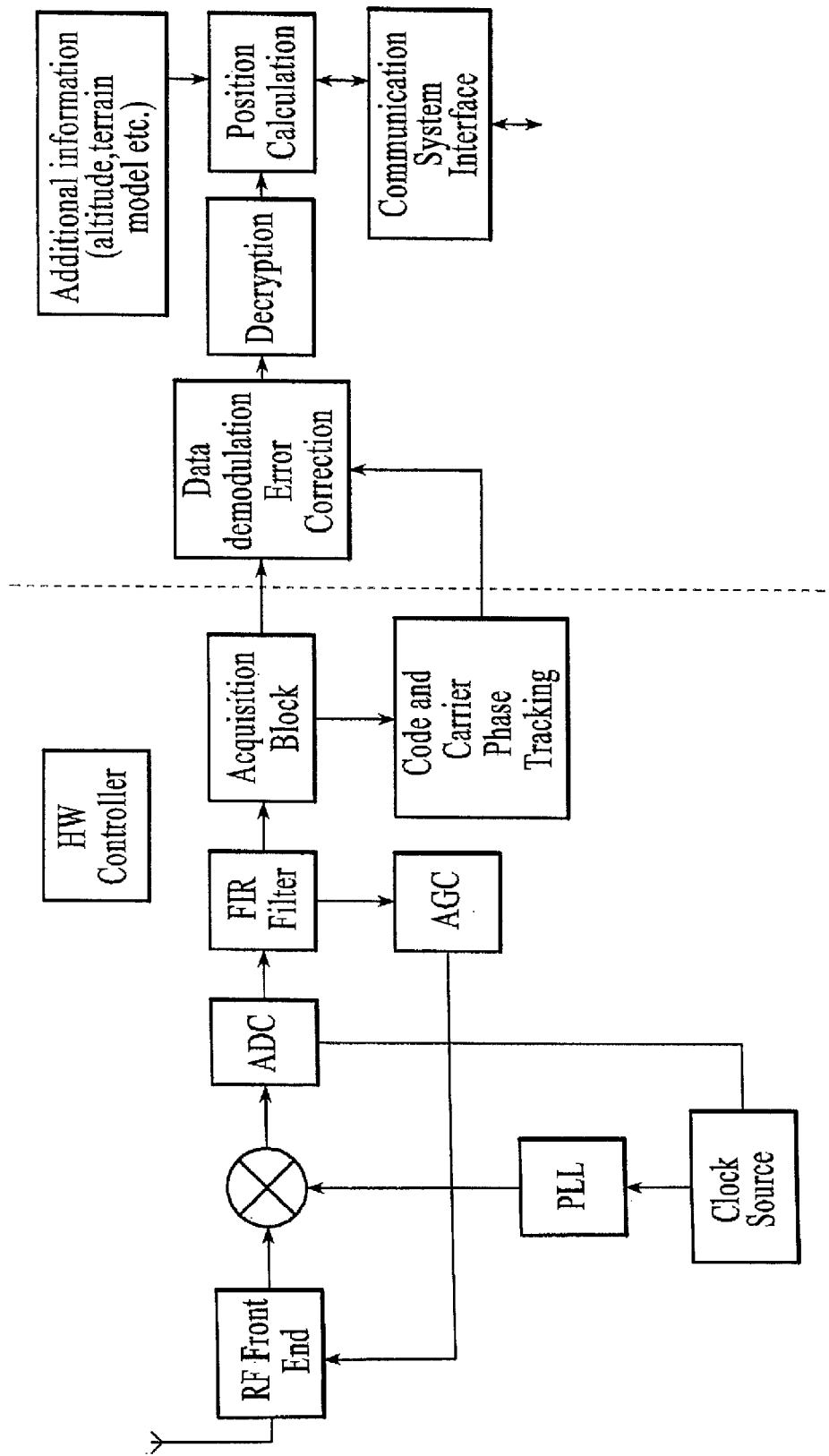
FIG. 21 is a block diagram of a receiver unit, under an embodiment.

FIG. 21 is a block diagram of a receiver unit, under an embodiment. The beacon signal is received at the antenna on the receiver unit, down-converted, demodulated and decrypted and fed to the positioning engine. The receiver provides all information to reconstruct the signal accurately. The receive antenna can be an omni-directional antenna or, alternatively, a number of antennas/arrays providing diversity etc. In another embodiment, the mixing and down conversion can be done in the digital domain. Each receiver unit includes or uses a unique hardware identification number and a computer generated private key. Each receiver unit, in general, stores the last few locations in non volatile memory and can be later queried remotely for the last few stored locations. Based on the availability of the spectrum in a given area, the transmitters and receivers can adapt to the available bandwidth and change the chipping rate and filter bandwidths for better accuracy and multipath resolution.

Figure 22:
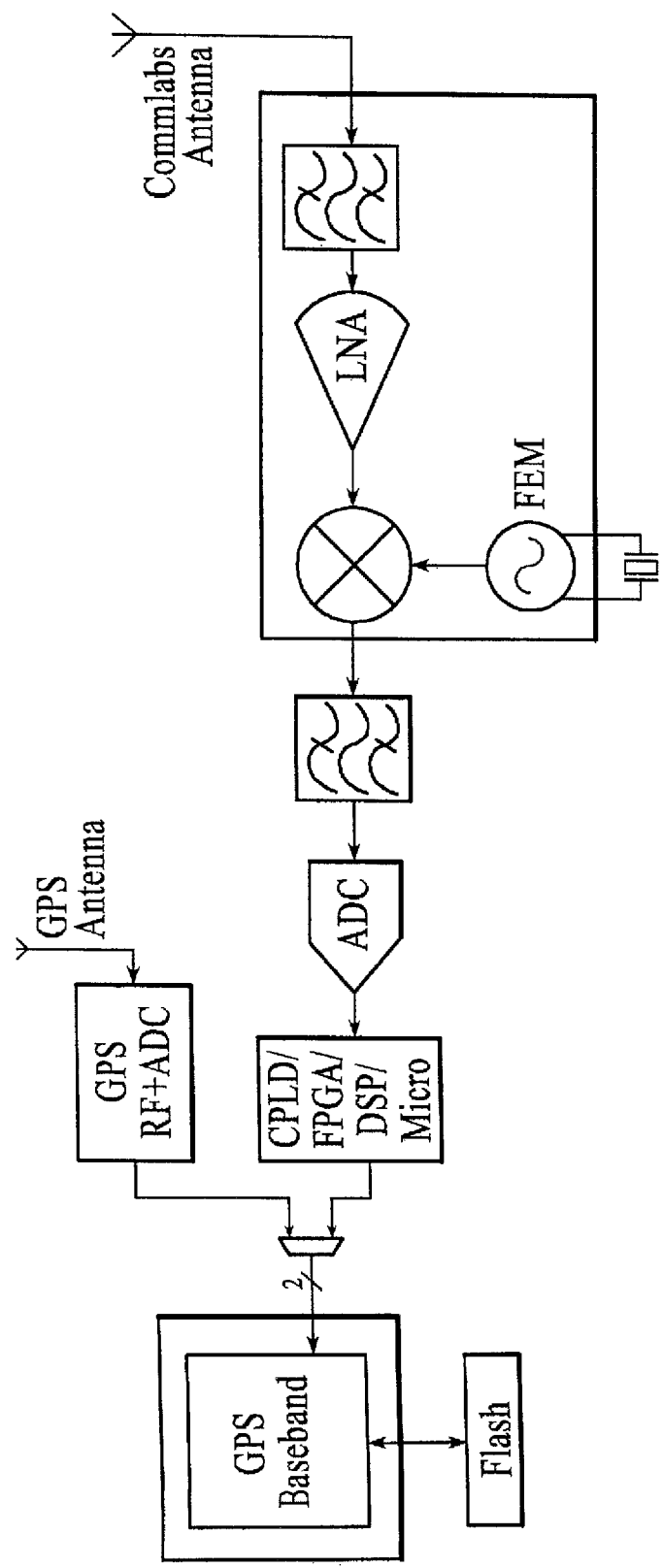
FIG. 22 is a block diagram of an RF module, under an embodiment.

In one embodiment, the digital baseband processing of the received signals is accomplished using commercially-available GPS receivers by multiplexing/feeding the signal from a GPS RF section with the WAPS RF module. FIG. 22 is a block diagram of the receiver with a WAPS RF module, under an embodiment. The RF module includes one or more of Low noise amplifiers (LNAs), filters, down-converter, and analog to digital converters, to name a few. In addition to these components, the signal can be further conditioned to fit the input requirements of the GPS receiver using additional processing on chip or a custom ASIC or on an FPGA or on a DSP or on a microprocessor. The signal conditioning can include digital filtering for in-band or out-of band noise (such as ACI—adjacent channel interference), translating intermediate or baseband frequencies of the input to the GPS IC from the frequencies of the WAPS receiver, adjusting the digital signal strength so that the GPS IC will be able to process the WAPS signal, automatic gain control (AGC) algorithms to control the WAPS frontend etc. In particular, the frequency translation is a very useful feature because this allows the WAPS RF module to work with any commercially available GPS receiver. In another embodiment, the entire RF frontend chain including the signal conditioning circuits for the WAPS subsystem can be integrated onto an existing GPS die that contains a GPS RF chain.

Figure 23:
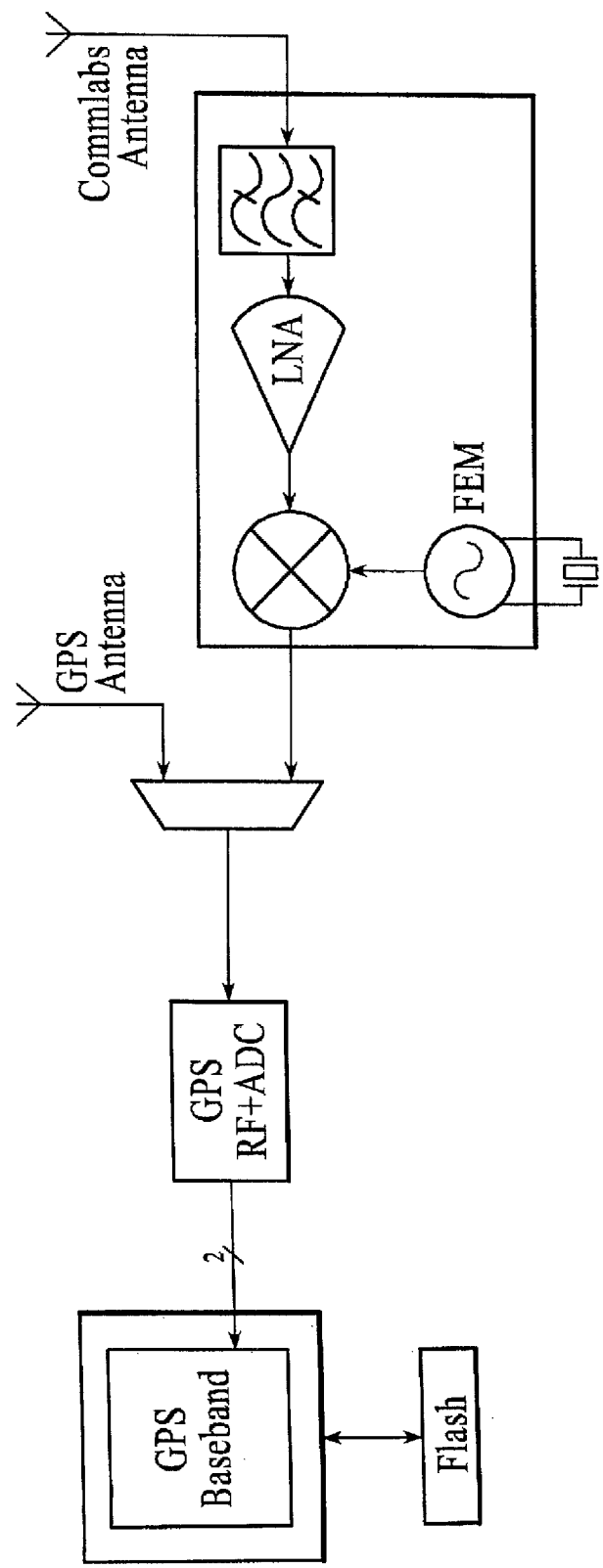
FIG. 23 shows signal up-conversion and/or down-conversion, under an embodiment.

In another embodiment, if access to the digital baseband input is not available, the signal can be up-converted/down-converted from any band to the GPS band and fed into the RF section of the GPS receiver. FIG. 23 shows signal up-conversion and/or down-conversion, under an embodiment.

In another embodiment, multiple RF chains or tunable RF chains can be added to both the transmitter and receiver of the WAPS system so as to use the most effective frequency of operation in a given area, be it wide or local. The choice of frequency can be determined by cleanliness of the spectrum, propagation requirements, etc.

Figure 24:
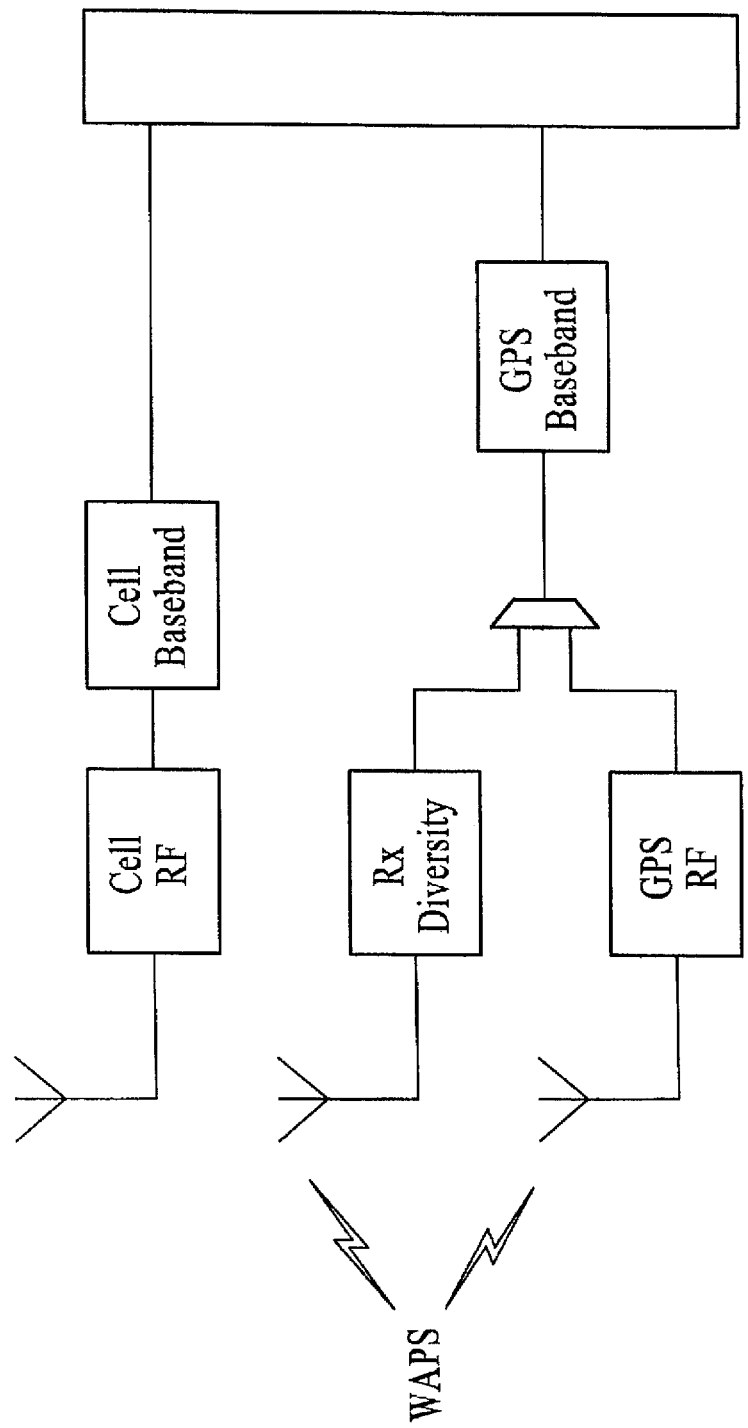
FIG. 24 is a block diagram of a receiver system having multiple receive chains in which one of the receive chains can be used temporarily for receiving and processing WAPS signals, under an embodiment.

Similarly, WAPS can temporarily use a receive chain in a receiver system that includes multiple receive chains. For example, a wideband CDMA (W-CDMA) receiver system includes two receive chains to improve receive diversity. Thus, when WAPS is used in a W-CDMA receiver system one of the two native receive chains of the W-CDMA can be used temporarily for receiving and processing WAPS signals. FIG. 24 is a block diagram of a receiver system having multiple receive chains in which one of the receive chains can be used temporarily for receiving and processing WAPS signals, under an embodiment. In this example, the diversity receive chain can be used to temporarily receive and process the WAPS signals. Alternatively, the GPS receive chain can be used to temporarily receive and process the WAPS signals.

The radio front-end can be shared between WAPS and another application. Some parts of the frontend can be shared and some may be used on a mutually exclusive basis. For example, if the die/system already has a TV (NTSC or ATSC or systems like DVB-H, MediaFLO) tuner front-end including the antenna, the TV tuner radio and antenna can be shared with the WAPS system. They can operate on a mutually exclusive basis in that, either the system receives TV signals or receives WAPS signals at any given time. In another embodiment, if it makes it easier to add a WAPS RF section to such a system, the antenna can be shared between the TV tuner and the WAPS system allowing both systems to operate simultaneously. In cases where the system/die has a radio like an FM radio, the RF front-end can be modified to accommodate both the WAPS system and the FM radio and these radios can operate on a mutually exclusive basis. Similar modifications can be done for systems that have some RF frontends that operate in close frequency proximity to the WAPS RF band.

Figure 25:
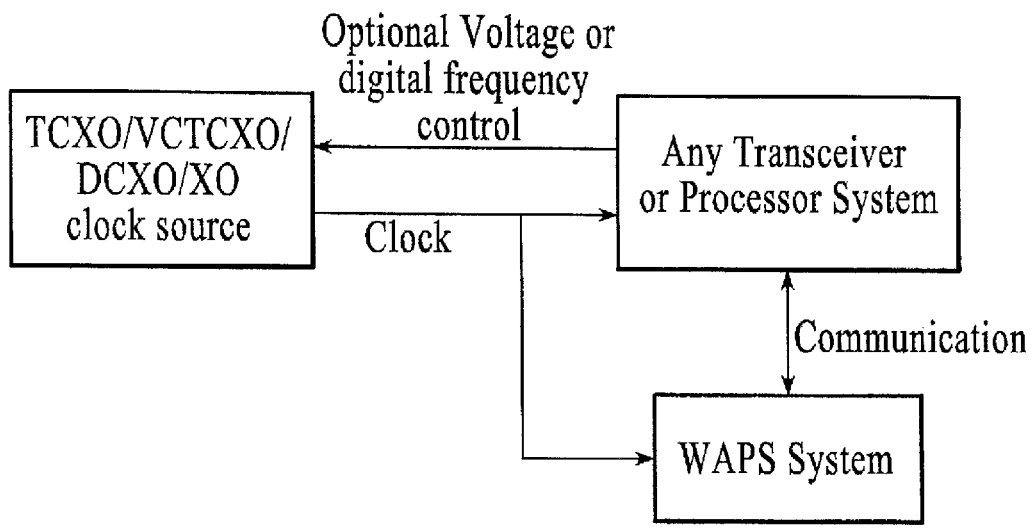
FIG. 25 is a block diagram showing clock sharing in a positioning system, under an embodiment.

The clock source reference such as crystal, crystal oscillator (XO), Voltage Controlled Temperature Compensated Crystal Oscillator (VCTCXO), Digitally-controlled Crystal Oscillator (DCXO), Temperature Compensated Crystal Oscillator (TCXO), that is used for a GNSS sub-system can be shared with the WAPS receiver to provide the reference clock to the WAPS receiver. This sharing can be done on the die or off-chip. Alternatively, the TCXO/VCTCXO used by any other system on a cellular phone can shared with the WAPS system. FIG. 25 is a block diagram showing clock sharing in a positioning system, under an embodiment. Note that the transceiver or processor system block can refer to a variety of systems. The transceiver system that shares the clock with the WAPS system can be a modem transceiver (for example, a cellular or WLAN or BT modem) or a receiver (for example, a GNSS, FM or DTV receiver). These transceiver systems may optionally control the VCTCXO or DCXO for frequency control. Note that the transceiver system and the WAPS system may be integrated into a single die or may be separate dies and does not impact the clock sharing. The processor can be any CPU system (such as an ARM subsystem, Digital Signal Processor system) that uses a clock source. In general, when a VCTCXO/DCXO is shared, the frequency correction applied by the other system may be slowed down as much as possible to facilitate WAPS operation. Specifically, the frequency updates within the maximum integration times being used in WAPS receiver may be limited to permit better performance (i.e. minimizing SNR loss) for the WAPS receiver. Information regarding the state of the WAPS receiver (specifically, the level of integration being used, acquisition versus tracking state of the WAPS system) can be exchanged with the other system for better coordination of the frequency updates. For example, frequency updates could be suspended during WAPS acquisition phase or frequency updates can be scheduled when the WAPS receiver is in sleep state. The communication could be in the form of control signals or alternatively in the form of messages exchanged between the transceiver system and the WAPS system.

The WAPS broadcasts signals and messages from the towers in such a way that a conventional GPS receiver's baseband hardware need not be modified to support both a WAPS and a traditional GPS system. The significance of this lies in the fact that although the WAPS system has only half the available bandwidth as the GPS C/A code system (which affects the chip rate), the WAPS broadcast signal is configured to operate within the bounds of a commercial grade C/A code GPS receiver. Further, based on signal availability, the algorithms will decide whether GPS signals should be used to determine position or WAPS signals or a combination thereof should be used to get the most accurate location.

The data transmitted on top of the gold codes on the WAPS system can be used to send assistance information for GNSS in the cases of a hybrid GNSS-WAPS usage scenario. The assistance can be in the form of SV orbit parameters (for example, ephemeris and almanac). The assistance may also be specialized to SVs visible in the local area.

In addition, the timing information obtained from the WAPS system can be used as fine time aiding for the GNSS system. Since the WAPS system timing is aligned to GPS (or GNSS) time, aligning to the code and bit of WAPS signal and reading the data stream from any tower provides coarse knowledge of GNSS time. In addition, the position solution (the receiver's clock bias is a by-product of the position solution) determines the WAPS system time accurately. Once the WAPS system time is known, fine time aiding can be provided to the GNSS receiver. The timing information can be transferred using a single hardware signal pulse whose edge is tied to the internal time base of WAPS. Note that the WAPS system time is directly mapped onto GPS time (more generally, with GNSS time, since the time bases of GNSS systems are directly related). The GNSS should be able to latch its internal GNSS time base count upon receipt of this edge. Alternatively, the GNSS system should be able to generate a pulse whose edge is aligned to its internal time base and the WAPS system should be capable of latching its internal WAPS time base. The WAPS receiver then sends a message with this information to the GNSS receiver allowing the GNSS receiver to map its time base to WAPS time base.

Similarly, the frequency estimate for the local clock can be used to provide frequency aiding to the GNSS receiver. Note that frequency estimate from WAPS receiver can be used to refine the frequency estimate of the GNSS receiver whether or not they share a common clock. When the two receivers have a separate clock, an additional calibration hardware or software block is required to measure the clock frequency of one system against the other. The hardware or software block can be in the WAPS Receiver section or in the GNSS receiver section. Then, the frequency estimate from the WAPS receiver can be used to refine the frequency estimate of the GNSS receiver.

Figure 26:
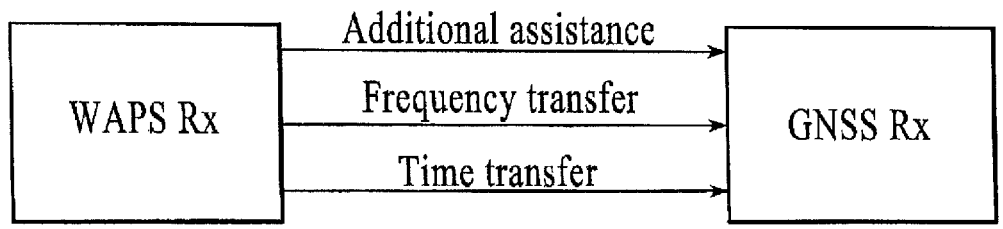
FIG. 26 is a block diagram of assistance transfer from WAPS to GNSS receiver, under an embodiment.

The information that can be sent from the WAPS system to the GNSS system can also include an estimate of location. The estimate of location may be approximate (for example, determined by the PN code of the WAPS tower) or more accurate based on an actual position estimate in the WAPS system. Note that the location estimate available from the WAPS system may be combined with another estimate of position from a different system (for example, a coarse position estimate from cellular ID based positioning) to provide a more accurate estimate of position that can be used to better aid the GNSS system. FIG. 26 is a block diagram of assistance transfer from WAPS to GNSS receiver, under an embodiment.

Figure 27:
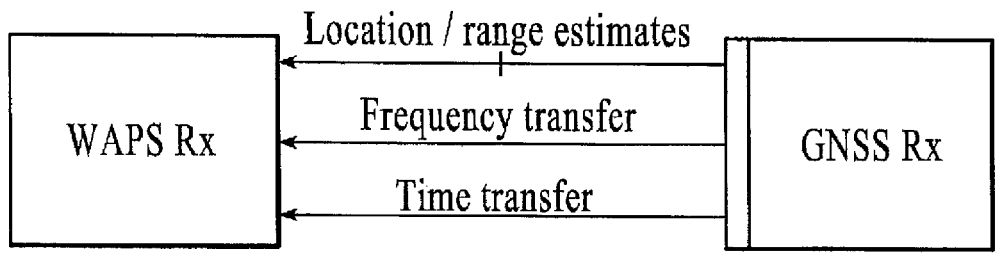
FIG. 27 is a block diagram showing transfer of aiding information from the GNSS receiver to the WAPS receiver, under an embodiment.

The GNSS receiver can also help improve the performance of the WAPS receiver in terms of Time-To-First-Fix (TTFF), sensitivity and location quality by providing location, frequency and GNSS time estimates to the WAPS receiver. As an example, FIG. 27 is a block diagram showing transfer of aiding information from the GNSS receiver to the WAPS receiver, under an embodiment. Note that the GNSS system can be replaced by LORAN, e-LORAN or similar terrestrial positioning system as well. The location estimate can be partial (e.g. Altitude or 2-D position), or complete (e.g. 3-D position) or raw range/pseudo-range data). The range/pseudo-range data should be provided along with the location of SV (or means to compute the location of the SV such as SV orbit parameters) to enable usage of this range information in a hybrid solution. All location aiding information should be provided along with a metric indicating its quality. When providing GNSS time information (which may be transferred to the WAPS system using a hardware signal), the offset of GNSS time relative to GPS time (if any) should be provided to enable usage in the WAPS receiver. Frequency estimates, can be provided as an estimate of the clock frequency along with a confidence metric (indicating the estimated quality of the estimate, for example, the maximum expected error in the estimate). This is sufficient when the GNSS and WAPS systems share the same clock source. When the GNSS and WAPS systems use a separate clock, the GNSS clock should also be provided to the WAPS system to enable the WAPS system to calibrate (i.e. estimate the relative clock bias of WAPS with respect to GNSS clock) or, alternatively, the WAPS system should provide its clock to the GNSS system and the GNSS system should provide a calibration estimate (i.e. an estimate the relative clock bias of WAPS with respect to GNSS clock).

Figure 28:
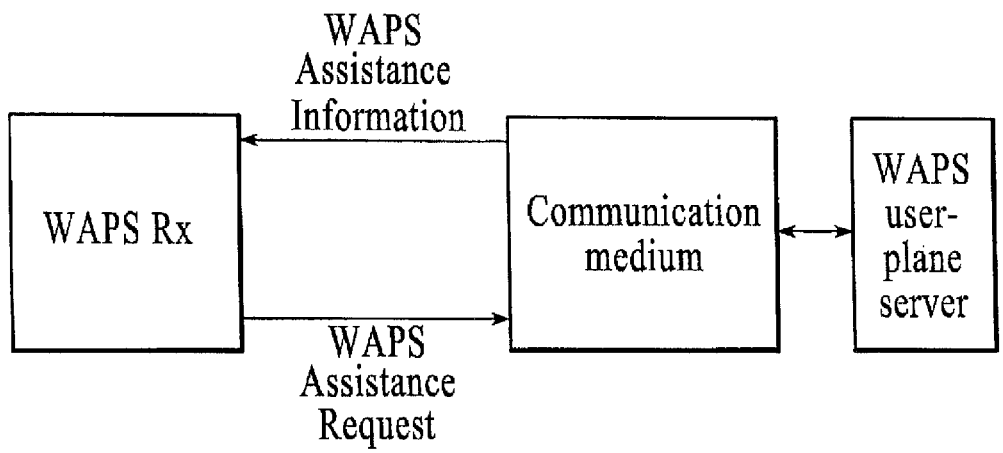
FIG. 28 is an example configuration in which WAPS assistance information is provided from a WAPS server, under an embodiment.

To further improve the sensitivity and TTFF of a WAPS receiver, assistance information (such as that would otherwise be decoded from the information transmitted by the towers) can be provided to the WAPS receiver from a WAPS server by other communication media (such as cellular phone, WiFi, SMS etc). With the "almanac" information already available, the WAPS receiver's job becomes simple since the receiver just needs to time align to the transmit waveform (without requirement of bit alignment or decoding). The elimination of the need to decode the data bits reduces TTFF and therefore saves power since the receiver does not need to be continuously powered on to decode all the bits. FIG. 28 is an example configuration in which WAPS assistance information is provided from a WAPS server, under an embodiment.

A beacon may be added to the receiver to further improve local positioning. The beacon can include a low power RF transmitter that periodically transmits a waveform with a signature based on a device ID. For example, the signature can be a code that uniquely identifies the transmitter. An associated receiver would be able to find a location of the transmitter with a relatively higher accuracy through either signal energy peak finding as it scans in all directions, or through direction finding (using signals from multiple-antenna elements to determine direction of signal arrival).

Resolution of Multipath Signals

Resolution of multipath is critical in positioning systems. Wireless channel is often characterized by a set of randomly varying multipath components with random phases and amplitudes. For positioning to be accurate, it is imperative that the receiver algorithm resolves the line-of-sight (LOS) path if present (it will be the first arriving path) or the path that arrives first (which may not necessarily be the LOS component).

Traditional methods often work as follows: (1) the received signal is cross-correlated with the transmitted pseudo-random sequence (e.g. Gold code sequence, which is known at the receiver); (2) the receiver locates the first peak of the resulting cross-correlation function and estimates that the timing of the path that arrived first is the same as the timing indicated by the position of this peak. These methods work effectively as long as the lowest multipath separation is much larger than inverse of the bandwidth available which is often not the case. Bandwidth is a precious commodity and a method which can resolve multipath with the minimal amount of bandwidth is highly desired to improve the efficiency of the system.

Depending on the channel environment (including multipath and signal strength), an appropriate method for obtaining an estimate of the earliest arriving path is used. For best resolvability, high-resolution methods are used whereas for reasonable performance at low SNRs more traditional methods that directly use the cross-correlation peak samples and some properties of the correlation function around the peak are applied.

Consider the quantized received signal y[n] sampled at a rate $f_s$ given by:

$$y[n] = h_{eff}[n] \otimes x[n]$$

$$y[n] = \sum_{i=n_0}^{\infty} h_{eff}[i] \cdot x[n-i]$$

where y[n] is the received signal which is the convolution of the transmitted pseudo-random sequence x[n] with the effective channel $h_{eff}[n]=h[n] \otimes h_{tx}[n] \otimes h_{rx}[n]$, where $h_{tx}[n]$ is the transmit filter, $h_{rx}[n]$ is the receive filter and h[n] is the multipath channel.

One method to find the peak position is by peak interpolation using the values surrounding the apparent peak position. The interpolation may be quadratic using one value on either side of the peak or may use a higher order polynomial using two or more samples around the peak or may use a best fit for the actual pulse shape. In the case of quadratic interpolation, a quadratic is fitted to the peak value and the values immediately surrounding the peak. The peak of the quadratic determines the peak position that is used for ranging. This method is quite robust and can work well at low SNR.

An alternative embodiment may use a value other than the peak position as the reference position. Note that the DLL actually uses the peak position as reference position on the correlation function whereas this method uses a point different from the peak as reference. This method is motivated by the fact that the early edge of the correlation peak is less affected by multi-path than the trailing edge. For example, a point 75% of chip $T_c$ from the peak on the undistorted (without channel effects) correlation function may be used as a reference point. In this case, the portion of the interpolated z[n] function that matches this 75% point is selected and the peak is found as 25% of $T_c$ away from this point. Another alternative peak correlation function based method may use the peak shape (such as a measure of distortion of the peak, for example, peak width). Starting from the peak location and based on the shape of the peak, a correction to the peak location is determined to estimate the earliest arriving path.

High-resolution methods are a class of efficient multipath-resolution methods which use Eigen-space decompositions to locate the multipath components. Methods such as MUSIC, ESPIRIT fall under this class of resolution schemes. They are highly powerful schemes as in they can resolve effectively much more closely spaced multipath components than traditional methods, for the same given bandwidth. The high resolution earliest time of arrival method attempts to estimate directly the time of arrival of earliest path rather than inferring the peak position from the peak values. The below assumes that a coarse-acquisition of the transmitted signal is already available at the receiver and the start of the pseudo-random sequence is known roughly at the receiver.

Figure 29:
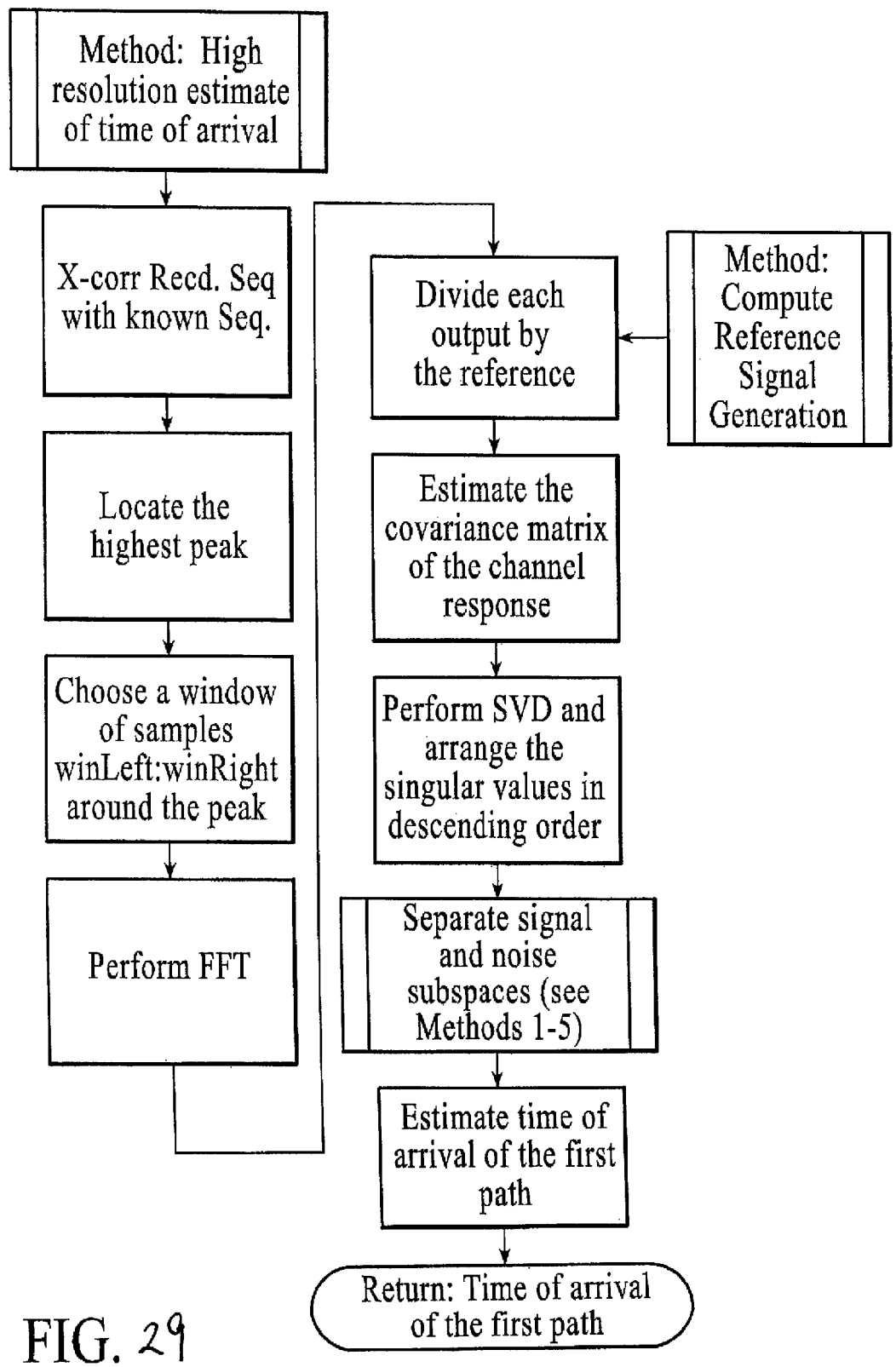
FIG. 29 is a flow diagram for estimating an earliest arriving path in h[n], under an embodiment.

FIG. 29 is a flow diagram for estimating an earliest arriving path in h[n], under an embodiment. The method to determine the earliest path comprises the following operations, but is not so limited:

1. Cross-correlate the received samples y[n] with the transmit sequence x[n] to obtain the result z[n]. When the cross-correlation is written in terms of a convolution, $$z[n]=y[n] \otimes x^*[-n]$$

The equation can be re-written as $$z[n]=h_{eff}[n] \otimes \phi_{xx}[n]$$

where $\phi_{xx}[n]$ is the autocorrelation function of the pseudo-random sequence 2. Locate the first peak of z[n] and denote it as $n_{peak}$. Extract wL samples to the left of the peak and wR samples to the right of the peak of z[n] and denote this vector as pV.

$$pV=[z[n_{peak}-wL+1] \ldots z[n_{peak}+wR]]$$

The vector pV denotes the useful part of the cross-correlation result z[n]. In the ideal case, in the absence of channel distortion and when the channel BW is not limited, the choosing $wL=wR=f_sT_c$ would be sufficient to determine the timing of the received signal. In the presence of limited BW, for the case when the pseudo-random code x[n] is a sequence of +1/−1's, the optimal method to choose wL and wR are to choose them as the non-zero values (or, more generally, values>a certain threshold defined as a fraction of the peak value are selected) present on the left and right side of the peak of $p[n]=h_{tx}[n] \otimes h_{rx}[n]$ respectively. One other consideration in the choice of wL and wR is to select enough uncorrelated noise samples to obtain enough information regarding the noise sub-space. In addition, the integers wL and wR should be chosen to include all possible multipath components especially on the left side (i.e. through choice of wL) to help resolve far-out multipath components. Including too many samples beyond $f_sT_c$ increases the amount of noise introduced in the pV vector and hence has to be curtailed. Through simulation and experiments, a typical set of values for wL and wR are $3f_sT_c$ and $3f_sT_c$, respectively.

Note that z[n] (and in turn pV) contains the effect of the channel h[n], the transmit filter $h_{tx}[n]$, the receive filter $h_{rx}[n]$ and the auto correlation function of the pseudo-random sequence $\phi_{xx}[n]$. In order to estimate the earliest arriving path in the channel, the other effects need to be eliminated. In many cases the transmit and receive pulse-shapes are matched for best noise performance, but that constraint is not required for this algorithm to work. The reference correlation function is defined as $\phi_{ref}[n]=\phi_{xx}[n] \otimes h_{tx}[n] \otimes h_{rx}[n]$ which needs to be estimated and eliminated before pV can be used for estimation of earliest arriving path.

3. The Reference correlation function $\phi_{ref}[n]$ is estimated next.

Figure 30:
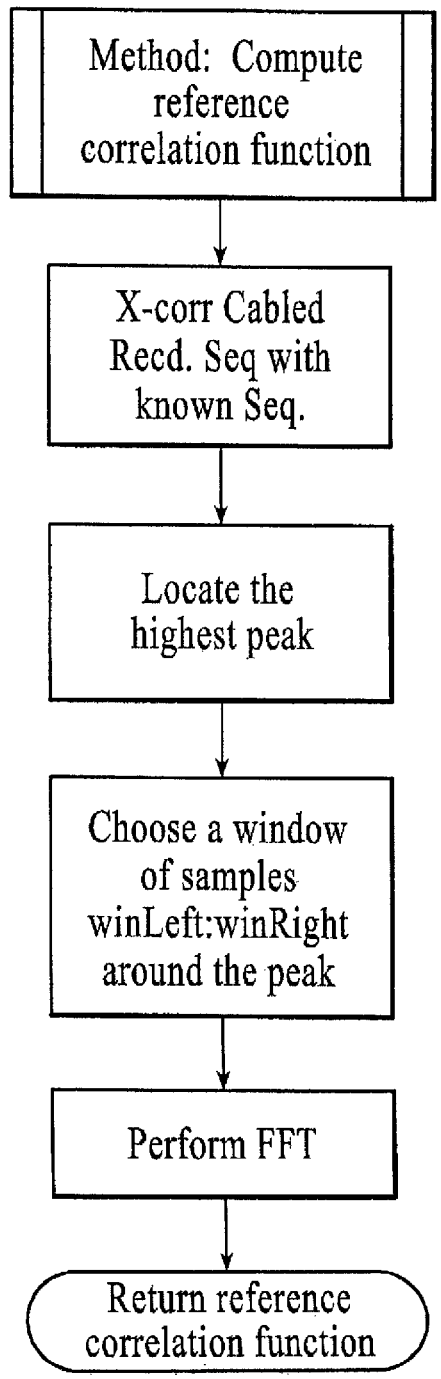
FIG. 30 is a flow diagram for estimating reference correlation function, under an embodiment.

One method to obtain the reference cross-correlation is as follows: perform steps 1-2 on a ideal channel (a so called "cabled link") to obtain the corresponding peak vector $pV_{Ref}$. The peak vector $pV_{Ref}$ contains the useful samples of the reference correlation function $\phi_{ref}[n]$. FIG. 30 is a flow diagram for estimating reference correlation function, under an embodiment.

The "Cabled link" method involves sending the modulated signal from the transmitter front-end (power-amplifier and transmit antenna is by-passed) through an 'ideal' channel (for example, a cable) to the receiver front-end (bypass the receive antenna). Note that the 'ideal' channel can have some delay and attenuation, but should not add any other distortion and must have high SNR. For the best performance, the 'cabled' reference needs to be generated separately for each pseudo-random sequence as they have different autocorrelation functions and hence different references. It is also then critical to choose PRNs properly for the best autocorrelation functions (specifically, their close in autocorrelation side-lobes should be well suppressed compared to the peak) which will result in the best overall performance of the timing-resolution method, since autocorrelation sidelobes can get mistaken for multipath unless sufficiently attenuated.

Assuming transmit filter responses are controlled, one calibration of the response on cabled link is required per receiver during production. If receiver filter characteristics can be controlled (for example, for a bunch of receivers), then the calibration on cabled link of the response can be further reduced to one calibration measurement for a set of receivers.

An alternative method for determining the reference correlation function $\phi_{ref}[n]$ is to compute the individual components $\phi_{xx}[n]$, $h_{tx}[n]$ and $h_{rx}[n]$ analytically and to convolve them to arrive at the reference correlation function $\phi_{ref}[n]$. Note that this method depends on the extent to which transmit and receive filter impulse responses can be controlled in an actual implementation.

4. Improve the SNR in the estimate of pV by coherently averaging across multiple gold codes and even across multiple bits. Averaging across multiple bits can be done coherently after decisions on the individual bits being transmitted have been made. In other words using decision feedback before integration across bits. Note that improved SNR can be obtained equivalently by performing averaging in the cross-correlation function estimation in Step 1.

5. Calculate the Fast Fourier Transform (FFT) of length $N_{fft}$ of pV and $pV_{Ref}$ with zero padding of $N_{fft}-(wL+wR)$ zeros to obtain the length $N_{fft}$ vectors $pV_{Freq}$ and $pV_{Ref,Freq}$ respectively. An optimal value for $N_{fft}$ is obtained by checking resolvability of multipath through simulations using both synthetic and real measured channels. A typical value of $N_{fft}$ was found to be greater than or equal to 4096. The $$pV_{Freq}=\text{FFT}[pV \text{ zeropad}]$$

$$pV_{Ref,Freq}=\text{FFT}[pV_{Ref} \text{ zeropad}]$$

6. Calculate $$H_{full}[k] = \frac{pV_{Freq}[k]}{pV_{Ref.Freq}[k]}$$

to obtain the frequency domain estimate (corrupted with noise) of the channel h[n]. If the received sequence y[n] is oversampled by $N_{os}$ (i.e.

$$N_{os} = \frac{f_s T_c}{2}$$

for a transmit pulse shape band-limited to +/−1/Tc) and if the transmit and receive pulse-shaping filters are perfectly band-limited with BW=1/Tc, then exactly $$N = \frac{N_{fft}}{2N_{os}}$$

positive and negative samples around DC of $H_{full}[k]$ are non-zero (i.e. usable) for estimation of the real channel, $H_{real}[k]$. From our studies, we have concluded that $$\frac{N_{fft}}{2\alpha N_{os}}$$

samples on either side of DC should be picked for the best performance of the resolution algorithm, where $\alpha>1$ is chosen based on the actual pulse-shaping filters used at the transmitter and receiver and the autocorrelation function $\phi_{xx}[n]$. Note that including the frequency transition band of $\phi_{ref}[n]$ causes noise enhancement and α is chosen large enough to exclude these frequencies in the selected samples. However, choosing α too large will cause loss of signal information. A preferred choice of α=1.25 for real band-limited functions based on raised-cosine filter shapes with small excess bandwidth has been used in the implementation.

7. If the DC component of $H_{full}[k]$ is at index 0, the reduced H vector, H[ ] is defined as:

$H=[H_{full}[N_{fft}-N+1] \ldots H_{full}[N_{fft}]H_{full}[0]H_{full}[1] \ldots H_{full}[N]]$ 8. Construct the matrix P from the reduced channel estimate vector H[k], $$P = \begin{bmatrix} H(M) & \ldots & H(2N-1) & H'(0) & \ldots & H'(2N-M+1) \\ H(M-1) & \ldots & H(2N-2) & H'(1) & \ldots & H'(2N-M+2) \\ \vdots & \ddots & \vdots & \vdots & \ddots & \vdots \\ H(0) & \ldots & H(2N-M+1) & H'(M) & \ldots & H'(2N-1) \end{bmatrix}$$

where 1<M<2N is a parameter and ( )' represents conjugate of the complex number.

Define the estimated covariance matrix R of the reduced channel estimate vector H[k] as $$R = P \times P'$$

If M is chosen to be too small (close to 1), then the eigen-values of R are very limited in number and, as a result, the high-resolution algorithm cannot delineate between the signal and noise. If M is chosen too large (close to 2N), then the covariance matrix estimate R is unreliable as the amount of averaging in obtaining the covariance is inadequate and also the covariance matrix R obtained is rank-deficient. Thus, a value of M which is right in the middle of its allowable range i.e. M=N is a good choice. This has also been verified empirically.

9. Perform singular value decomposition (SVD) on R as $$R = UDV'$$

Where U is a matrix of the left singular vectors, V is the matrix of the right singular vectors and D is the diagonal matrix of singular values.

10. Construct the vector of sorted singular values sV as sV=diagonal elements of D sorted in descending order 11. The next key step is to separate the signal and noise subspaces. In other words, to select an index ns in the vector sV such that the singular values sV[ns+1] ... sV[N] correspond to noise. Define a vector of noise singular values as $sV_{noise}$.

There are a number of methods possible to separate the singular values corresponding to the noise subspace and find a representation for the basis vectors of the noise sup-space:

a) All singular values which are smaller than $$\frac{\max(sV)}{T_1}$$

where $T_1$ is a threshold value which is a function of the signal-noise ratio (e.g. SNR on the chip) $T_1 = f(SNR)$.

Figure 31:
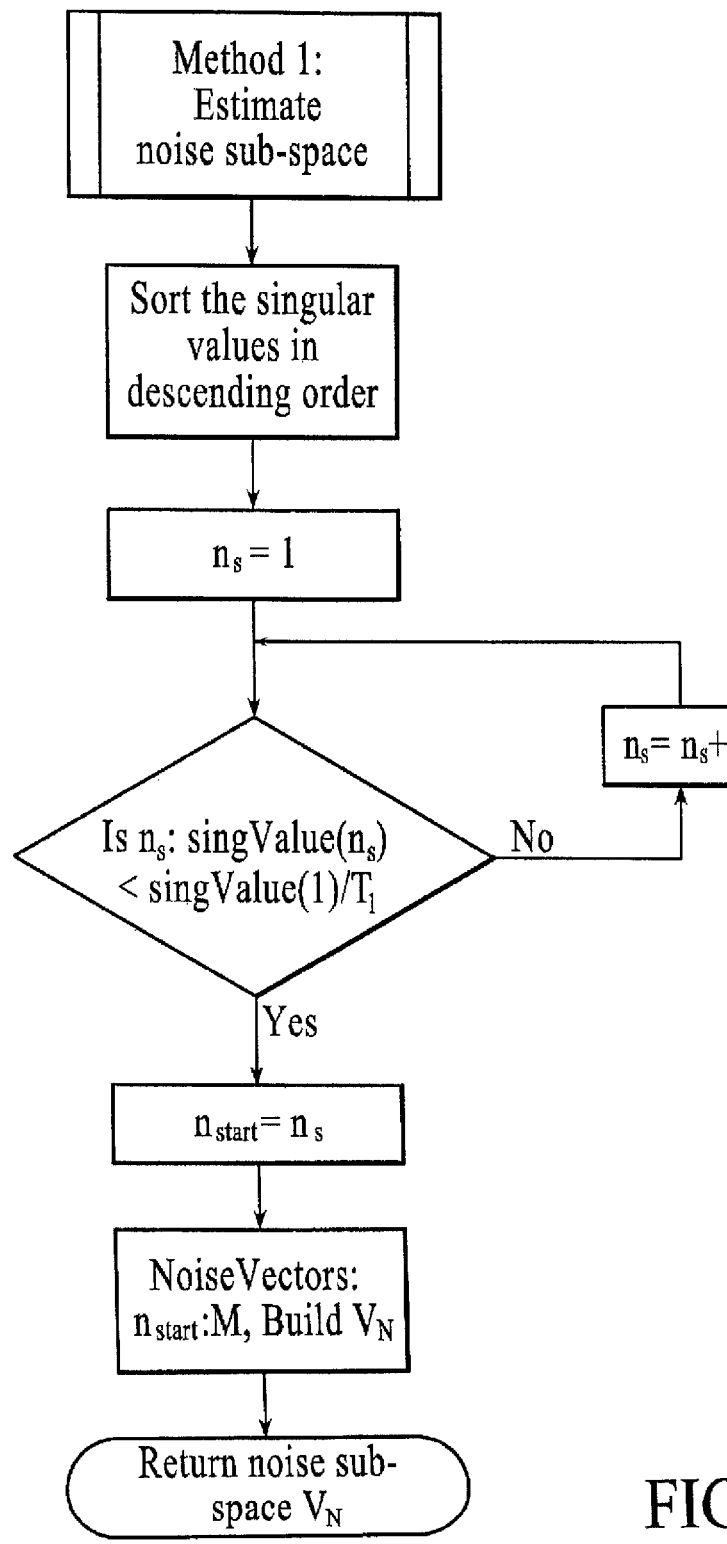
FIG. 31 is a flow diagram for estimating noise sub-space, under an embodiment.

FIG. 31 is a flow diagram for estimating noise sub-space, under an embodiment.

b) All singular values less than min $$\left( \frac{\max(sV)}{T_1}, \text{mean}(sV(L:M)) \times T_2 \right),$$

where L is a parameter which can be chosen greater than delay-spread (e.g. N/2) and $T_2$ is another threshold value determined empirically (typical value can be 1000).

Figure 32:
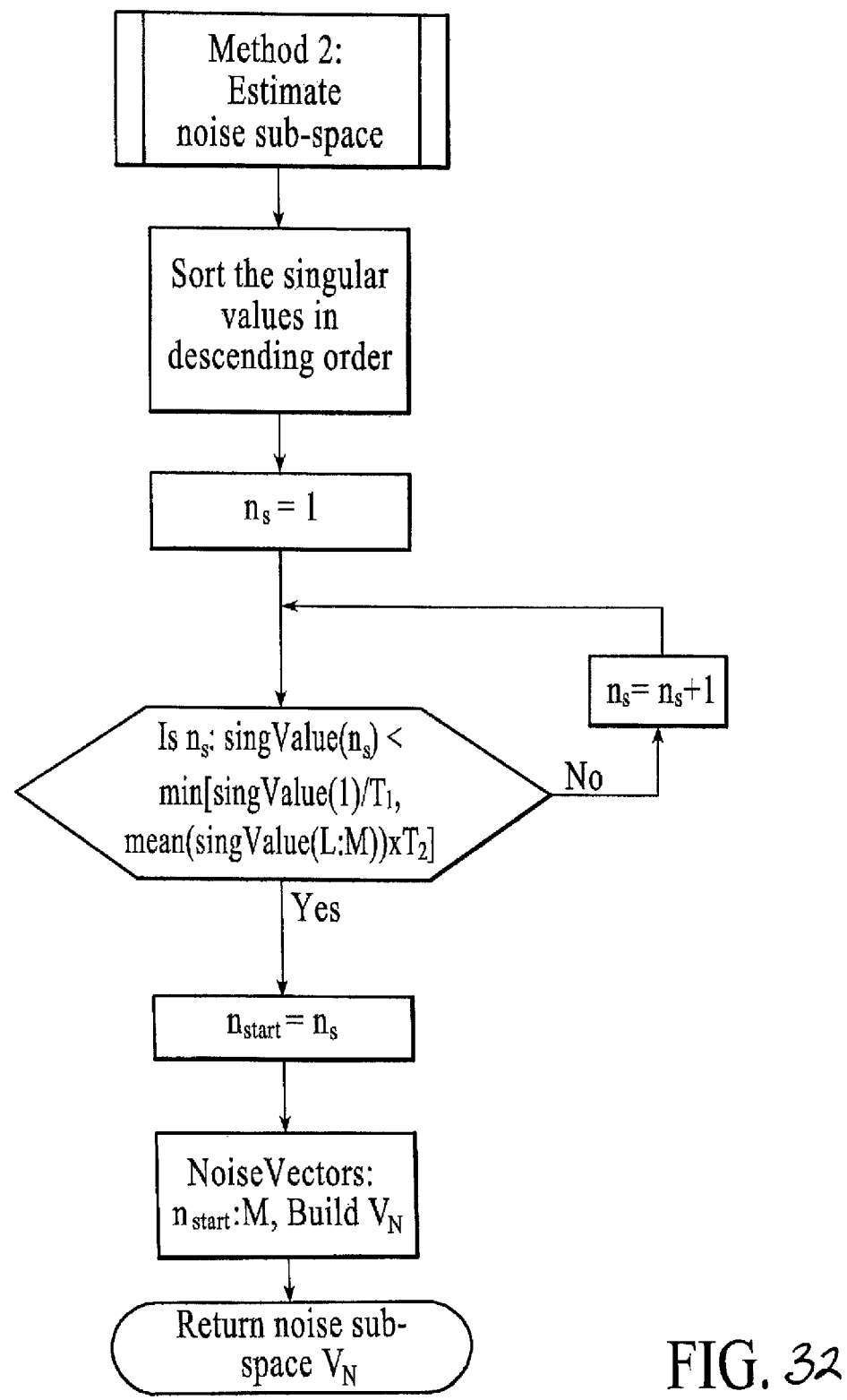
FIG. 32 is a flow diagram for estimating noise sub-space, under an alternative embodiment.
Figure 33:
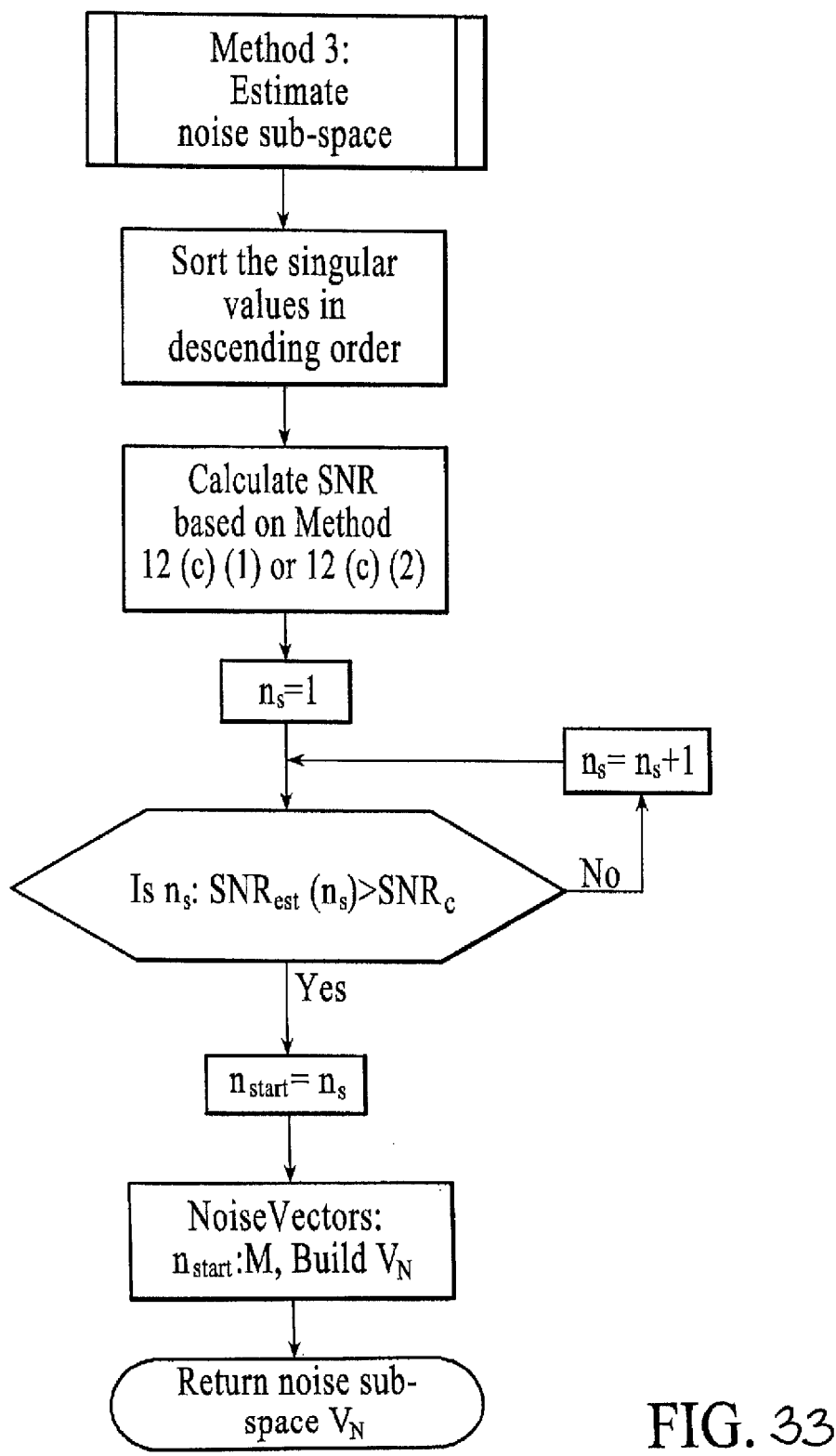
FIG. 33 is a flow diagram for estimating noise sub-space, under another alternative embodiment.

FIG. 32 is a flow diagram for estimating noise sub-space, under an alternative embodiment.

c) Another method involves determining the noise sub-space by repeatedly estimating the SNR for different partitions of noise and signal-plus-noise subspaces and comparing with another estimate of SNR. FIG. 33 is a flow diagram for estimating noise sub-space, under another alternative embodiment.

1) Calculate estimate of SNR as follows:
 i. Assume that the noise is represented by the sV( ) $n_s, n_s+1 \ldots M$, Calculate noise variance as:

$$\sigma_{est}^2(n_s) = \frac{\sum_{i=n_s}^{M} sV(i)}{M - n_s + 1}$$

ii. Calculate the signal power as $P_{sig}(n_s) = \Sigma_{i=1}^{n_s-1} (sV(i) - \sigma_{est}^2(n_s))$
 iii. Estimate of SNR:

$$SNR_{est}(n_s) = \frac{P_{sig}(n_s)}{\sigma_{est}^2(n_s)}$$

2) An alternative estimate of SNR is obtained through other methods (e.g. SNR on chip). One method of estimating SNR directly is as follows:
 i. If the received data samples (after frequency error removal and re-sampling to Tc-spaced samples and code de-correlation) are given by $X_i$ (where the $X_i$ are chip-spaced starting from the interpolated peak position).

$$X_i = S + N_i$$

ii. The signal is estimated as $$\hat{S} = \frac{1}{N} \sum_{i=0}^{N-1} X_i$$

iii. The noise is estimated as $$\hat{N} = \frac{1}{N-1} \sum_{i=0}^{N-1} (X_i - \hat{S})^2$$

iv. The SNR is estimated as $$\widehat{SNR}_c = \frac{\hat{S}}{\hat{N}}$$

3) Choose the noise singular values as $sV(ns, ns+1, \ldots, M)$ which satisfy the following condition:

$$n_{start} = [\text{smallest } n_s : SNR_{est}(n_s) > \widehat{SNR}_c]$$

d) Another method involves determining the noise sub-space by repeatedly estimating the SNR for different partitions of noise and signal subspaces using c)1) and choosing a partition $n_{start}$ such that $$n_{start} = \text{argmax}_{n_s}[SNR_{est}(n_s) - SNR_{est}(n_s - 1)]_{n_s=2}^{K}.$$

Figure 34:
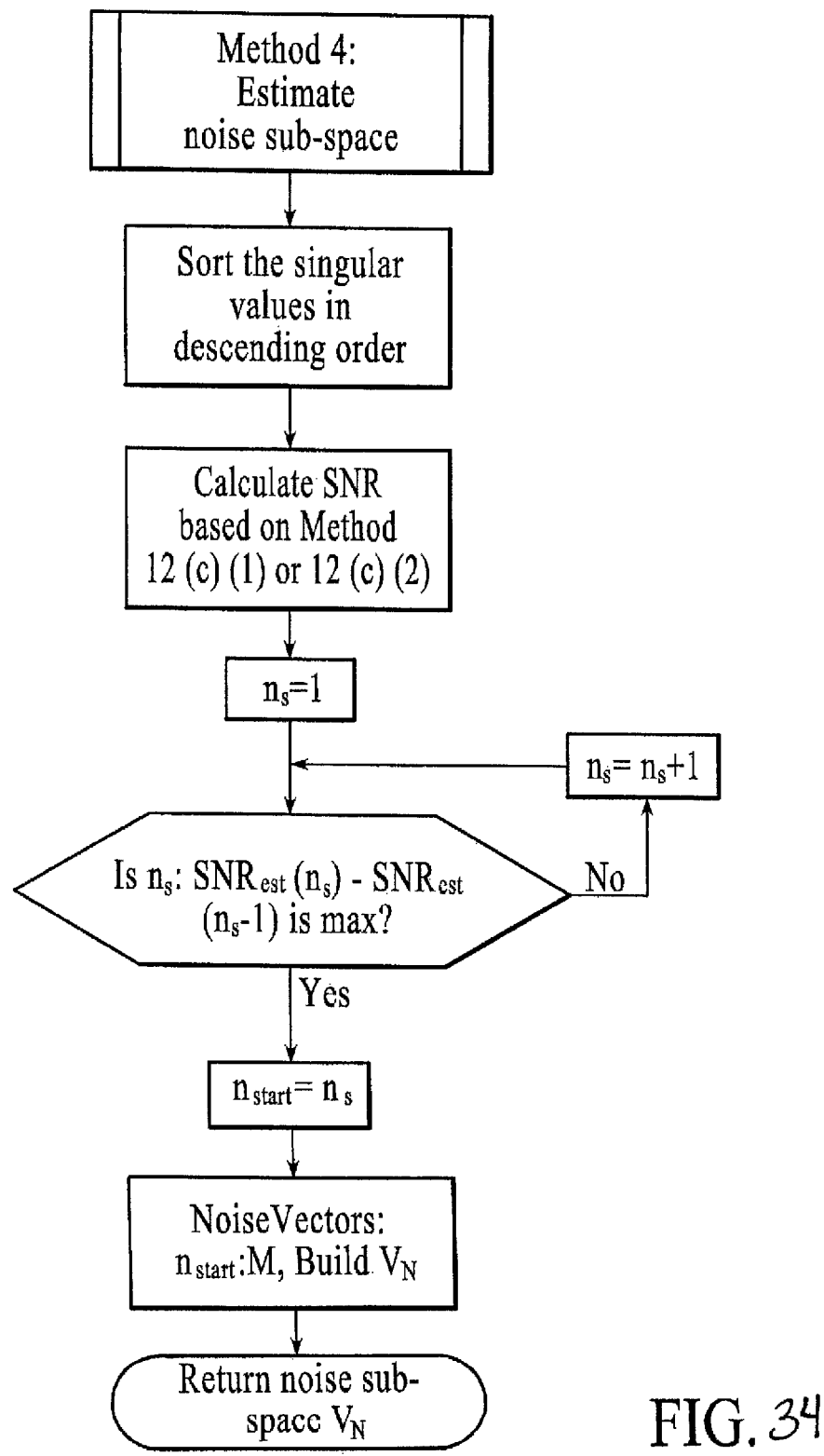
FIG. 34 is a flow diagram for estimating noise sub-space, under yet another alternative embodiment.
Figure 35:
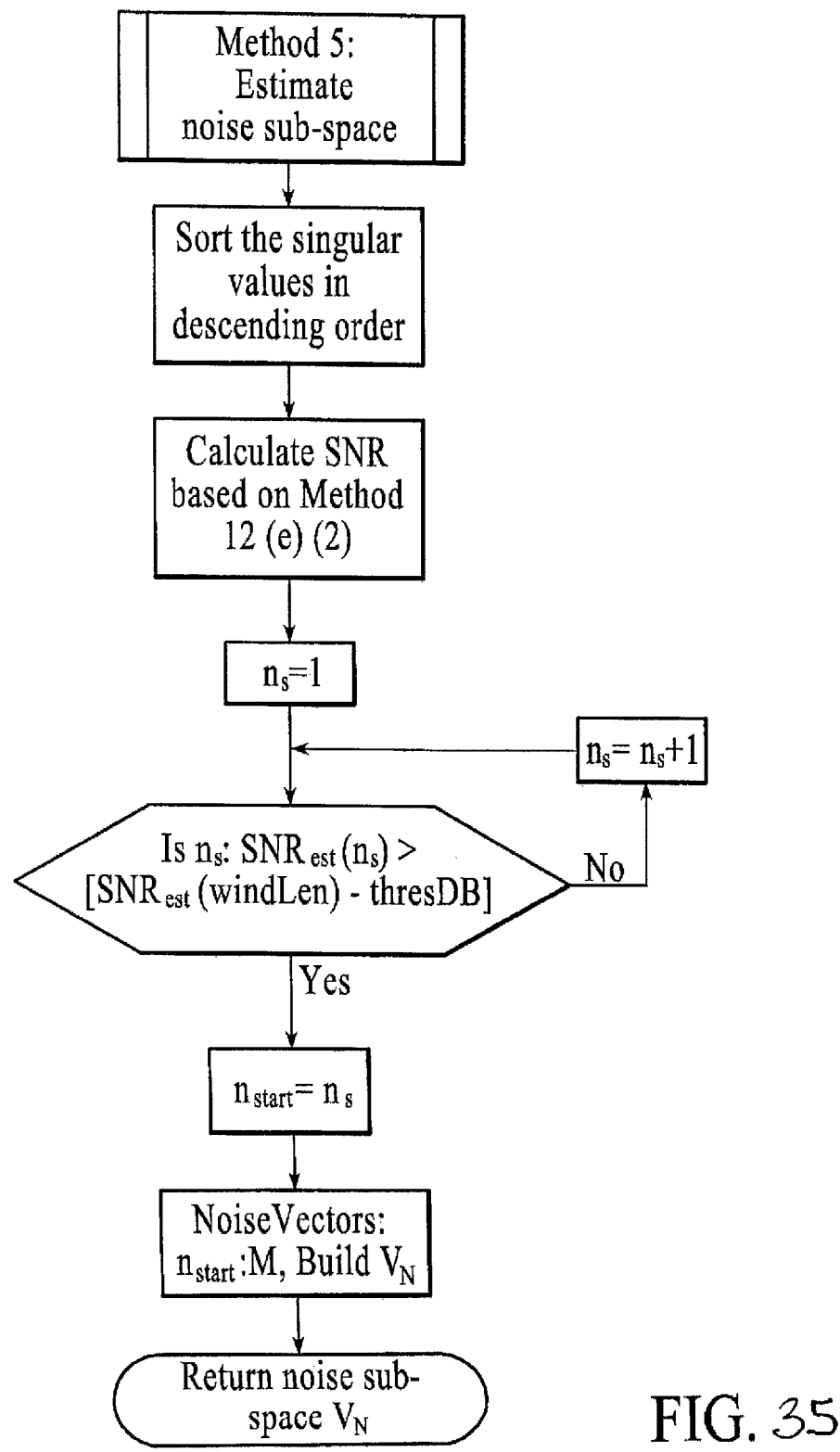
FIG. 35 is a flow diagram for estimating noise sub-space, under still another alternative embodiment.

FIG. 34 is a flow diagram for estimating noise sub-space, under yet another alternative embodiment.

e) FIG. 35 is a flow diagram for estimating noise sub-space, under still another alternative embodiment.

1) Define $$wLen = \frac{wL + wR}{f_s T_c}.$$

Then the first wLen singular values represent the significant signal-plus-noise subspace or noise subspace singular values (the rest of the singular values represent correlated noise and signal and quantization effects).

2) Calculate estimate of SNR as follows:
   i. Assume that the noise is represented by the sV(i): i=$n_s$, $n_s$+1 ... wLen; 1<$n_s$≤wLen, calculate noise variance as:

$$\sigma_{est}^2(n_s) = \frac{\sum_{i=n_s}^{wLen} sV(i)}{wLen - n_s + 1}$$

ii. Calculate the signal power as $P_{sig}(n_s) = \Sigma_{i=1}^{n_s-1} [sV(i) - \sigma_{est}^2(n_s)]$
   iii. Estimate of SNR:

$$SNR_{est}(n_s) = \frac{P_{sig}(n_s)}{\sigma_{est}^2(n_s)}$$

3) Define $n_{start}$=[smallest $n_s$:$SNR_{est}(n_s)$>($SNR_{est}$(wLen)−thresDB)]. Then $n_{start}$ up to winLen represent the noise singular values. A typical value of thresDB is 10.

12. Choose the corresponding noise right-singular vectors to build $V_N$ i.e. choose all vectors in V which correspond to the noise singular values and build the noise subspace matrix $V_N$.

13. Estimate Time of Arrival of the first path:
    a) Define $$\omega(\tau) = \left[1 \quad e^{\frac{j2\pi}{N_{fft}}\tau} \quad e^{\frac{j2\pi}{N_{fft}}2\tau} \quad e^{\frac{j2\pi}{N_{fft}}3\tau} \quad \ldots \quad e^{\frac{j2\pi}{N_{fft}}(M-1)\tau}\right]^H$$

b) Calculate $$\Omega(\tau) = \frac{1}{\omega(\tau)^H V_N V_N^H \omega(\tau)}$$

for a range of values of $\tau$ ($\tau \in [\tau_{max}, -\tau_{max}]$). The resolution of search $\Delta\tau$ can be chosen as small as required. As an example, $\tau_{max}$=5 and $\Delta\tau$=0.05 so that $\tau$ is searched for in the range [−5,5] in steps of 0.05.

14. Peaks of $\Omega(\tau)$ will provide the positions of channel impulses relative to the coarse peak, $n_{peak}$. Theoretically, first peak will correspond to LOS path. Based on information about the propagation environment which could be encoded in the transmission from the base-station, it is possible to control $\tau_{max}$. For example, if the delay-spread is large, then $\tau_{max}$ can be chosen to be larger (e.g. 10) and if it is less then $\tau_{max}$ can be chosen as a smaller value (e.g. 4).

Combination Methods:
Apart from the standalone methods discussed above, numerous other combination methods are possible. Combination of schemes based on SNR on chip is an effective method. The following describes a list of combination schemes that can be realized in practice:

1. For chipSNR less than chipSNRRef, pick method 12(d) to choose noise singular values. Otherwise choose method 12(a).
2. For chipSNR greater than chipSNRRef, pick method 12(d) to choose noise singular values and estimate peak position. Otherwise, use direct peak estimation techniques (such as peak interpolation, peak shape) starting from the cross-correlation function z[n].
3. For chipSNR less than chipSNRRef, pick method 12(e) to choose noise singular values. Otherwise choose method 12(a).

A typical value of chipSNRRef is 10 dB.

Computation of Position

The location of the receiver unit is determined by the positioning engine available either on the terminal unit or the server. The receiver can use the range measurements from the system or combine the system range measurements with any of the measurements from other signals of opportunity. A sufficient set of range measurements yields a position fix provided that the measurements derive from known locations. The range equation in 3D space is given by $$r_i = \sqrt{(x_i - X)^2 + (y_i - Y)^2 + (z_i - Z)^2}.$$

The location of the transmitters is given by ($x_i$, $y_i$, $z_i$) and the unknown location of the mobile units is given by (X, Y, Z) in some local coordinate frame. Three or more transmitters produce three or more range measurements that are used to compute a fix. The measurement has a receiver time bias additive term as well, because the receiver time is not synchronized to the WAPS timing.

$$R_i = r_i + c\Delta t.$$

This equation is referred to later as "Pseudorange Measurement Equation". Note that the time bias is common because the transmitters are timing synchronized. The pseudoranges must be corrected for transmit timing corrections which are available from the data stream embedded in the transmission from each transmitter. This delta time bias creates a new unknown parameter, so a minimum of four measurements are used for a solution. A barometric altimeter measurement provides the needed information for a solution as $$Baro = (z_b - Z).$$

One method of solving these non-linear simultaneous equations is to linearize the problem at an arbitrary initial point and then iteratively finding corrections to this initial position to iteratively leads to the final solution.

This method uses an initial guess for the X, Y, Z solution, so the centroid of the transmitters is used as $$(X_0, Y_0, Z_0) = (1/n) \sum_{i=1}^{n} (x_i, y_i, z_i).$$

The final position solution is assumed to be of the form $$(X, Y, Z, \Delta t) = (X_0, Y_0, Z_0, \Delta t_0 = 0) + (dX, dY, dZ, d\Delta t)$$

The geometric range can be expanded in a Taylor series about (X,Y,Z,$\Delta t$)=($X_0, Y_0, Z_0, \Delta t_0$)

$$R_i = \sqrt{(x_i - X)^2 + (y_i - Y)^2 + (z_i - Z)^2} + c\Delta t$$
$$= \sqrt{(x_i - X_0)^2 + (y_i - Y_0)^2 + (z_i - Z_0)^2} + c\Delta t_0 +$$

-continued $$\left.\frac{\partial r}{\partial x}\right|_{(X_0,Y_0,Z_0,\Delta t_0)} dX + \left.\frac{\partial r}{\partial y}\right|_{(X_0,Y_0,Z_0,\Delta t_0)} dY +$$

$$\left.\frac{\partial r}{\partial z}\right|_{(X_0,Y_0,Z_0,\Delta t_0)} dZ + c\Delta t$$

$$= \hat{r}_i + \left.\frac{\partial r}{\partial x}\right|_{(X_0,Y_0,Z_0,\Delta t_0)} dX + \left.\frac{\partial r}{\partial y}\right|_{(X_0,Y_0,Z_0,\Delta t_0)} dY +$$

$$\left.\frac{\partial r}{\partial z}\right|_{(X_0,Y_0,Z_0,\Delta t_0)} dZ + c\Delta t$$

where the estimated ranges are computed as $$\hat{r}_i = \sqrt{(x_i - X_0)^2 + (y_i - Y_0)^2 + (z_i - Z_0)^2}.$$

and the partial derivatives are given by $\partial R/\partial x = \partial r/\partial x = (x_i - X)/r_i \; \partial R/\partial \Delta t = c$ $\partial R/\partial y = \partial r/\partial y = (y_i - Y)/r_i$ $\partial R/\partial z = \partial r/\partial z = (z_i - Z)/r_i.$ In this embodiment, four linear equations with four unknowns are shown. Additional range estimates would produce more rows in the matrix. The result is the set of equations $$\begin{bmatrix} (x_1 - X_0)/\hat{r}_1 & (y_1 - X_0)/\hat{r}_1 & (z_1 - Z_0)/\hat{r}_1 & 1 \\ (x_2 - X_0)/\hat{r}_2 & (y_2 - Y_0)/\hat{r}_2 & (z_2 - Z_0)/\hat{r}_2 & 1 \\ (x_3 - X_0)/\hat{r}_3 & (y_3 - Y_0)/\hat{r}_3 & (z_3 - Z_0)/\hat{r}_1 & 1 \\ 0 & 0 & 1 & 0 \end{bmatrix} \times \begin{bmatrix} \delta X \\ \delta Y \\ \delta Z \\ c\delta \Delta t \end{bmatrix} = \begin{bmatrix} R_1 - \hat{r}_1 \\ R_2 - \hat{r}_2 \\ R_3 - \hat{r}_3 \\ z_b - Z_0 \end{bmatrix}$$

The last row of the observation matrix represents the barometric altimeter measurement. The column of three 1 represents the same time bias on all three ranges. These equation are in the form of Ax=b. The solution $x = A^{-1} *b$. Note that in the absence of a barometer measurement, one more additional measurement would add an additional row similar to rows 1 to 3 of the matrix above. This additional measurement would enable estimation of the altitude of the receiver. Note that when there are more measurements available than the number of unknowns, then the solution would be based on the pseudo-inverse of A given by $A_+ = (A^T A)^{-1} A^T$ and the least square solution is given by $x = A_+^{-1} b$. When the quality of measurements are not equal, the optimal way of solving the equations Ax=b in the least square sense is to use a weight proportional to the SNR for the error from each equation. This leads to a solution $x = A_+^{-1} b$ with $A_+ = (A^T W A)^{-1} A^T W$. The diagonal weighting matrix W formed by the weight proportional to the noise variance of the measurements. The solution of these equations produces a delta correction to the X, Y, Z and delta time estimates, such that $$\begin{bmatrix} X_1 \\ Y_1 \\ Z_1 \\ \Delta t_1 \end{bmatrix} = \begin{bmatrix} X_0 \\ Y_0 \\ Z_0 \\ \Delta t_0 \end{bmatrix} + \begin{bmatrix} \delta X \\ \delta Y \\ \delta Z \\ \delta \Delta t \end{bmatrix}.$$

This completes the first iteration of the method. The updated position and time bias estimates replace initial guess and the algorithm continue until the delta parameters are below some threshold value. A typical stopping point would be for the norm of the delta values are below a certain threshold (for example, one meter).

The system of linearized equations in the GPS is solved using least squares and an initial guess about the location of the user such that the algorithm converges to the final user location. The linearization is based on the fundamental assumption that the distance between the satellites and the user position is larger than the distance between the user position on the earth and the guessed position. For the same set of equations to work in a terrestrial environment (with small geometry), the initial guess can be based on the centroid (as above), a point close to the transmitter from which the received signal is the strongest, or obtained by a direct method which gives a closed form solution by means of a sequence of formulae with no iterations. When the initial guess is a centroid or a point close to the transmitter from which the received signal is the strongest, the initial guess is improved using a least squares method. When the initial guess is obtained by a direct method which gives a closed form solution by means of a sequence of formulae with no iterations, the initial solution itself is the final solution and it is improved using least squares only when there are more measurements (and hence equations) than unknowns with individual measurements weighted by using the expected errors in those measurements (which are obtained from such parameters as signal strength and elevation angle). Further, if a sequence of measurements is to be processed in time, a solution obtained as above may be fed to a Kalman filter to obtain an optimal solution "trajectory".

Another approach that overcomes the linearization problem in terrestrial cases involves formulating the set of equations as a non-linear minimization problem (specifically as a weighted non-linear least squares problem). Specifically, the non-linear objective function to be minimized is defined as $$f(X, Y, Z, \Delta t) = \sum_{i=0}^{N-1} W_i \times \left[ R_i - \sqrt{(x_i - X)^2 + (y_i - Y)^2 + (z_i - Z)^2} - \Delta t \right]^2$$

The weights $W_i$ are chosen to be inversely proportional to the SNR of the measured ranges $R_i$. The best estimate of the receiver location is obtained as the set of $(X, Y, Z, \Delta t)$ that minimizes the objective function. When barometer or other altitude aiding is available then the objective function gets modified to $$f(X, Y, Z = Z_{baro}, \Delta t) =$$

$$\sum_{i=0}^{N-1} W_i \times \left[ R_i - \sqrt{(x_i - X)^2 + (y_i - Y)^2 + (z_i - Z_{baro})^2} - \Delta t \right]^2$$

The position solution based on this method will be more stable and robust, particularly under small geometry terrestrial system configuration. In this configuration, small changes in receiver coordinates significantly changes the observation matrix and sometimes leads to lack of convergence of the linearized iterations. Convergence to a local minimum or divergence occurs more often due to residual bias in the measurements which affects the shape of the objective function so that local minima can be present. Residual bias can be quite common in indoor/urban canyon environments. The non-linear formulation above makes the position algorithm robust to measurement bias besides overcoming the small geometry linearization problem.

One approach to perform the minimization of the function $f$ to obtain optimal X, Y, Z is to use a genetic algorithm (such as differential evolution) to find the global minimum of the function. The use of such an algorithm enables the solution to avoid local minima that occur in small geometry terrestrial positioning when multi-path bias is present in the range measurements.

Irrespective of whether linearized least squares or non-linear least squares method is used to solve the pseudo-range measurement equations, it is important for a quality metric to be provided along with a position estimate. The position quality metric should be a function of the pseudo-range measurement equation residuals, the quality of the measurements as well as the geometry of the towers relative to the estimated position. The pseudo-range measurement residual for the ith tower measurement is given by $$PR_{res,i} = R_i - (\sqrt{(x_i-X)^2 + (y_i-Y)^2 + (z_i-Z)^2} + c\Delta t)$$

The average weighted rms pseudo-range residual is given by $$PR_{res} = \sqrt{\left(\frac{\sum_i W_i \times PR_{res,i}^2}{\sum_i W_i}\right)}$$

The HDOP, VDOP, PDOP are defined from the diagonal elements of $H = (A^T A)^{-1} A^T$ as $$HDOP = \sqrt{H(1,1) + H(2,2)}$$

$$VDOP = H(3,3)$$

$$PDOP = \sqrt{H(1,1) + H(2,2) + H(3,3)}$$

The pseudo-range RMS (root-mean-square) error at a particular SNR is given by $$PRE_{th} = f(\sqrt{SNR})$$

where $f$ is generally a non-linear monotonic decreasing function of its argument. The function $f$ can be derived analytically for a particular receiver configuration as a function of signal BW and receiver BW or alternatively, found from simulation as a table mapping SNR to range error.

The quality metric for 2-D position is defined as $$QM_{2-D} = HDOP \times \sqrt{PR_{res}^2 + PRE_{th}^2} \times \alpha$$

Similarly, the quality metric for the altitude and 3-D position is given by $$QM_{alt} = VDOP \times \sqrt{PR_{res}^2 + PRE_{th}^2} \times \alpha$$

$$QM_{3-D} = PDOP \times \sqrt{PR_{res}^2 + PRE_{th}^2} \times \alpha$$

The quantity $\alpha$ is chosen based on the level of confidence desired. For example, a value of 3 would be used to obtain 95% confidence, while a value of 1 would be used for 68% confidence.

Another method of positioning using the WAPS system involves the use of a WAPS reference receiver in a differential scheme. As shown in "Differential Wide Area Positioning System" and discussed in the context of timing synchronization, the time-stamped reference receiver measurements along with the latitude, longitude, altitude of the WAPS towers and the reference receiver can be used to determine the timing delta between WAPS tower transmissions at the specific time-stamp. Once the timing delta between transmitters is known, the range equations can be reduced to have a single common time bias again. The WAPS receiver then can avoid demodulation of the WAPS data stream (for example, to extract the timing corrections from the data stream). The WAPS receiver measurements can be sent to the server and the position can then be computed at the server or, alternatively, the reference receiver measurements can be relayed to the WAPS receiver and the position can be computed there. It is assumed that the latitude, longitude and altitude of the WAPS towers is already known/available for use in the position computation. In the case that the WAPS data stream is secure, this differential system can avoid the need to extract data from the secure data stream for timing correction purposes.

Another alternative method for obtaining positioning from the WAPS system uses RSSI finger-printing techniques. A database of WAPS tower transmit powers/locations and RSSI levels is built up for a given target area based on training measurements in the area for which positioning is required. Note that RSSI database can also be augmented with Angle of Arrival (AOA) information to improve the solution. The WAPS receiver RSSI measurements (and possibly AOA measurements) are then used to look up this database to obtain a location estimate. An alternative method of using the WAPS RSSI measurements would be to translate the measurements into a range estimate using a propagation model (or simple extrapolation/interpolation techniques) and then use tri-lateration to determine the position. Note that the RSSI measurements in these finger-printing techniques can be replaced by any other measurements that can be translated to range.

An alternative method of computing position using the WAPS infrastructure uses a blind method for obtaining positioning from the WAPS system without prior knowledge of the WAPS tower locations. In this method, the approximate location of the WAPS towers are determined by field measurement (for example, by measuring RSSI from many angles around the WAPS tower at GNSS tagged locations and then using a weighted average based on RSSI of these locations to estimate WAPS tower locations). Then, any of the RSSI finger-printing methods can be used to determine position (for example, as described in the above paragraph).

An alternative method of computing position using the WAPS infrastructure can be used for computing position offline. The position computation involves storing the sample segments of the WAPS signal (for example, the stored data may be I data at low IF or IQ data at baseband) from the WAPS receiver along with optionally an approximate position and a WAPS time tag. Note that it is enough to store enough samples to be able to acquire the signal. The samples are processed at a later time to search, acquire and compute range to WAPS towers. The method may use offline data to look-up tower locations and timing correction information that may be stored in a central database on a server. This method of offline position computation provides the ability to support WAPS positioning at the cost of only memory on the device. The other advantage of this method is the time taken for storing the WAPS IQ data is very short, making it convenient for applications that need to tag position quickly, but the exact position is not required instantaneously. One possible application for this method can be for geo-tagging of photographs.

Another approach to positioning uses carrier phase measurements in addition to the code phase measurements indicated above. The carrier phase measurements can be written as:

$$\phi_i(t_0) = r_i(t_0) + N_i \lambda + \Delta t$$

Various techniques can be used to resolve the integer ambiguity $N_i$ in the carrier phase measurements. Code phase measurements, measurements at multiple frequencies and/or other methods can be used to resolve the ambiguities. Subsequently, the carrier phase measurements at time $t_k$ can provide accurate tracking of position starting from an accurate initial position. The carrier phase measurements at future times can be written as $$\phi_i(t_k) = r_i(t_k) + N_i \lambda + \Delta t$$

The $N_i$ do not change as long as the carrier phase measurements do not have cycle slips (i.e. the signals should be tracked with continuous phase lock) and the new locations can be computed using least squares. Alternatively, these measurements can be used in a Kalman filter to update the new position state. If phase lock is lost, new values of integer ambiguity need to calculated.

Another approach uses differential positioning relative to a reference receiver as described above. Differential positioning can be done using either code or carrier measurements or a combination of both. Single difference observables are computed for code and carrier phase by subtracting measurements of the same towers from reference receiver r and receiver s as $$R_{sr}^i = \underbrace{\rho_s^i - \rho_r^i}_{\text{geometrical range difference}} + \underbrace{c(dt_s - dt_r)}_{\text{time difference between clocks}} + (\varepsilon_{R,s} - \varepsilon_{R,r})$$

$$\Phi_{sr}^i = \underbrace{\rho_s^i - \rho_r^i}_{\text{geometrical range difference}} + \underbrace{c(dt_s - dt_r)}_{\text{time difference between clocks}} + \underbrace{\lambda(N_s^i - N_r^i)}_{\text{integer ambiguity in phase measurement}} + (\varepsilon_{\phi,s} - \varepsilon_{\phi,r}).$$

Note that any timing error in the transmitter does not appear in these observables and thus allows position solutions even when the system is asynchronous or imperfectly synchronized. In addition, any tropospheric delay error in measurements nearly cancels out since the tropospheric delay is likely to be correlated in the local area for short baselines (i.e., distances between reference receiver r and receiver s). A communication channel is used to send the range and carrier measurements from the reference receiver r to the receiver s for position computation. Or, alternatively, the receiver s and receiver r need to communicate the range and carrier to the server for position computation.

In any position solution method, the height of a receiver can be determined using placement on a terrain map or barometric sensing. Using placement on a map, during trilateration the location of the user can be constrained to be on a terrain based on a terrain database and the height of the user determined. The height of the user can also be constrained to be within a certain height above the terrain. For example, based on the tallest building in the area, the maximum altitude above terrain can be constrained. This type of constraint can improve the quality of the height solution (for example, by eliminating the ambiguous solution that is sometimes produced when using biased range measurements).

In addition, if indoor building maps are available, the information (along with associated constraints on possible user locations) can be used to aid the position solution For example, physical restrictions can be used to constrain the user motion model, and thereby improve the quality of the tracking Kalman position filter. Another usage of building maps is to determine/estimate the quality of a particular tower's range measurement based on the physical environment from the tower to the indoor location. A better estimate of range quality can be used to weight the position computation leading to better position estimates.

When using a barometric sensor, a calibrated barometric sensor can be used to measure the pressure differences as the receiver terminal is moved up or down in altitude. This is compared with a calibrated value for the pressure on different altitudes or an average value to determine the height of the receiver.

In computing the position solution, when additional measurements greater that the minimum three measurements required for two-dimensional position are available, receiver integrity monitoring based on a check of consistency of measurements is used to eliminate "outlier" measurements. The "outlier" measurements could be due to loss of timing synchronization at the transmitter or due to the channel effects such as multipath.

Altimeter-Based Approach for Determining Elevation

The WAPS system of an embodiment includes altimeters (pressure sensor) to aid in the determination of user elevation. The only information available from a pressure sensor is the atmospheric pressure at the time and place of the measurement. In order to translate this into an estimate of the elevation of the sensor, a number of additional pieces of information are required. There is a standard formula for relating pressure to elevation, based upon the weight of a column of air, as follows:

$$z_1 - z_2 = -\frac{RT}{g}\ln\left(\frac{P_1}{P_2}\right)$$

where $z_1$ and $z_2$ are two elevations, and $P_1$ and $P_2$ are the pressures at those elevations, and T is the temperature of the air (in K). R=287.052 m$^2$/Ks$^2$ is the gas constant and g=9.80665 m/s$^2$ is the acceleration due to gravity. Note that this formula provides relative information, determining the difference in elevation for a difference in pressure. This formula is generally used with $z_2$=0, so that $P_2$ is the sea level pressure. Because sea level air pressure varies significantly with weather conditions and with location, the sea level pressure is needed in addition to the temperature and pressure at the site where elevation is to be determined. When applying standard atmosphere conditions, with T=15 C and P 101,325 Pa, it is found that a 1 m increase in elevation corresponds to a 12.01 Pa decrease in pressure.

Thus, to determine elevation with a resolution of 1 m, sea level pressure must be known with accuracy significantly finer than 36 Pa. It is also worth noting that because T is measured in Kelvin, a 3° C. (or K) error in temperature will correspond to approximately a 1% error in elevation. This can become significant when determining elevation significantly above sea level, and when trying to resolve upper floors in a high rise building. Thus, for determining elevation with a resolution of 1 m, pressure sensors with high accuracy and resolution are needed. In order to fit in a mobile device, these sensors should be low cost, low power and small size. Note that commercial weather grade sensors do not provide this level of accuracy or resolution and are not updated at a rate required for determining elevation.

The key to determining elevation to 1 m accuracy is to have a system for providing reference pressure information that is local enough and accurate enough. It must be able to provide measurements that are close to the unknown location in temperature, and close in distance and time—to capture changing weather conditions; and finally, must be sufficiently accurate. Thus, the elevation determining system of an embodiment includes but is not limited to the following elements: a mobile sensor that determines pressure and temperature at the unknown location with sufficient accuracy; an array of reference sensors that determine pressure and temperature at known locations with sufficient accuracy, and are sufficiently close to the unknown location; an interpolation-based estimation algorithm which inputs all reference sensor data, reference sensor locations and other augmenting information, and generates an accurate reference pressure estimation at a location of interest within the WAPS network; a communications link between the reference sensors and the mobile sensors to provide the reference information in a sufficiently timely fashion. Each of these elements is described in detail below.

Figure 36:
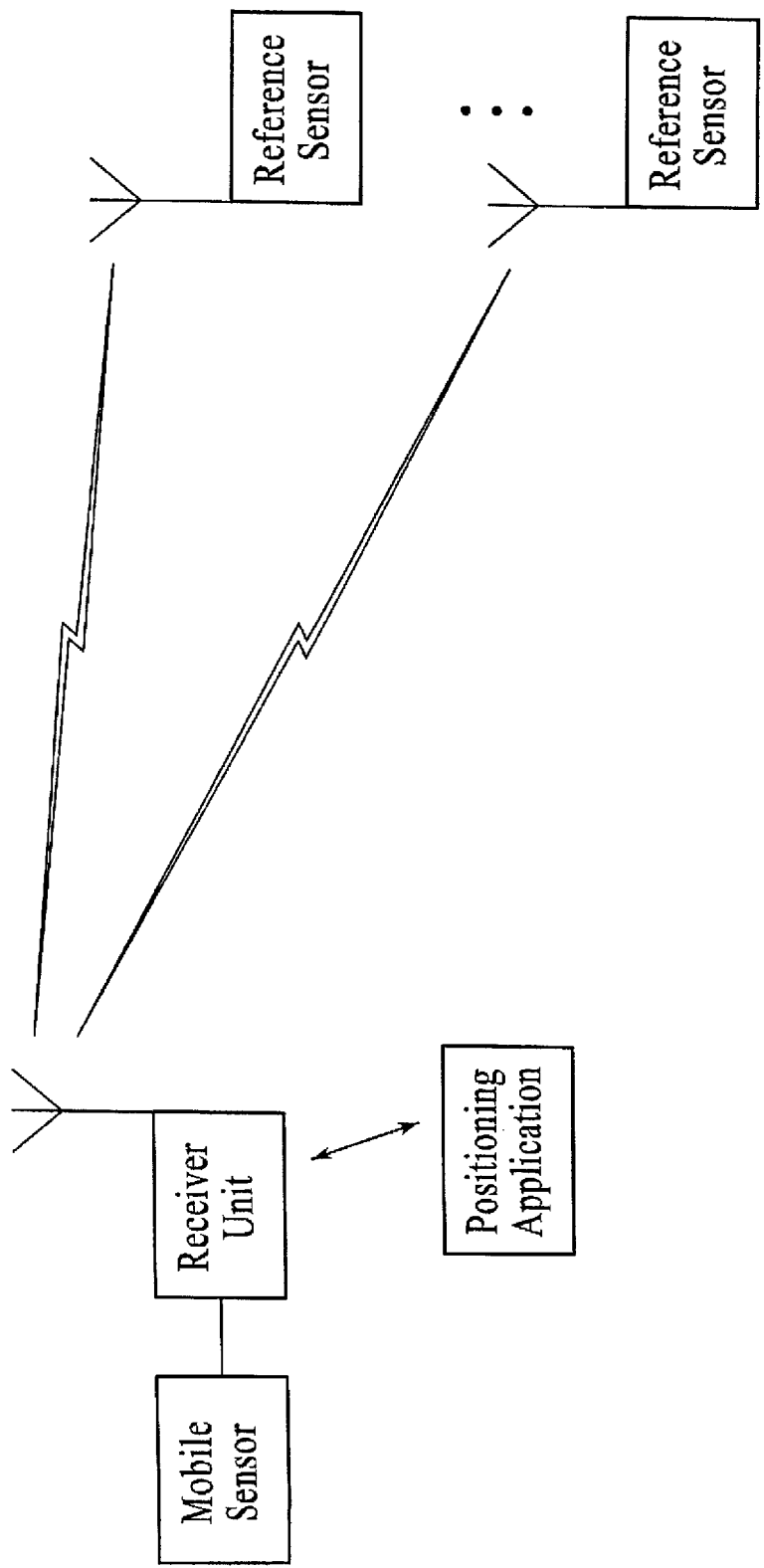
FIG. 36 is a block diagram of a reference elevation pressure system, under an embodiment.

FIG. 36 is a block diagram of a reference elevation pressure system, under an embodiment. Generally, the reference elevation pressure system, or reference system, includes a reference sensor array comprising at least one set of reference sensor units. Each set of reference sensor units includes at least one reference sensor unit positioned at a known location. The system also includes a remote receiver comprising or coupled to an atmospheric sensor that collects atmospheric data at a position of the remote receiver. A positioning application running on a processor is coupled to or is a component of the remote receiver. The positioning application generates a reference pressure estimate at the position of the remote receiver using the atmospheric data and reference data from the reference sensor unit(s) of the reference sensor array. The positioning application computes an elevation of the remote receiver using the reference pressure estimate.

More specifically, the reference elevation pressure system includes a mobile sensor that determines pressure and temperature at the unknown location with sufficient accuracy, and the mobile sensor is a component of or coupled to the remote receiver. The system includes a reference sensor array that comprises at least one reference sensor unit that accurately determines pressure and temperature at a known location that is appropriate to a location of the remote receiver. The reference sensor units communicate with the remote receiver and/or an intermediate device (e.g., server, repeater, etc.) (not shown) to provide the reference information. The system comprises a positioning application that, in an embodiment, is an interpolation-based estimation algorithm which inputs all reference sensor data, reference sensor locations and other augmenting information, and generates a relatively accurate reference pressure estimation at a location of interest. The positioning application can be a component of the remote receiver, can be hosted on a remote server or other processing device, or can be distributed between the remote receiver and a remote processing device.

Figure 37:
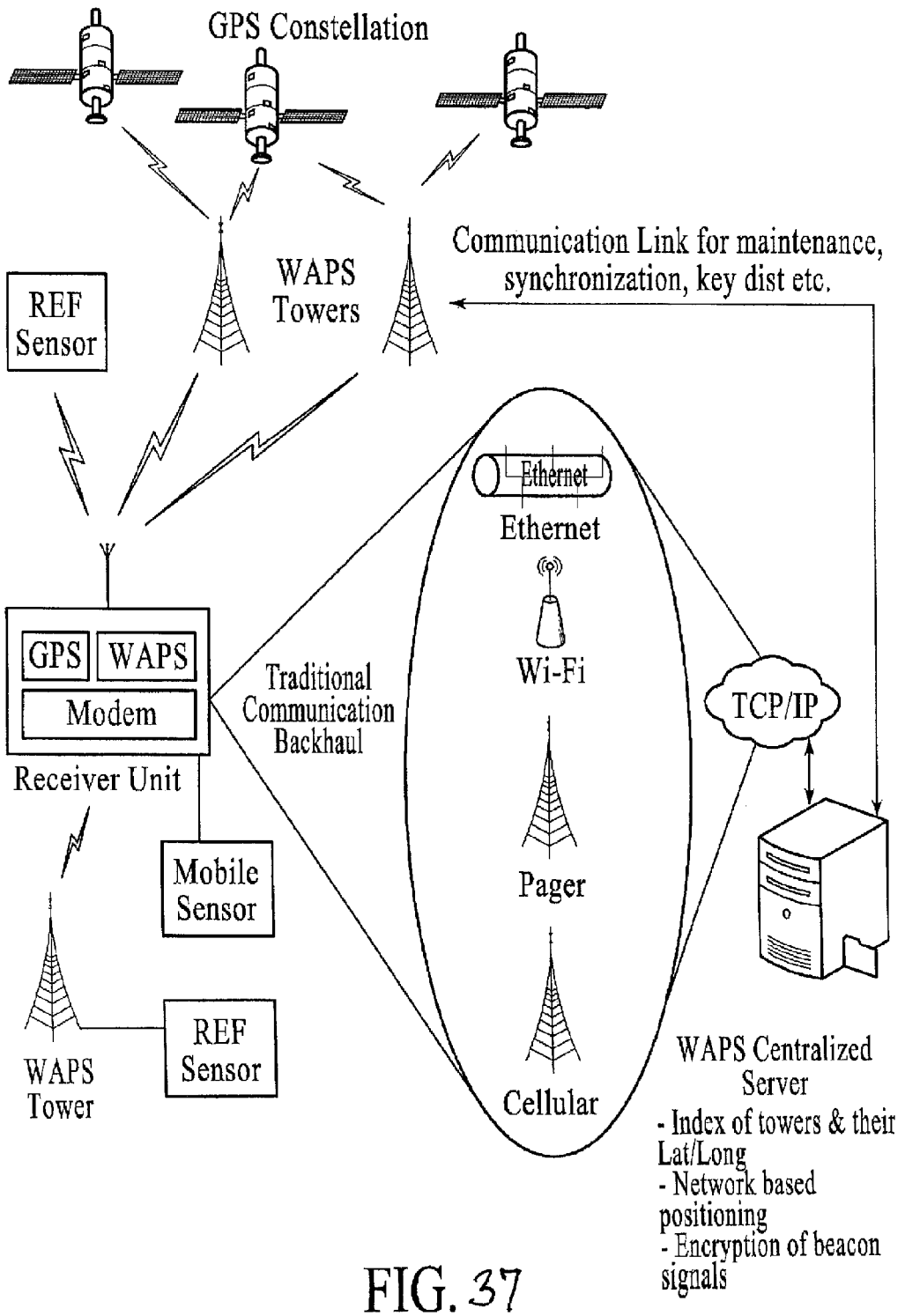
FIG. 37 is a block diagram of the WAPS integrating the reference elevation pressure system, under an embodiment.

FIG. 37 is a block diagram of the WAPS integrating the reference elevation pressure system, under an embodiment. As described herein, the WAPS includes a network of synchronized beacons, receiver units that acquire and track the beacons and/or Global Positioning System (GPS) satellites (and optionally have a location computation engine), and a server that comprises an index of the towers, a billing interface, a proprietary encryption algorithm (and optionally a location computation engine). The system operates in the licensed/unlicensed bands of operation and transmits a proprietary waveform for the purposes of location and navigation purposes. The WAPS system can be used in conjunction with other positioning systems or sensor systems in order to provide more accurate location solutions. Note that the elevation of the remote receiver computed using the reference pressure estimate can be used either explicitly as an altitude estimate or implicitly to aid the position calculation in any position location system.

One example system integrates the reference elevation pressure system with the WAPS. Generally, the integrated system comprises a terrestrial transmitter network including transmitters that broadcast positioning signals comprising at least ranging signals and positioning system information. A ranging signal comprises information used to measure a distance to a transmitter broadcasting the ranging signal. The system includes a reference sensor array comprising at least one reference sensor unit positioned at a known location. The remote receiver comprises or is coupled to an atmospheric sensor that collects atmospheric data at a position of the remote receiver. A positioning application running on a processor is coupled to or is a component of the remote receiver. The positioning application generates a reference pressure estimate at the position of the remote receiver using the atmospheric data and reference data from a set of reference sensor units of the reference sensor array. The positioning application computes the position of the remote receiver, which includes an elevation, using the reference pressure estimate and information derived from at least one of the positioning signals and satellite signals that are signals of a satellite-based positioning system.

More specifically, this integrated system includes a mobile sensor that determines pressure and temperature at the unknown location with sufficient accuracy. The mobile sensor is a component of or coupled to the remote receiver, but is not so limited. The system includes a reference sensor array that comprises at least one reference sensor unit that accurately determines pressure and temperature at a known location that is appropriate to a location of the remote receiver. The reference sensor units communicate with the remote receiver and/or an intermediate device (e.g., server, repeater, etc.) (not shown) to provide the reference information. The reference sensor units can be collocated with one or more WAPS transmitters and/or can be separately located at other known locations. The system comprises a positioning application that, in an embodiment, is an interpolation-based estimation algorithm which inputs all reference sensor data, reference sensor locations and other augmenting information, and generates a reference pressure estimation at a location of interest. The positioning application can be a component of the remote receiver, can be hosted on the WAPS server or other processing device, or can be distributed between the remote receiver and the WAPS server.

As noted above, the mobile sensor should be able to determine pressure with a resolution and accuracy that is significantly finer than 36 Pa, Many pressure sensors have built-in temperature sensors in order to provide compensation for non-ideal sensor performance, but due to self-heating effects, these sensors may not provide a sufficiently accurate measure of outside air temperature. Even in cases where accurate sensors are not available commercially, if sensors with adequate resolution are available, they can be used for the purposes of altitude estimation at the floor level. The mobile sensor of an embodiment determines the reference pressure data with a resolution approximately less than 36 Pascal, and determines the temperature data with a resolution at least one of equal to and less than approximately 3 degrees Celsius.

These sensors have inherent short term and long term stability issues which may be corrected by modest filtering techniques such as averaging a few samples. Each sensor may also have an offset that may vary with temperature which needs to be calibrated or compensated by means of a look up table, for example.

With sufficient calibration, these sensors should provide the accuracy needed. Some sensors may also be sensitive to high rates of motion. Some heuristic rules may be used to limit use of pressure information when high velocities or acceleration are recognized. However, high velocities are rarely experienced in indoor environments. When traveling at high speeds, GPS positioning and map data will typically provide sufficient vertical position information.

It should also be noted that the sensor should be mounted in a manner that exposes it to outside air, but not wind, draft, or other air movement. A mounting or positioning internal to a typical consumer product should produce acceptable results. The battery compartment and connectors provide an indirect path for outside air to get to the sensor, while preventing any direct air movement. However, a water proof device would need special provisions to provide the sensor with access to the outside.

The reference sensors will be deployed in much smaller volumes, and at dedicated sites, so relatively better accuracy can be obtained in the reference system, making it possible to allocate the bulk of the overall error budget to the mobile sensors. Existing markets for absolute pressure sensors, such as weather and aircraft altimeters, do not have the same high accuracy requirements as the application of an embodiment. In the reference application, an embodiment uses multiple sensors, both for redundancy and for improved accuracy by averaging their measurements. In addition, the sensors may be packaged so as to limit the temperature range to which the sensor is exposed and optimally calibrate the sensor for this limited temperature range.

The reference system should average or otherwise filter individual measurements to improve accuracy with a time scale in the order of a few seconds to a few minutes. The height of the reference sensor should be measured to a 'cm' level accuracy; the outside air temperature should be continuously measured and logged; the sensor should be exposed to outside air in order to measure the air pressure, but must not be subject to wind, drafts, or other significant air movement (baffles or other packaging can be used to direct air along an indirect path to the sensor); the sensor should not be sealed in a water proof enclosure, as this can prevent measurement of outside air pressure. The reference sensor of an embodiment determines the reference pressure data with a resolution approximately less than 36 Pascal, and determines the temperature data with a resolution at least one of equal to and less than approximately 3 degrees Celsius.

An embodiment enables interpolation-based reference pressure estimation. Given the pressure and temperature measurements at each WAPS transmitter tower, as well as the tower location and other augmenting information, an embodiment predicts the sea level atmospheric pressure at the mobile user location as the reference value for user height estimation. Therefore, an atmospheric pressure surface gradient model is generated and the pressure measurements at each tower site serve as the sample data for local modification of the model. Therefore, this estimation algorithm calibrates comparable reference pressure accuracy at the user location as the direct measurements captured at the beacon tower.

A description of a formulation of this interpolation is described below. Within one of the WAPS network, given reference barometric pressure sensors at n transmitter towers, the equivalent sea level atmospheric pressure is estimated based on the reference sensor outputs. This is done in two steps, but is not so limited.

As a first step, given the reference sensor height $h_i$ (in meters) above sea level at transmitter tower i, and the pressure $p_i$ (in Pascal) and temperature $T_i$ (in Kelvin) readings from the reference sensor, the equivalent sea level atmospheric pressure $P_i$ (in Pascal) is calculated at location with latitude $x_i$ and longitude $y_i$ (in degrees), using the formula below:

$$P_i = p_i e^{\frac{gh_i}{RT_i}}$$

where g is the gravitational acceleration constant and R is the specific gas constant for air. As a second step, after calculating the equivalent sea level atmospheric pressures at all n transmitter locations of the WAPS network, and obtaining the latitude $x_0$ and longitude $y_0$ information of the user with WAPS, the equivalent sea level pressure is estimated at the user location $P_0$ with the formula below:

$$P_0 = \sum_{i=1}^{n} W_i P_i$$

where $W_i = W_i(x_0, y_0, x_i, y_i)$ is the weighting function depending on both the user location and the reference site i location.

The communications link of an embodiment provides the information used by the mobile sensor. An embodiment broadcasts pressure updates once every few seconds to few minutes but is not so limited.

If the reference system broadcasts reference information infrequently, the mobile unit performs at least one of the following: continuously monitors the broadcasts to receive and store the last information in case it is needed before the next broadcast; waits for the next broadcast before computing a new elevation; "pulls" or queries the reference system for the latest information when needed. The Pull approach of an embodiment, rather than having the reference systems broadcast the information, minimizes system bandwidth. However, the Pull uses two-way communications between the reference system and the mobile, and since multiple reference sites would be used for any mobile calculation, so it requires the mobile to determine which reference sites it should query. A good compromise to minimize monitoring by the mobile, while keeping latency low, has the reference system broadcast its data more frequently than the time it takes to update the measurement.

An embodiment includes two possible approaches for the information content. A first approach has the mobile perform all of the calculations, in which case the information sent by the reference includes but is not limited to the following: reference location (latitude and longitude) with one meter accuracy; height of reference sensor with 0.1-0.2 m accuracy; measured temperature of air at reference site (after some filtering); measured pressure of air at reference site (after filtering, sensor temperature compensation, and any other local calibration such as offset), with one Pa accuracy; and a measure of confidence.

Alternatively, the reference site can use its temperature and pressure measurements to compute an equivalent sea level pressure. If this approach is used, the list of information to be broadcast includes but is not limited to the following: reference location (latitude and longitude) with one meter accuracy; height of reference sensor with 0.1-0.2 m accuracy; computed equivalent sea level pressure at reference site (with one Pa accuracy); a measure of confidence.

An embodiment also reduces the bits of data transmitted but broadcasts each piece of data relative to some known constant. For example, the reference sites are relatively close to the mobile site, so only the fractional degrees of latitude and longitude may be transmitted, leaving the integer part to be assumed. Similarly, air pressure, although typically on the order of $10^5$ Pascals, only varies by a few thousand Pa from the standard atmosphere. Thus, an embodiment broadcasts the offset from standard atmospheric pressure to reduce the bandwidth over broadcasting the absolute pressure.

Latitude and longitude, as obtained from GPS or similar systems, are not particularly useful in urban applications. Instead a database is needed to map latitude and longitude into street addresses. Elevation has a similar limitation in the vertical dimension. The useful parameter is which floor a person is on. This can be determined accurately from elevation information if there is access to a database of the ground level elevation and the height of each floor in a building. For low buildings up to approximately 3 stories, it may be sufficient to know ground level elevation from mapping or similar databases, and estimate floor height. For taller buildings more accurate information about floor height will be needed.

This presents an opportunity to implement smart learning algorithms. For example, one can assume that cell phones will be carried between 1 m and 2 m from the floor. Thus, the system of an embodiment can accumulate the elevations of many cell phones in a building, wherein the data is expected to cluster around 1.5 m from each floor. With enough data, it is possible to develop confidence as to the height of each floor in the building. Thus, the database could be learned and refined over time. Such an algorithm becomes more complicated in buildings with ramps, or mezzanines between floors, but may still generate useful data for the majority of buildings.

The sensor offsets, and potentially other parameters, can be calibrated at the time of manufacture. This should be possible by cycling the sensors through a range of temperature and pressure with a known good sensor providing reference information. It is likely that these calibration parameters will slowly drift with age. Therefore, an embodiment uses an algorithm to gradually update the calibration over time (e.g., algorithm recognizes when a sensor is stationary at a known height and updates the calibration table under those conditions).

In addition to the general application of determining a person's location, an embodiment may include specialized applications that use more precise relative elevation information, while not needing absolute elevation information. For example, finding a downed firefighter in a building requires that the position of the downed person relative to the rescue party be known precisely, but neither absolute position is as important. Additional precision in relative positioning would be possible by having an extra manual step at the beginning of the application. For example, all firefighters could initialize there trackers at a known location, such as the entrance to the building, before they enter. Their position relative to that point, and thus relative to each other could be determined quite accurately for a period of time, even if absolute elevation is not accurate, and weather related pressure changes cannot be completely compensated for. Similarly, a shopping related application that requires more precision than available from the absolute measurements could be implemented by having the user press a button at a known point in the mall. Their position relative to that point could then be determined quite accurately for a period of time.

Alternatively, a mobile beacon can be utilized as a local reference to provide more accuracy in a particular location. For example, a shopping mall could have its own reference sensor, to provide more accuracy within the mall. Similarly, a fire truck could be equipped with a reference sensor to provide local reference information at the scene of a fire.

Low cost pressure sensors have a problem in that they have an offset from the correct reading. Experiments have shown that this offset is quite stable on time scales of weeks to months. However, it is likely that this offset will slowly drift with time over a period of many months to years. While it is straightforward to measure this offset, and compensate for it at the time of manufacture, it is unlikely that the compensation will stay accurate for the life of the product. Therefore, a means of recalibrating in the field is required.

The sensor of an embodiment can be recalibrated if it is at a known elevation and the atmospheric pressure is known. The embodiment identifies practical situations where the sensor will be at a known elevation. For example, if the sensor is in a device that has GPS capability, and the GPS satellites are being received with high signal strength, the GPS derived altitude should be quite accurate. Accumulating the deviations from GPS altitude over time, under good signal conditions, can provide an estimate of the correction needed to the sensor calibration.

Similarly, the sensor system can learn the user's habits and use this information to later correct the calibration. For example, if the user consistently places her phone in one place at night, the sensor can start tracking the altitude at this location, perhaps at specific times, such as late night. Initially, these values would be accumulated and stored as the true altitude at that location. After several months, when the sensor determines that it is in the same location at the same time of night, it could start to track deviations from the true altitude determined earlier. These deviations could then be accumulated to slowly generate a correction to the calibration. Because these approaches also use knowledge of current atmospheric pressure, they use reference pressure measurements provided by the WAPS network.

The standard process for determining altitude from pressure readings involves converting the measurements at a reference location to the equivalent sea level pressure, and then using that to determine the altitude of the unknown pressure sensor. The standard formula is:

$$z = -\frac{RT}{g}\ln\left(\frac{P}{P_0}\right)$$

Note that a minus sign has been added, since height is conventionally measured as positive moving away from the surface of the earth. In addition, the logarithm has been corrected to 'ln' since this is a natural logarithm. This formula relates, z, the height above sea level, to the atmospheric temperature (T) and pressure (P) at that point, and the sea level air pressure ($P_0$) below that point.

One additional problem with applying this formula is that the height is directly proportional to the temperature, a measured quantity not known precisely. This means that a 1% error in temperature will result in a 1% error in height. When used near sea level this will not be a significant problem. However, when this formula is applied in tall buildings and especially in higher elevation areas, such as Denver, a 1% error in height may be significant when attempting to resolve floor level elevation. For example, the elevation of Denver is about 1608 m. Thus, a 1% error in temperature will result in an error in height above sea level of 16 m. This is nearly 5 floors.

One way to avoid this sensitivity to temperature accuracy is to recognize that the formula above is actually a relative formula. That is the formula can be generalized to:

$$z_1 - z_2 = -\frac{RT}{g} \ln\left(\frac{P_1}{P_2}\right)$$

where $z_1$ and $z_2$ are any two elevations, and $P_1$ and $P_2$ are the pressures at those elevations. It was only a matter of convention that $z_2$ was set to 0, and thus $P_2$ became the sea level pressure.

Instead of using sea level as the reference point, any convenient elevation could be used. For example, the mean elevation of the city would be reasonable, or the mean elevation of the reference sensors used for collecting pressure data would work. As long as a reference elevation is used that keeps the height differences small, the impact of temperature error will be insignificant. The only requirement is that all devices involved in the system know what reference elevation is being used.

There is a standard formula that relates elevation of a point above the earth (z), the atmospheric temperature (T) and pressure (P) at that point, and the sea level air pressure ($P_0$) below that point as $$z = \frac{RT}{g} \log\left(\frac{P}{P_0}\right)$$

This formula assumes that there is a column of air at constant temperature between sea level and the point of interest. Therefore, the sea level pressure used is a virtual construct, and not necessarily the real pressure at sea level, since the point of interest may not be near a true sea level.

The standard process for determining elevation of an object is a two step process. First sea level pressure is determined by measuring temperature and pressure at a point of known elevation, and then inverting this formula to solve for $P_0$. Next, the temperature and pressure at the point of unknown elevation are measured, and this formula is applied to determine the unknown elevation.

Implicit in this process is the assumption that only parameter of interest is the height of other objects above the same horizontal location, as is typical for aircraft approaching an airfield, using measurements at the airfield for reference. Typically, people interested in height determination for other purposes have extended this concept to determining the height in the general vicinity of a reference location, but not directly above it. This extension assumes that the sea level pressure does not change between the location of interest in the vicinity and the reference location.

Thus, there are three assumptions in this process. A first assumption is that the temperature is constant from the reference location to the virtual sea level point below it. A second assumption is that the temperature is constant from the point of interest to the virtual sea level point below it. A third assumption is that the sea level pressure is the same at the reference location and the point of interest. However, since sea level pressure depends upon temperature, assuming that the sea level pressure is the same at two locations implies that the temperature is the same at those locations. Thus, if different temperatures are measured at the reference location and point of interest, one of these assumptions has been violated. Measurements have shown that even over distances of a few kilometers, there are differences in temperature and in pressure that can be significant for elevation determination.

The assumption of constant temperature over elevation changes at a given location is part of the equilibrium model for the atmosphere, and is probably necessary. The only alternative would be a full dynamic model of the atmosphere, including the effects of wind, surface heating, convection, and turbulence. Atmospheric data suggest that at least on large distance scales, the constant temperature model is a very good approximation at elevations below 1 km. At higher elevations, a linear lapse rate is often applied.

An embodiment relaxes the assumption of constant sea level pressure between the reference location and the point of interest. A first approach of an embodiment takes the sea level pressure for the reference location determined as above, but further applies the ideal gas law to convert this to a sea level pressure at a standard temperature. Then assume that this sea level pressure at a standard temperature would be the same at the point of interest. The temperature at the new location would then be used to convert this to the sea level pressure for that location, and then apply the formula above to determine the elevation.

A second approach of an embodiment uses a network of reference locations to determine the variation of equivalent sea level pressure with horizontal location in real time. These multiple measurements are then combined to determine a best estimate of the sea level pressure at the point of interest. There are at least two possible ways of determining the best estimate: a weighted average approach in which the weighting is a function of the horizontal distance from the particular reference point to the point of interest; a least square fit to create a second order surface that best fits the computed sea level pressures at the reference locations and can then be used to interpolate an estimate of the sea level pressure at the point of interest.

The two approaches described above can also be combined. That is, at each reference location the sea level pressure at standard temperature is determined, and these data are combined using one of the techniques above to generate a best estimate of the sea level pressure at standard temperature at the point of interest.

Additionally, when using the altimeter, an embodiment recognizes sudden movements in pressure such as the air conditioner changing state (e.g., turning ON, etc.) or windows opening in a car by using application level data into the hardware or software filters that operate continuously on the location and altimeter data.

Further, a wind gauge can be used at the beacon to determine the direction of the wind flow, which is believed to be a indicator of atmospheric pressure gradient. A wind gauge along with a compass can be used to determine the precise direction and level of wind flow which can then be used to correct and/or filter our variations in the user's sensor.

The per floor height of a given building can be determined by various methods including but not limited to a user walking the building through the stairs and collecting information about each floor, ramps etc. In addition an electronic diagram can be used to determine the relative height of each floor.

When the height is estimated based on either WAPS or the altimeter, information such as terrain, height of the building, height of surrounding buildings, etc. can be used to constrain the height solution.

Once an average pressure is known at a given location, along with historical reference pressure data collected from the reference sensors over a long period of time (days, months, year), it can be used to predictably determine the height based on the pressure at that location (without calibration or user input).

In one embodiment, the height of the user can be computed on a remote server by using the data from the user's sensor and combining it with the data from reference sensors. In this method, other information such as building information, crowd sourced information, etc. can also be used to determine the user's precise altitude.

In case a user is in close proximity to another user whose height is known, this information can be used to determine the unknown user's height.

In one embodiment of the network, the reference sensors need not necessarily be co-located with the WAPS beacon. A finer or a coarser grid of independent sensors with data connection to the server can be used for reference pressure measurement. The centralized server can either send reference pressure information to the mobile or can instruct the transmitters with data that needs to be sent to the mobile as a part of the WAPS data stream.

In another embodiment, the WAPS system uses an additional simplified beacon (supplemental beacon) that provides additional sensor information such as pressure, temperature in a smaller area such as a building. This transmission may be synchronous or asynchronous to the main WAPS timing beacons. Additionally, the supplemental beacon may either upload the sensor data to a centralized server from which it is disseminated to the mobile units or transmit the data over a predefined set of PRN codes which can be demodulated by the WAPS mobile receiver.

The reference pressure network can be optimized based on accuracy requirements and historic pressure variation data for a given local area. For example, in cases where very accurate measurement is a must, a reference sensor can be deployed in that building or a mall.

The WAPS beacon network along with the reference pressure data forms a close network of accurate pressure and temperature measurement with very short time intervals which can be harnessed by other applications such as geodesy.

The rate of change of pressure combined with data from other sensors can be used to determine vertical velocity which can then be used to determine if a user went through an elevator. This can be very useful in emergency situations and/or tracking applications.

In cases of sensors with lower resolution than needed to estimate floor height, under static conditions, averaging the pressure measurements over time can be used to obtain the user height based on reference data.

Hybrid Positioning and Information Exchange with Other Systems

The system of an embodiment can be combined with any 'signal of opportunity', in order to provide positioning. Examples of a signal of opportunity include, but are not limited to, one or more of the following: GPS receivers; Galileo; Glonass; Analog or Digital TV Signal; signals from systems such as MediaFLO, Wi-Fi; FM signals; WiMax; cellular (UMTS, LTE, CDMA, GSM etc); bluetooth, and, LORAN and e-LORAN receivers.

Figure 38:
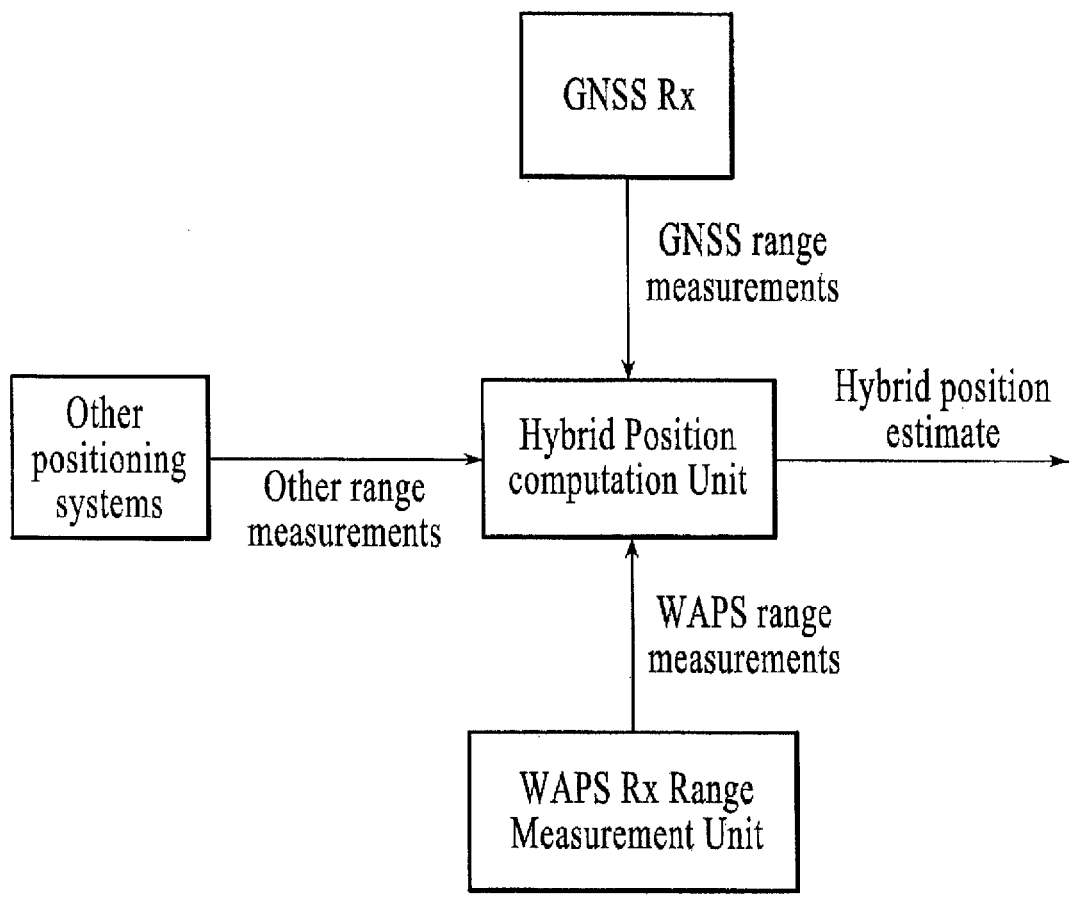
FIG. 38 is a block diagram of hybrid position estimation using range measurements from various systems, under an embodiment.
Figure 39:
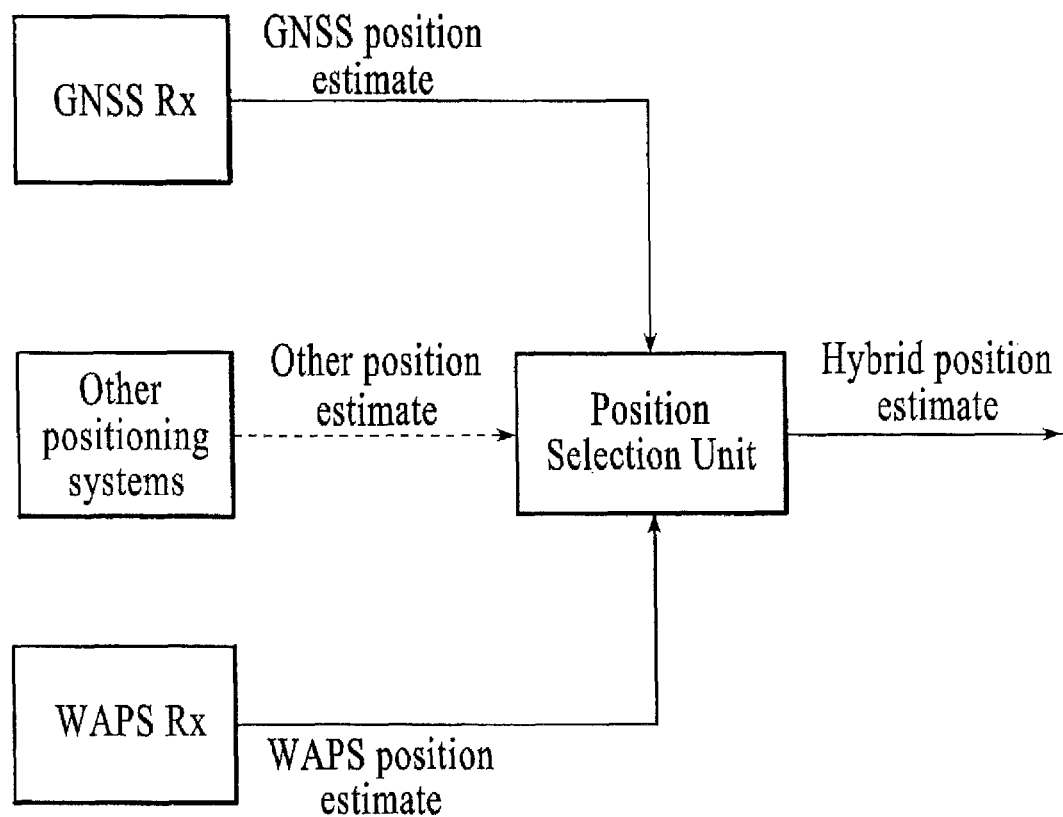
FIG. 39 is a block diagram of hybrid position estimation using position estimates from various systems, under an embodiment.
Figure 40:
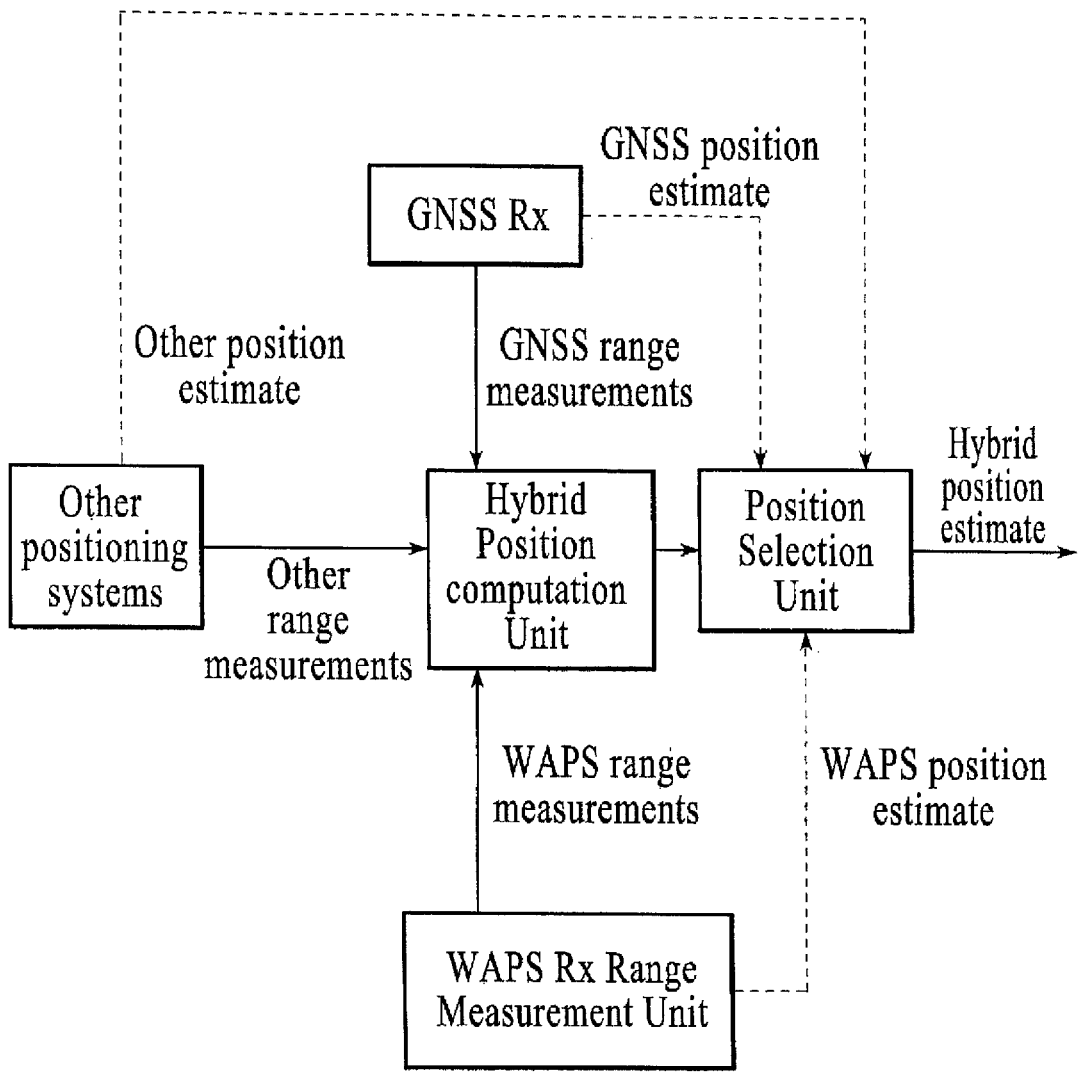
FIG. 40 is a block diagram of hybrid position estimation using a combination of range and position estimates from various systems, under an embodiment.

Regardless of signal type, the signal of opportunity provides a range measurement or a proxy for a range measurement, such as signal strength. This proxy for a range is weighed and combined appropriately to get an estimate for the location. The weighting may use the signal-to-noise ratio (SNR) of the received signals or, alternatively, use a metric that defines the environment of the receiver (e.g., knowledge of urban, suburban, rural environment from assistance data, whether the receiver is indoor or outdoor based on input from the application). This is typically done in those environments where the system of an embodiment is unavailable or signal coverage is limited. When using the SNR for a weight for a particular measurement the weight may simply be an inverse function of the SNR (or any other function that provides lower weight to signals with lower SNR) to allow optimal combination of the WAPS measurements as well as other system measurements to obtain a position. The final positioning solution may be calculated either by taking range measurements from the additional signal sources and combining with the WAPS range measurements and deriving a position solution for latitude, longitude and height, or by taking the position measurements from the additional sources/devices and the position measurements from the WAPS system and providing an optimized location solution using a combination of these location measurements based on the position quality metric from different systems. The various configurations of obtaining a hybrid solution using WAPS measurements/WAPS position estimates are shown in FIG. 38, FIG. 39, and FIG. 40. Any of the architectures described below can be selected for use depending on the hardware and software partitioning of the system.

FIG. 38 is a block diagram of hybrid position estimation using range measurements from various systems, under an embodiment. The range measurements (along with associated range quality metrics) are used from GNSS and other positioning systems and combined in a single optimal position solution by a hybrid position engine. This architecture is the most optimal in terms of using the available data to get the best position estimate out of them.

FIG. 39 is a block diagram of hybrid position estimation using position estimates from various systems, under an embodiment. Independent position estimates from different systems along with position quality are used to choose the one with the best quality. This architecture is the easiest to implement and integrate since the different positioning system are well isolated.

FIG. 40 is a block diagram of hybrid position estimation using a combination of range and position estimates from various systems, under an embodiment. For example, a position estimate from a WLAN positioning system can be compared with position estimate from range measurements from GNSS and WAPS systems to arrive at the best solution.

Inertial Navigation Sensors (INS) such as accelerometers and gyros, magnetic sensors such as e-compass, pressure sensors such as altimeters can be used to provide location aiding information (referred to as loose coupling) or raw sensor measurements (referred to as tight coupling) to the WAPS system for usage in tracking mode.

An accelerometer can be used in the receiver of an embodiment to determine a frequency for updating the position reporting to the server. A combination of sequence of position solutions and accelerometer measurements can be used to detect static position, constant velocity and/or other movement. This movement data or information can then be used to determine the frequency of the updates such that, for example, when there is non-uniform motion the frequency of updates can be set to a relatively high frequency, and when the receiver is at a constant velocity or stationary for a predetermined period of time the frequency of the updates can be reduced to save power.

Figure 41:
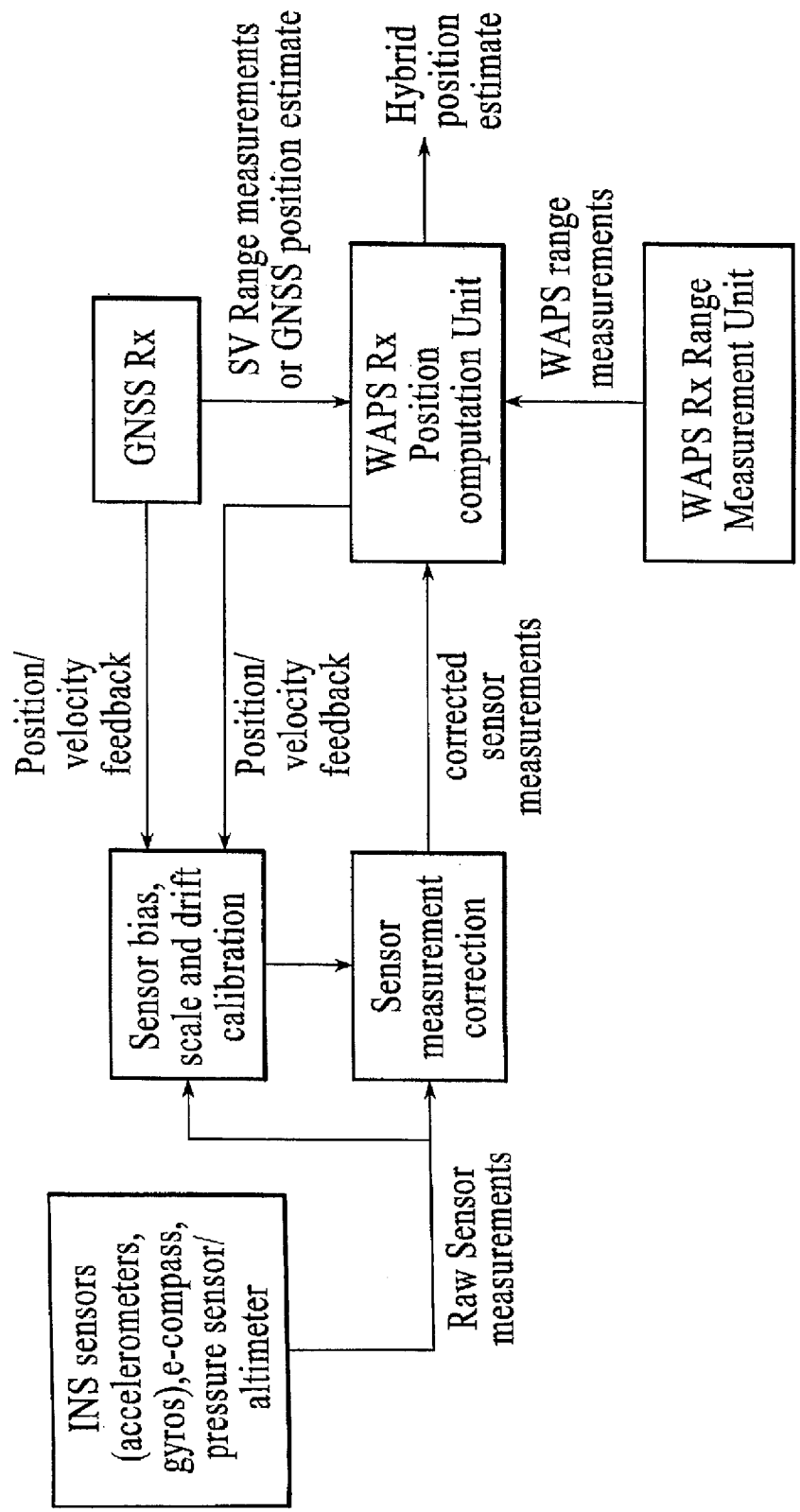
FIG. 41 is a flow diagram for determining a hybrid position solution in which position/velocity estimates from the WAPS/ GNSS systems are fed back to help calibrate the drifting bias of the sensors at times when the quality of the GNSS/WAPS position and/or velocity estimates are good, under an embodiment.
Figure 42:
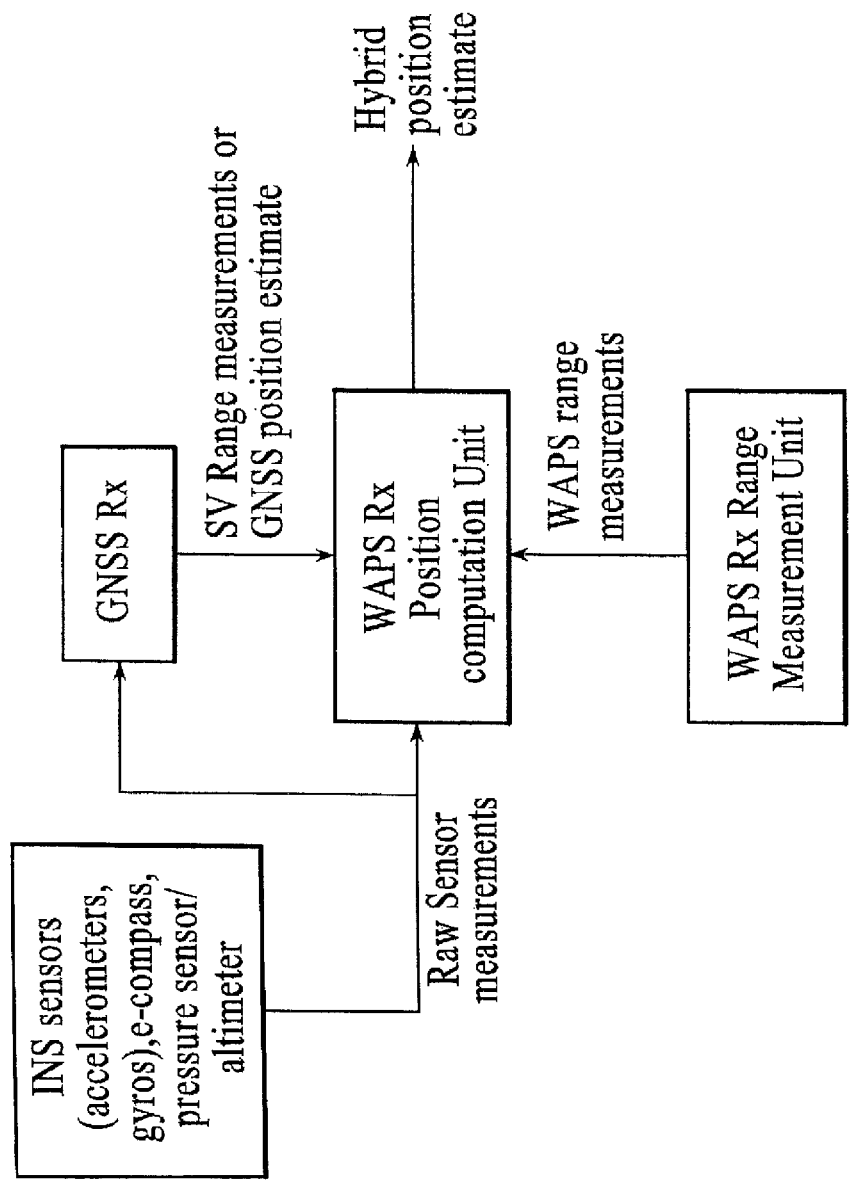
FIG. 42 is a flow diagram for determining a hybrid position solution in which sensor parameters (such as bias, scale and drift) are estimated as part of the position/velocity computation in the GNSS and/or WAPS units without need for explicit feedback, under an embodiment.

The sensor or position measurements can be combined into a position solution in a position filter (such as a Kalman filter). Two types of tight coupling architectures, where the sensor measurements are combined with GNSS and WAPS measurements in the WAPS hybrid position engine, are illustrated in FIG. 41 and FIG. 42. FIG. 41 is a flow diagram for determining a hybrid position solution in which position/velocity estimates from the WAPS/GNSS systems are fed back to help calibrate the drifting bias of the sensors at times when the quality of the GNSS/WAPS position and/or velocity estimates are good, under an embodiment. This architecture simplifies the algorithm formulation by partitioning the sensor calibration and position calculation parts of the algorithm. However, the drawback of this method is the complexity in deciding when are the good times to re-calibrate the sensors using WAPS/GNSS estimates.

FIG. 42 is a flow diagram for determining a hybrid position solution in which sensor parameters (such as bias, scale and drift) are estimated as part of the position/velocity computation in the GNSS and/or WAPS units without need for explicit feedback, under an embodiment. For example, the sensor parameters can be included as part of the state vector of the Kalman filter used for tracking the position/velocity of the receiver. This architecture provides an optimal solution in that the information is used in one combined filter to update both position and sensor parameters.

Figure 43:
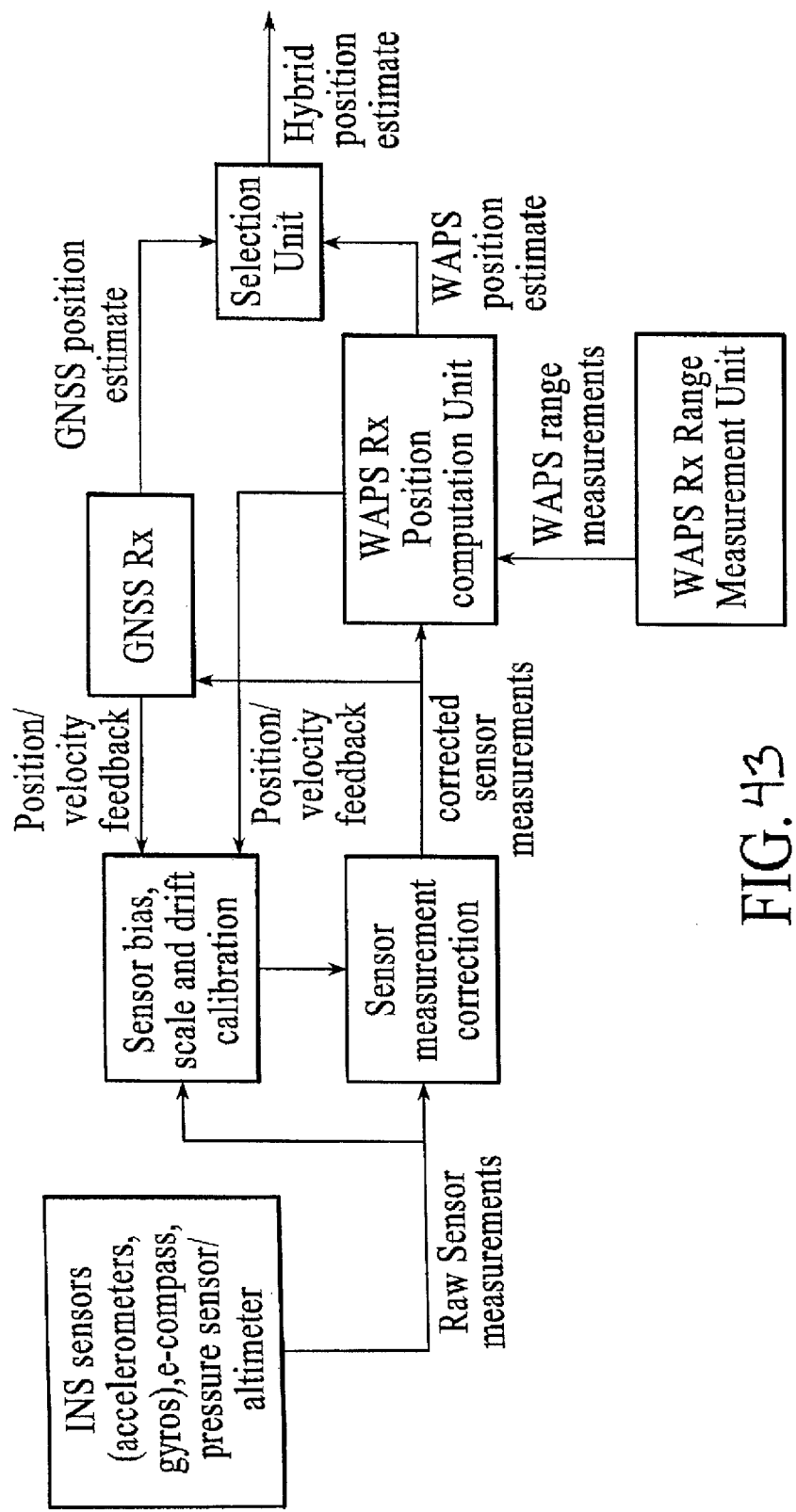
FIG. 43 is a flow diagram for determining a hybrid position solution in which sensor calibration is separated from the individual position computation units, under an embodiment.
Figure 44:
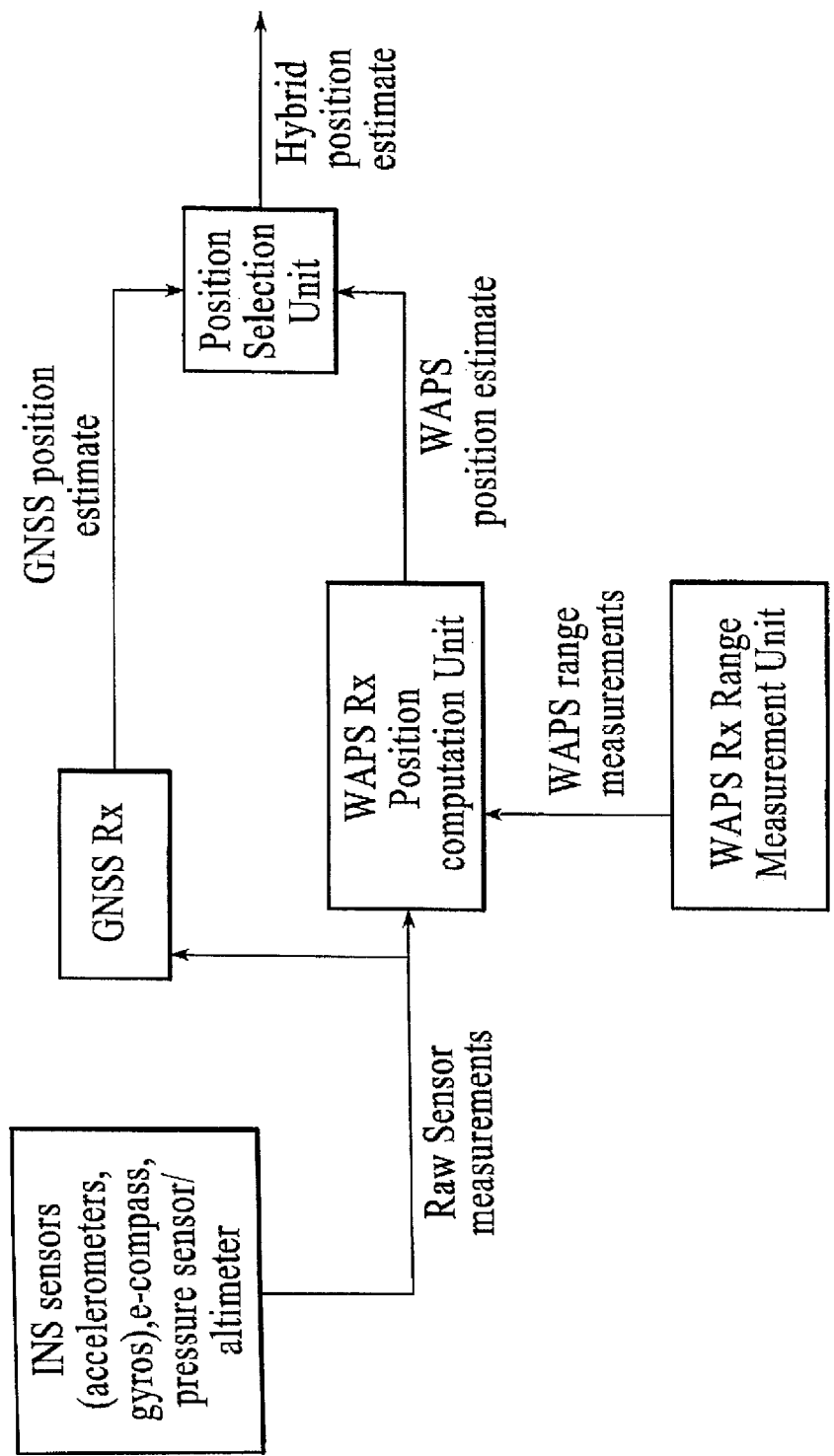
FIG. 44 is a flow diagram for determining a hybrid position solution in which the sensor parameter estimation is done as part of the state of the individual position computation units, under an embodiment.

Loose coupling is illustrated in FIG. 43 and FIG. 44 where a selection unit selects between position estimate from the GNSS engine and the WAPS engine. Note that the selection unit may be part of the WAPS or GNSS position units. FIG. 43 is a flow diagram for determining a hybrid position solution in which sensor calibration is separated from the individual position computation units, under an embodiment. FIG. 44 is a flow diagram for determining a hybrid position solution in which the sensor parameter estimation is done as part of the state of the individual position computation units, under an embodiment.

The loose coupling methods are generally worse than the tight coupling methods since a selection uses information only from one system. Amongst loose coupling or tight coupling methods, the method that uses the ranges along with raw sensor measurements to determine position and sensor parameters in one optimal filter are better than when sensor parameters and position are computed separately. As a result, the preferred method from a performance perspective is the tight coupling system with implicit sensor parameter estimation. However, depending on the hardware/software platform partitioning, one or more of these methods may be easily implemented and may be selected for that reason.

Figure 45:
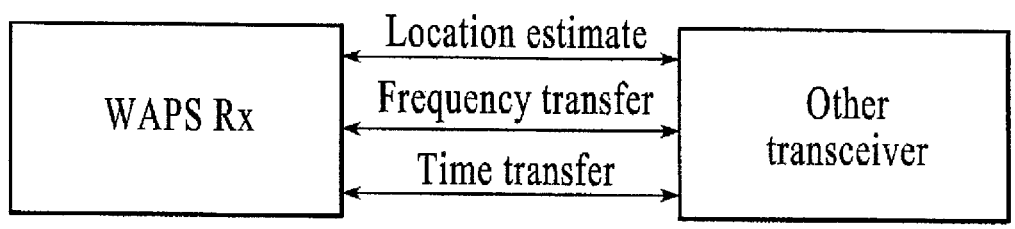
FIG. 45 shows the exchange of information between the WAPS and other systems, under an embodiment.

Information can also be exchanged between the WAPS system and other transceiver systems on the same platform (such as cell-phone, laptop, PND). The transceiver systems can be, for example, Bluetooth transceiver, WLAN transceiver, FM receiver/transmitter, digital or analog TV system, MediaFLO, satellite communication system such as XM radio/Iridium, Cellular modem transceivers such as GSM/UMTS/cdma2000 1x/EVDO or WiMax). FIG. 45 shows the exchange of information between the WAPS and other systems, under an embodiment. The exchange of information between systems can improve the performance of either system. Since the WAPS system time is aligned to GPS time, the WAPS system can provide good quality timing and frequency estimates to any other system. Time and frequency estimates into the WAPS system can reduce the WAPS acquisition search space in code and frequency. In addition, the WAPS system can provide location information to the other transceiver systems. Similarly, if the other system has location information (partial position e.g., Altitude or 2-D position, or full position e.g., 3-D position or raw range/pseudo-range/range-difference) available, that location information can be provided with or without a location quality metric to the WAPS system. The range/pseudo-range data should be provided along with the location of transmitter (or other means to compute the range from the transmitter location to any receiver location) to enable usage of this range information in a hybrid solution. The range difference corresponding to two transmitters should be provided along with location of the two transmitters. The WAPS system will use the information to aid its position solution. Alternatively, location information can be provided in the form of ranges (or pseudo-ranges) from known transmitter locations to the receiver device. These ranges (or pseudo-ranges) would be combined with WAPS ranges by the positioning algorithm to compute a hybrid position.

Figure 46:
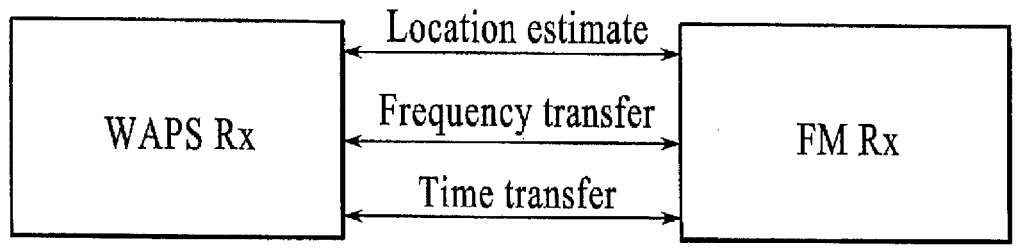
FIG. 46 is a block diagram showing exchange of location, frequency and time estimates between FM receiver and WAPS receiver, under an embodiment.
Figure 47:
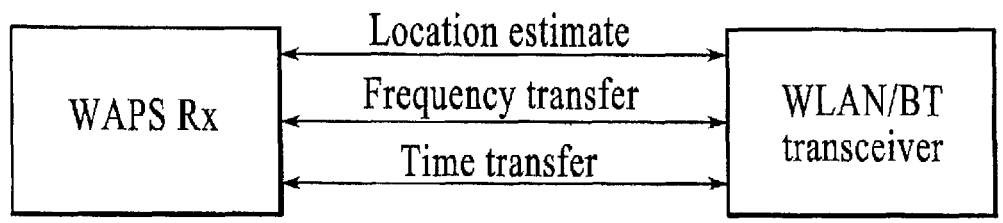
FIG. 47 is a block diagram showing exchange of location, time and frequency estimates between WLAN/BT transceiver and WAPS Receiver, under an embodiment.
Figure 48:
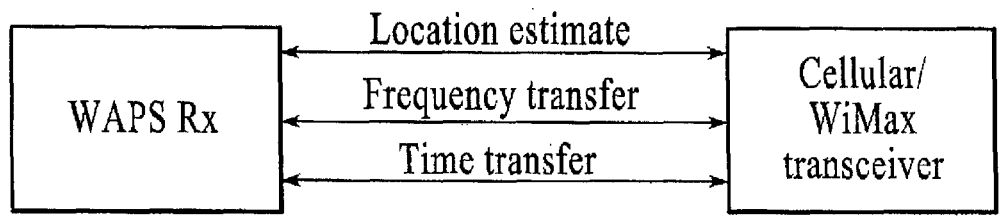
FIG. 48 is a block diagram showing exchange of location, time and frequency estimates between cellular transceiver and WAPS receiver, under an embodiment.

Examples of specific systems and information that can be exchanged between them are shown in FIG. 46, FIG. 47, and FIG. 48.

FIG. 46 is a block diagram showing exchange of location, frequency and time estimates between FM receiver and WAPS receiver, under an embodiment. The location estimates from WAPS system can be provided to an FM Receiver. This location estimate may then be used, for example, to automatically determine active FM radio stations in the local region. The FM signal may include a RDS—Radio Data Service) transmission as well. If the location of the FM station is included in the RDS/RBDS data-stream (for example, the Location and Navigation (LN) feature that provide data about the transmitter site, giving city and state name and provide DGPS navigation data) then this information can be used to provide location aiding to the WAPS Receiver. The frequency estimate from the WAPS system can be easily used to reduce the FM Receiver tuning time for a particular station. In the other direction, the frequency quality of the estimate in the FM Receiver is based on the FM radio station transmit quality. The time estimate in the WAPS system is based on GPS time and time can be transferred to the FM Receiver to aid timing alignment. Clock Time (CT) feature on RDS/RBDS transmissions may be used to determine timing relative to the RDS data stream and can be transferred to the WAPS receiver.

FIG. 47 is a block diagram showing exchange of location, time and frequency estimates between WLAN/BT transceiver and WAPS Receiver, under an embodiment. In general, these WLAN/BT transceivers do not have an accurate frequency estimate and as a result the frequency estimates would be quite coarse, so the transfer of such an estimate from WLAN/BT transceiver to WAPS receiver may have limited value. In the reverse direction, a WAPS frequency estimate can reduce the time taken for frequency acquisition on the WLAN system. The timing information that is extracted, for example, from the timestamp on the wireless LAN AP (Access Point) beacons can be transferred to the WAPS system to aid WAPS acquisition. Note that some reference of the WLAN timing relative to GPS time is needed to make this useful for the WAPS system. Similarly, if the WLAN/BT system has a location estimate (partial position e.g., Altitude or 2-D position, or full position e.g., 3-D position or raw range/pseudo-range) available, that location information can be provided with or without a location quality metric to the WAPS system. The WLAN position estimate could simply be the geo-location of the serving AP or other "audible" APs in the vicinity. The WLAN position estimate could also be partial, for example, the altitude estimate based on the floor of the AP in question. The WLAN location information can also be a range estimate to a known transmitter AP location (for example, the WLAN system may use Round Trip Time measurements to determine range estimate) or a range difference estimate between two transmit APs.

FIG. 48 is a block diagram showing exchange of location, time and frequency estimates between cellular transceiver and WAPS receiver, under an embodiment. Location estimates (partial, complete or raw ranges/range-differences) from cellular systems (such as from TDOA, AFLT or other similar cellular signal FL or RL based positioning method) can be provided to the WAPS system which will use these measurements to obtain a better position estimate. Frequency estimates from the frequency tracking loops of the cellular modem can be provided to the WAPS system to reduce the frequency search space and thus improve WAPS acquisition time (i.e. TTFF). Time estimates from the cellular system can also be provided to the WAPS system to reduce the code search space or to aid bit and frame alignment. For example, systems that are synchronized to GPS time such as cdma2000/1×EVDO can provide fine time estimates for the WAPS system whereas asynchronous (transmissions not synchronized finely to time scale such as GPS) cellular systems such as GSM/GPRS/EGPRS/UMTS may provide coarse time estimates.

Since the WAPS system time is aligned to GPS time, the WAPS system can provide good quality timing and frequency estimates to any other system even if not on the same platform. For example, the WAPS system can be used to provide timing information to a pico/femto-cell BTS through a periodic hardware signal such as a pps (pulse-per-sec) aligned with GPS second-boundaries or a single pulse signal with an associated GPS time.

As described above, the spectrum used by the WAPS system of an embodiment can include licensed or unlicensed bands or frequencies. Alternatively, the WAPS system can use the "White Space" spectrum. The white space spectrum is defined as any spectrum that the WAPS systems senses or determines to be free in a local area (not limited to TV White Space) and transmits location beacons in that spectrum. The transmitters of an embodiment can use spectrum-sensing technology to detect unused spectrum and/or communicate geo-location (can be readily obtained from the GPS timing receiver) to a centralized database that coordinates the spectrum. The receivers can include spectrum-sensing technology to listen to these beacons, or in another embodiment, may be notified of the frequency to which to tune using the communication medium. The WAPS system can adapt to dynamic white space availability or allocation (in cases where the transmitters are required to broadcast their geo-location to a centralized database which then allocates either the spectrum to transmit in and/or the time duration for which it needs to transmit). The WAPS system can continuously broadcast in this spectrum or can share the spectrum with other systems as controlled by a centralized coordination service for the spectrum. The chipping rate and the data rate of the WAPS system components can be modified dynamically to suit the accuracy requirements and/or signal power and bandwidth availability at any given time. The system parameters can be sensed by the receiver or can be communicated to the receiver through the communication medium. The transmitters can form a local network or in cases of spectrum availability in a wider geographical area, can form a continuous network.

The transmitter of an embodiment can also coexist with other networks on the same transmit system in a time-shared fashion. For example, the same spectrum can be used in a time-shared fashion between location and smart grid applications. The transmitter is a broadcast transmitter using the maximum available power levels and can adjust its power levels dynamically based on spectrum sensing or as requested by a centralized coordinating server. The receiver can employ spectrum sensing or can be communicated by a communication medium (which can also be a white space spectrum) of the system parameters and wake up times at that time.

Based on spectrum availability, the WAPS system of an embodiment can use one channel of the TV White space (6 MHz bandwidth) or, if multiple channels are available, can use the multiple frequency bands for better multipath resolution. If adjacent channels are available, channel bonding (e.g., combining adjacent channels) can be used. The increased bandwidth can be used for better multipath resolution, higher chipping rate for higher accuracy, etc. Alternatively, the available bandwidth can be used under FDMA to help solve the near far problem and/or multipath resolution.

White space transmission/reception of WAPS waveforms in two or more white-space bands can enable better and faster integer ambiguity resolution for WAPS carrier phase measurements. This will enable relatively high accuracy (of the order of <1 wavelength) single point positioning using WAPS.

The whitespace bandwidth can also be used as a communication channel in the WAPS (in cases where a reference receiver is used) between the reference receiver at surveyed location and the receiver whose position is to be found.

When a WAPS system in the licensed band is available in a wide area network, a White-Space based local network of towers can be used to augment the location accuracies of the WAPS receiver. The receiver can be designed to listen to both frequencies simultaneously or switch between the licensed band and white space band and tune to the appropriate frequencies.

The White-space bands can also be used to send assistance information to the WAPS, GPS or AGPS systems for location aiding and other assistance information like clock bias, satellite ephemeris etc.

In cases where multiple frequencies with wide separation are available, the WAPS system can be designed to take advantage of the diversity in frequencies to provide better multipath performance.

Correlator Implementation

Figure 49:
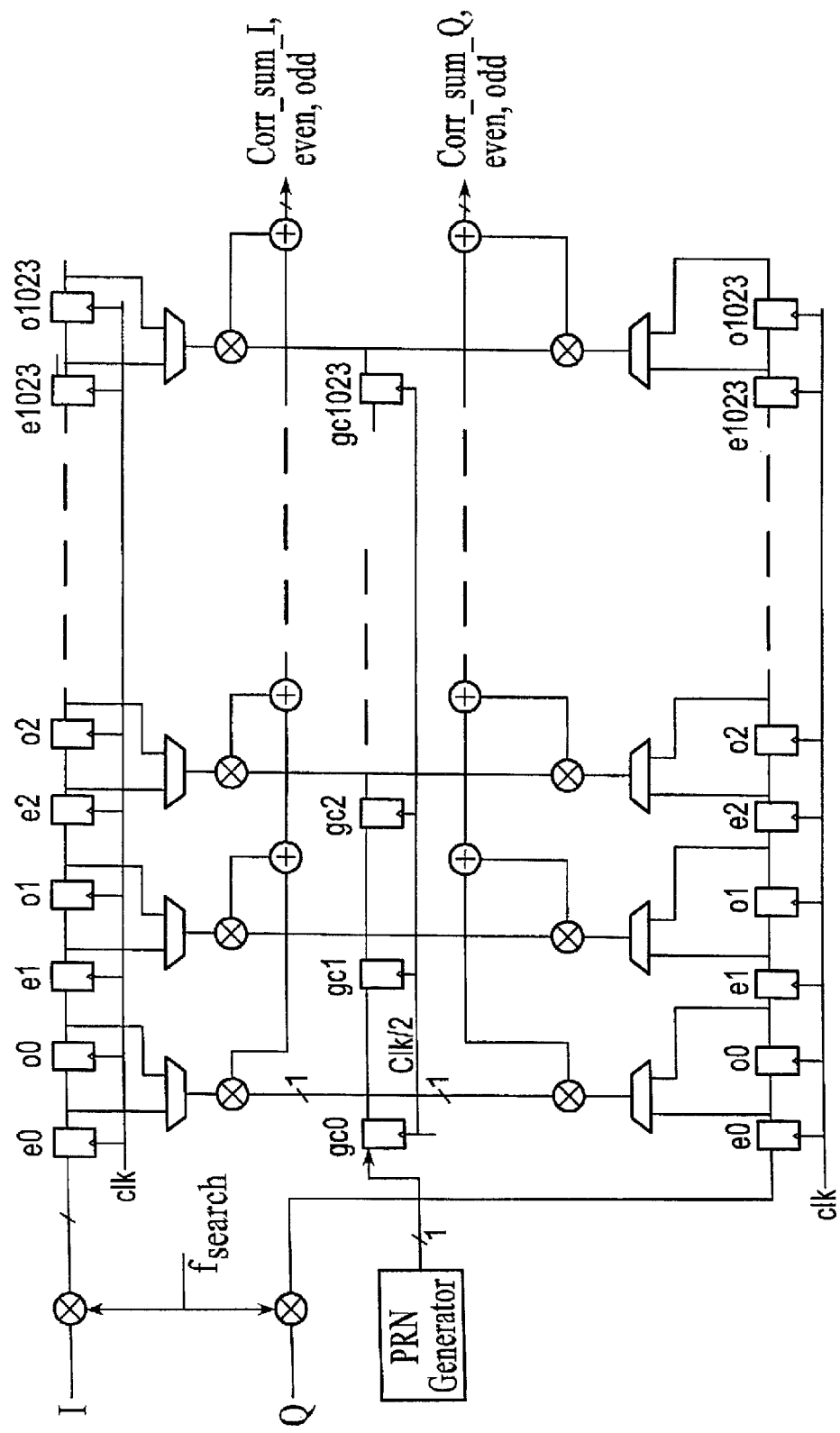
FIG. 49 shows a parallel complex correlator architecture, under an embodiment.

In any CDMA receiver (or a receiver that uses Pseudo Random codes as a part of the transmit bit stream), correlation of the received signal with its PRN code is essential. The more parallel correlations that can be done, the faster is the time to acquire the channel. A brute force implementation of a parallel complex correlator architecture for signals that use a maximal length sequence of length 1023, input signal oversampled by 2×, is shown in FIG. 49. The even and odd samples correspond to the 2× oversampled data. The shift registers get shifted at the rate of the 'clk'. The PRN generator generates the reference PRN and gets shifted at the rate of clk/2. The correlation sum at each cycle is calculated using the equation $$corrsum[n] = \sum_{k=0}^{2045} gcref[k] * x[k-n]$$

where x[n] is the complex input, gcref[k] is the PRN reference waveform, and corrsum[n] is the complex output from the correlator. FIG. 49 shows one optimization where the even and odd samples share the same multiplier and adder trees.

An implementation like the one shown above requires 2046*2*n-input bits flip flops for the shift registers, 1023 of 1×n-input multiplier and an adder that sums the 1023 products. As an example, if the input bit width were 2-bit samples, then 1023 of 1×2 multipliers are required, and 1023 of these multiplications would have to be summed in one clock cycle. This could be an onerous implementation in terms of area, timing and power in hardware. In particular, in an FPGA implementation a brute force implementation of the multiplier and adder structure may be impossible to implement given the limited resources.

An embodiment includes a novel approach to this implementation which takes advantage of the structures available in state of the art FPGAs. Modern FPGAs include several configurable logic blocks (CLBs) that implement logic and storage elements. The lookup tables that form an essential part of the CLBs can also be reprogrammed as shift registers with a serial shift in, but have parallel random access to the storage elements. This implementation can also be used in an ASIC implementation as an efficient approach to computing the correlation and as an easy migration path from FPGAs (used to prototyping) to ASICs (for mass production volumes).

Figure 51:
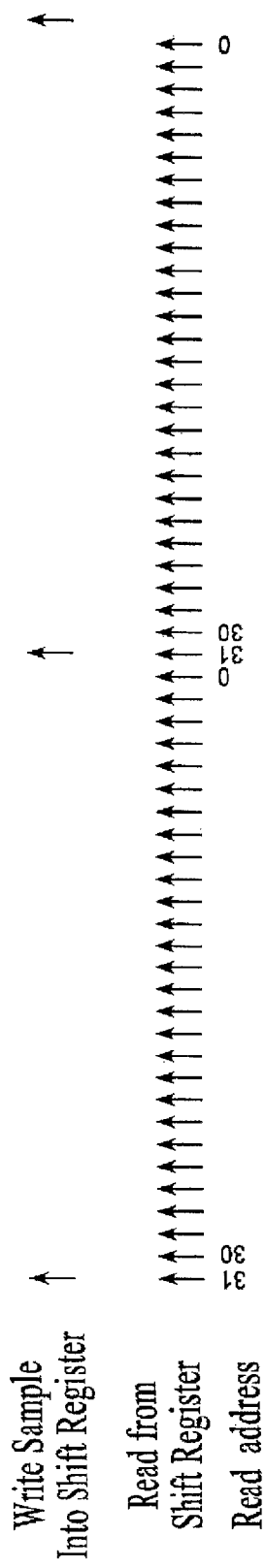
FIG. 51 shows shift operation and readout operation rate, under an embodiment.

Turning to shift register implementation, particular FPGAs have shift register primitives which are mapped onto the CLBs. Some FPGAs have a 16-bit shift register while some have a 32-bit shift register mapping. FIG. 50 shows a 32-bit shift register implementation derived from two 16-bit shift register primitives with parallel random access read capabilities. In this example implementation a 16-bit shift register group primitive is used to build a 32-bit shift register. 32 of such 32-bit shift registers are strung in series to form the 1024-bit shift register. The shift operations occur at 'clk' rate, and the readout operations occur at 32 times the clock rate, as shown in FIG. 51.

Figure 52:
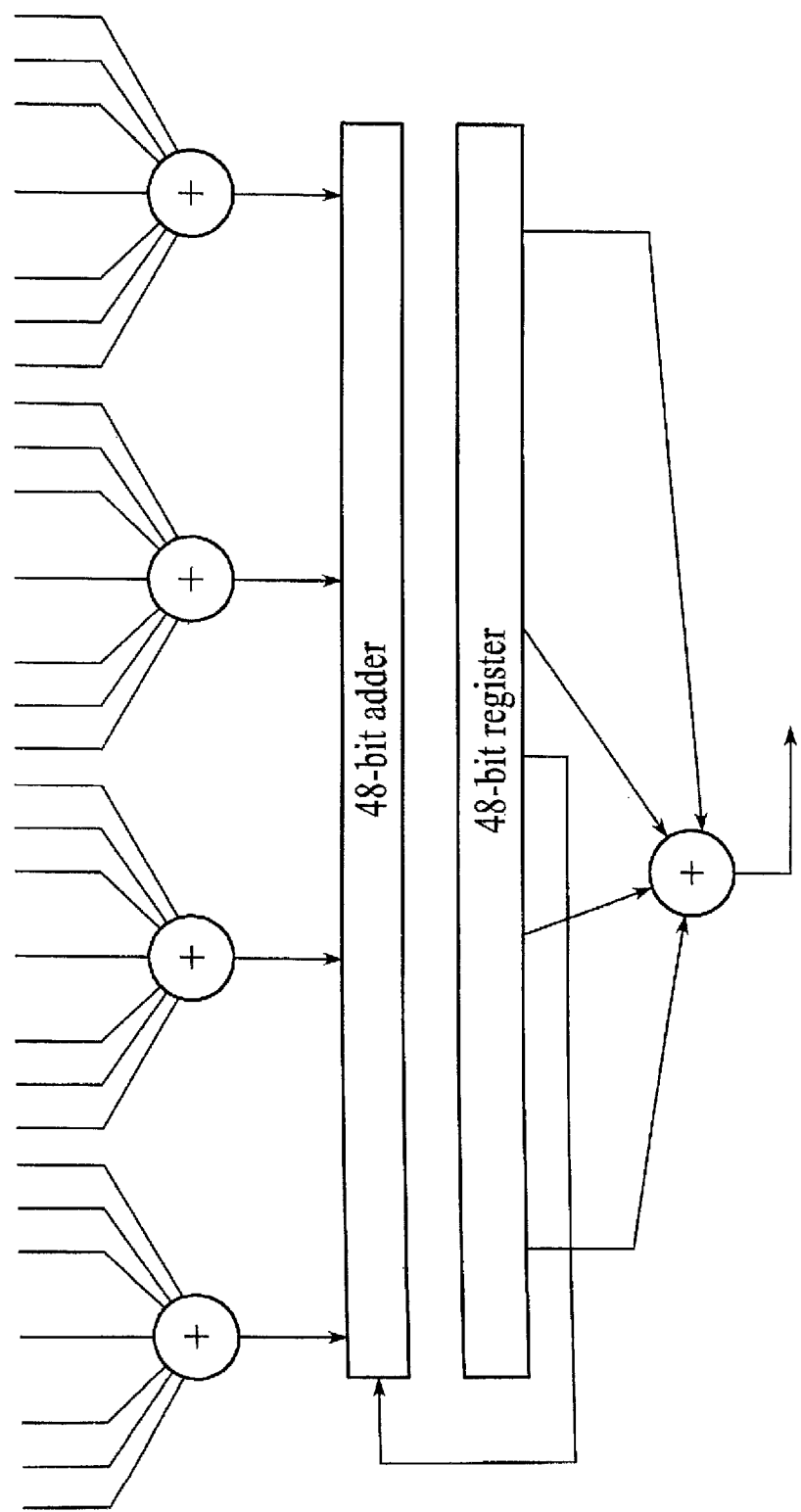
FIG. 52 shows a structure for an adder tree that implements a 1023×n-bit adder, under an embodiment.

The adder tree can also be complex to implement a 1023× n-bit adder. In the case of a particular FPGA, a 48-bit DSP slice is available which can be used as 1023×n-bit sequential adder. The hardware structure for this implementation is shown in FIG. 52. The 32 values from the 32 groups of shift registers are split into 4 groups of 8 additions. In this example, a 2-bit input is used. Each 8-number adder produces a 10-bit output which is then aligned in a 12-bit group in the 48-bit adder. Room is allowed for the growth of the sum. After 32 cycles, the 1024 bit sum is obtained by adding the 4 groups of the 12-bit adders into one 14-bit sum.

Encryption and Security

The overhead information in the system of an embodiment can be encrypted using an encryption algorithm. This allows users to use the system and be billed for usage of the system and provide a means to control information security. Keys can be applied to decrypt the signal. The keys can be obtained using a PC, wireless network, hardware dongle or can be burnt into the non volatile memory of the device in a way that it is inaccessible by any unintended sources.

The encryption of an embodiment provides both data security and authentication. The key components that are secured using encryption are the transmitters, the receivers and the server communication. Transmitter Authentication includes unambiguously identifying transmitters so that malicious transmitters can be rejected. Receiver Authentication is such that only authentic receivers should be able to utilize the transmitted information. Receiver Authorization is such that only receivers that are authorized (authentic receiver) should be permitted to operate. Server Communication is encrypted such that communication between the receivers and the server and between the transmitters and the server has to be secure. User data protection is also encrypted because location tracking user databases require protection from unauthorized access.

Encryption methods of an embodiment can be broadly classified into two types: symmetric key cryptography and asymmetric key cryptography. Symmetric Key encryption provides both authentication and encryption, whereas asymmetric key encryption provides authentication of the private key owner, since the public key is available to anyone. Symmetric Key encryption of data is an order of magnitude faster given similar resources. 3DES and AES are examples of symmetric key cryptography. A combination of both methods is used as part of the encryption architecture of an embodiment.

Over-the-air (OTA) broadcast messages can comprise general broadcast messages or system messages. General broadcast messages contain data specific to each transmitter such as location information, transmitter timing counts and other pertinent information that assist a receiver in determining its location. System messages are used to configure encryption keys, enable/disable receivers or for targeted one-way private information exchange to a specific set of receivers.

The general format of a message of an embodiment includes: Message type (parity/ECC protected); Encrypted Message; and Encrypted Message ECC. The ECC for the encrypted message is computed after the message is encrypted.

The OTA broadcast comprises frames that are transmitted periodically, possibly every second. Depending on the channel data rate, a message could be split up (segmented) over multiple frames. Each frame comprises a frame type and frame data. Frame type (parity protected) indicates whether this is the first frame of a message or if it is a continuing frame; it can also indicate a low level format frame that may be used for other purposes. Frame Data is essentially a segmented Message or a low level data frame.

OTA system messages can be encrypted either by the session key or by the transmitter's private key depending upon the system message type. OTA general broadcast messages are encrypted using a symmetric key algorithm with a session key that both the transmitter and receiver have negotiated as described herein. This provides mutual authentication i.e., transmitters can be authenticated by receivers and only authenticated receivers can decode the OTA broadcast. The session key is known to all transmitters and receivers and it is changed periodically. Key change messages are encrypted using the past few session keys, allowing receivers that were not active at a certain time period to sync up to the current session key.

OTA broadcasts also include periodic system messages encrypted by the transmitter's private key. The receivers can unambiguously identify the authenticity of the transmitter by using the associated public key. In the event the session key is compromised, this mechanism ensures that unauthorized transmitters cannot be implemented.

Figure 53:
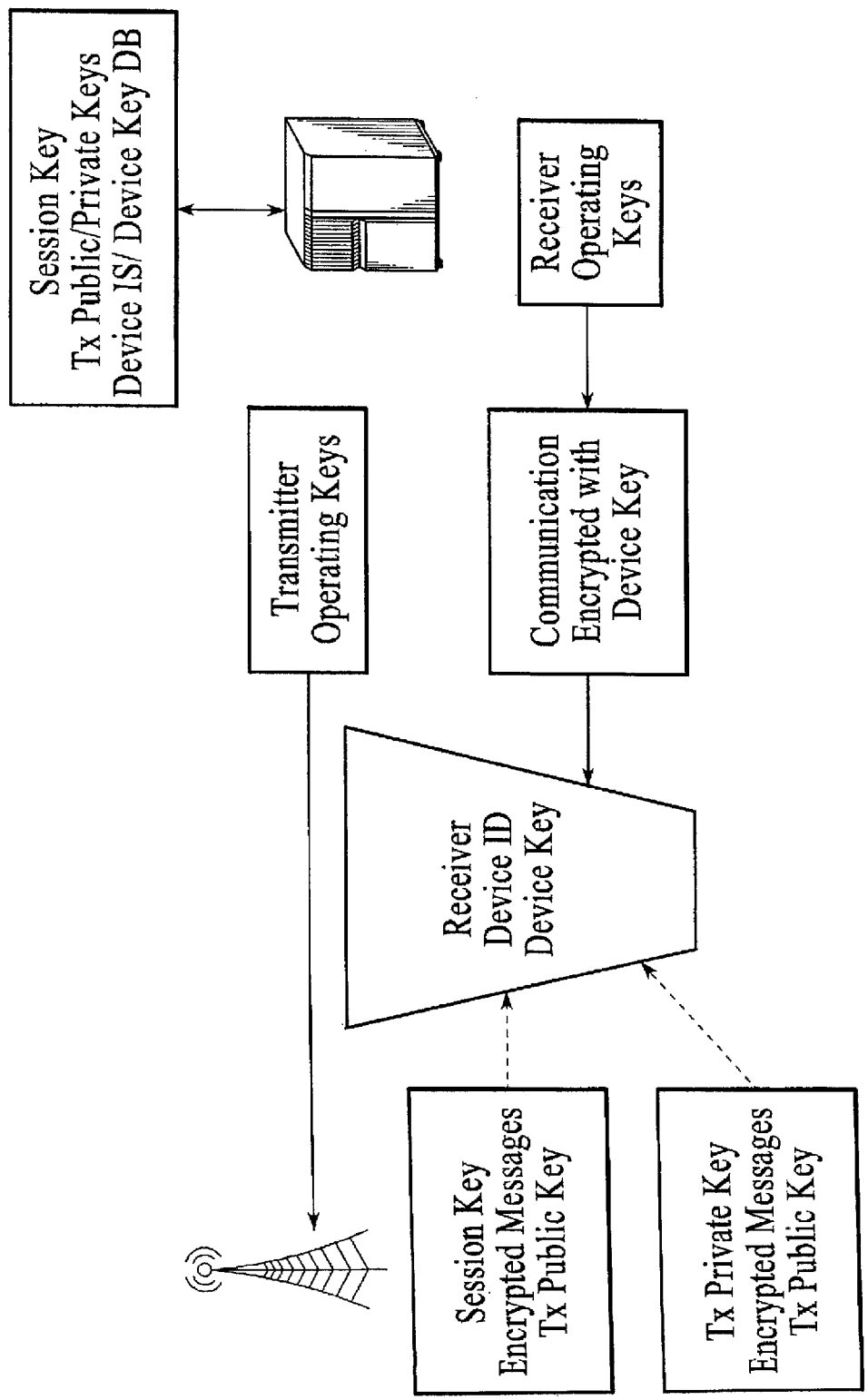
FIG. 53 is a block diagram of session key setup, under an embodiment.
Figure 54:
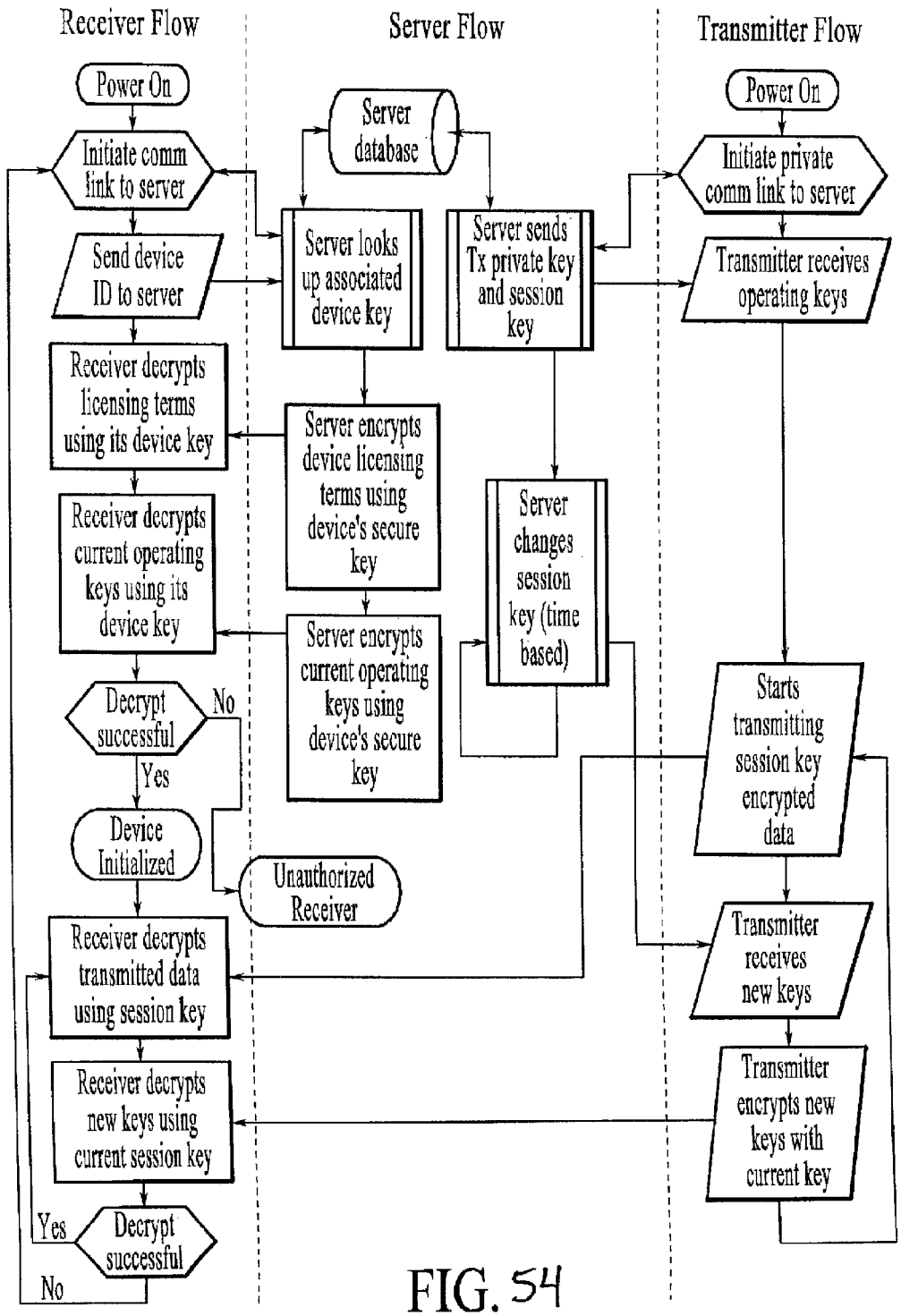
FIG. 54 is a flow diagram for encryption, under an embodiment.

FIG. 53 is a block diagram of session key setup, under an embodiment. Each receiver is equipped with a unique device ID and a device specific key. FIG. 54 is a flow diagram for encryption, under an embodiment. The WAPS System data servers maintain a database of the device ID/device specific key pairing. Receiver initialization between a receiver and the WAPS data servers is facilitated using a data connection (GPRS/USB/Modem, etc.) specific to the receiver type. This connection is encrypted using the device specific key after the device identifies itself with the device ID. During this initialization, the current session key, the transmitter public key and licensing terms (i.e., duration the receiver is authorized) are exchanged. Receiver initialization can be performed when the receiver has lost the current session key (initial power up) or if its session key is out of sync (extended power off). The session key is periodically updated, and the new key used for the updating is encrypted using the previous N keys.

The OTA data rate may be inadequate for being the sole mechanism to authorize receivers. However, the system message protocol of an embodiment supports device ID specific and device ID range-based receiver authorization.

A compromised session key requires all receivers to re-initialize. Therefore the session key storage should be tamper-proof in the device. Session key stored outside the device crypto boundary (i.e., attached storage of any kind) will be encrypted using the device's secure key.

A compromised session key cannot be used to masquerade a transmitter because the transmitter periodically transmits authentication information using its private key. Therefore, the transmitter's private key should never be compromised.

Figure 55:
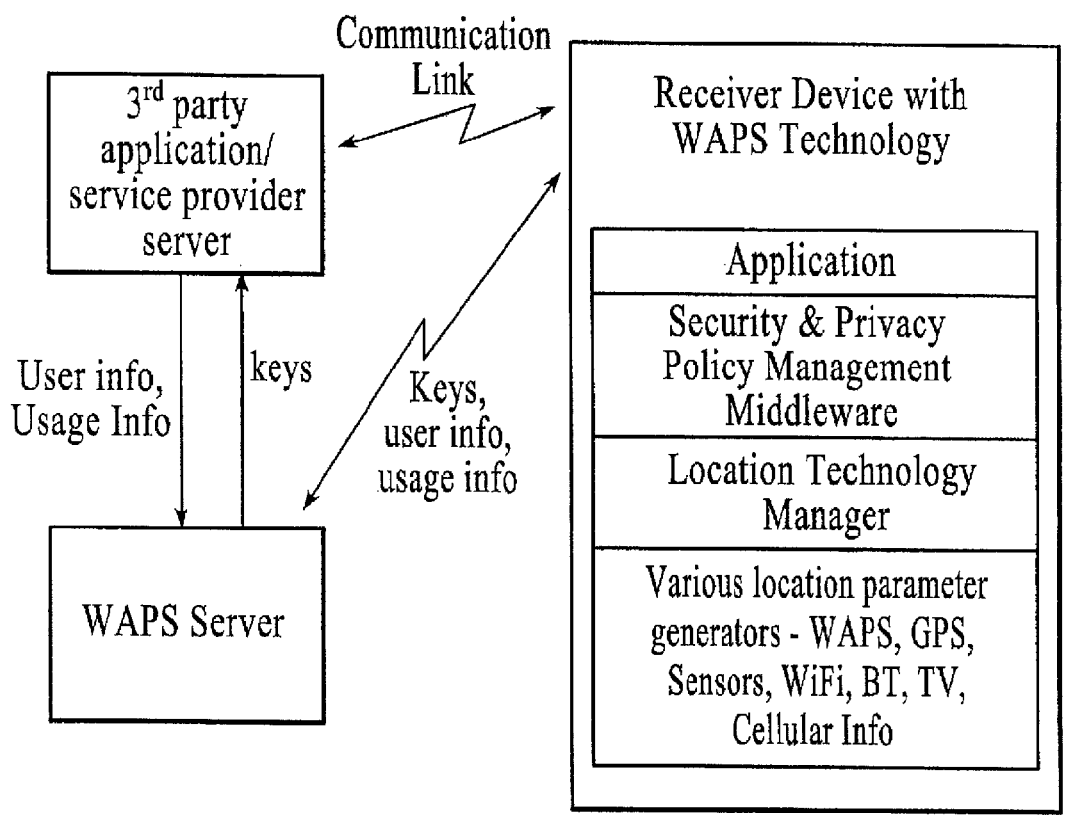
FIG. 55 is a block diagram of the security architecture for encryption, under an alternative embodiment.

In an alternative embodiment, shown in FIG. 55, the keys can be directly delivered to the receiver over the communication link from the WAPS server or can be routed through a third party application or service provider. The keys can have a certain validity period. The keys can be made available on a per-application basis or a per device basis based on a contractual agreement with the customer. Every time a position request is made either by an application on the receiver or by an application on the network, the keys are checked for validity before retrieving the position or parameters to compute position from the WAPS engine. The key and information exchange to a WAPS server can happen using proprietary protocols or through standard protocols such as OMA SUPL.

The security architecture of the system can be implemented as combination of architectures shown in FIG. 53 and FIG. 55.

Parameter sensors can be integrated into receivers of the WAPS system to time tag and/or location tag the measurements from the sensors. The parameter sensors can include, but are not limited to, temperature sensors, humidity sensors, weight sensors, and sensors for scanner types to name a few. For example, an X-ray detector can be used to determine if a tracked receiver, or device including a tracked receiver, passes through an X-ray machine. The time of the X-ray event and location of the X-ray machine can be tagged by the detector. In addition, other parameter sensors can be integrated into the WAPS system to both time tag and location tag measurements from the sensors.

Users can be billed for the system on a per use, per application on the device, hourly, daily, weekly, monthly and annual basis for an individual or asset.

The location and height of the receiver unit can be sent to any application on the terminal or to the network server using a communication protocol. Alternatively, the raw range measurement can be sent to the network through a communication protocol. The communication protocol can be a standard serial or other digital interface to the application on the terminal or through a standard or proprietary wireless protocol to the server. Possible methods of coupling or connecting to a server through a standard protocol includes the use of SMS messaging to another phone connected to the server or, alternatively, through a wireless data service to a web server. The information sent includes one or more of latitude/longitude, height (if available), and timestamp. The application on the server or the terminal unit can initiate a position fix. The location of the user can be communicated directly from the server or by the application on the server.

The WAPS standalone system independent of a GPS receiver can be used for determining the location of a device. The WAPS system by itself or integrated WAPS and GPS and/or other positioning system can be implemented to co-exist with media storage cards (such as SD cards) on the media cards. The WAPS system by itself or integrated WAPS and GPS system and/or other positioning systems can be implemented to co-exist on a cellular phone Subscriber Identity Module (SIM) card so that the SIM cards can be tracked.

Precise Positioning with Carrier Phase

One method to augment the WAPS system performance to further improve accuracy (up to <1 m) is to implement a carrier phase positioning system as described below. The beacons are set up as usual WAPS transmitters. For this method, it may be desirable (but not essential) to not use TDMA slotting to facilitate easy continuous phase tracking. When TDMA is not used, the near-far problem can be overcome through interference cancellation and increased dynamic range in the receiver. The WAPS receiver to support such a method is capable of measuring and time-stamping code and carrier phase in a continuous manner for all visible satellites. In addition, there is a reference receiver at a known surveyed location that can also make similar measurements of code and carrier phase in a continuous manner. The measurements from the WAPS receiver and the reference receiver may be combined to compute a position either on the device or on the server. The configuration of such a system would be identical to a differential WAPS system.

Carrier phase measurement is more accurate than code phase measurement but contains unknown integer number of carrier phase cycles called integer ambiguity. However there are ways to find integer ambiguities called ambiguity resolution. One method will be considered here that uses extension of local minima search algorithm to iteratively solve for user receiver position and uses measurements at multiple epochs for improved accuracy.

Consider carrier phase measurement at user receiver at a single epoch first as follows.

$$\phi_u^{(k)} = \lambda^{-1} \cdot r_u^{(k)} + N_u^{(k)} + f \cdot (dt_u - dt^{(k)}) + \epsilon_u^{(k)} \quad (1)$$

where $\phi$, $\lambda$, f and N are carrier phase, wavelength, frequency and integer cycles respectively, dt is clock bias, r is range, $\epsilon$ is measurement error and subscript u represents user receiver k represents transmitter number.

Range is given in terms of user and transmitter positions $p_u$ and $p^{(k)}$ as $$r_u^{(k)} = \|p_u - p^{(k)}\| = \sqrt{(p_{ux} - p_x^{(k)})^2 + (p_{uy} - p_y^{(k)})^2 + (p_{uz} - p_z^{(k)})^2} \quad (2)$$

To eliminate error in the knowledge of transmitter clock bias consider another receiver at known position (called reference receiver) with corresponding carrier phase equation $$\phi_r^{(k)} = \lambda^{-1} \cdot r_r^{(k)} + N_r^{(k)} + f \cdot (dt_r - dt^{(k)}) + \epsilon_r^{(k)} \quad (3)$$

where subscript r stands for reference receiver and subtract (2) from (1) to get $$\phi_u^{(k)} - \phi_r^{(k)} = \lambda^{-1} \cdot (r_u^{(k)} - r_r^{(k)}) + (N_u^{(k)} - N_r^{(k)}) + f \cdot (dt_u - dt_r) + (\epsilon_u^{(k)} - \epsilon_r^{(k)}) \quad (4)$$

which is written as $$\phi_{ur}^{(k)} = \lambda^{-1} \cdot r_{ur}^{(k)} + N_{ur}^{(k)} + f \cdot dt_{ur} + \epsilon_{ur}^{(k)} \quad (5)$$

where $(\bullet)_{ur} = (\bullet)_u - (\bullet)_r$.

Since $dt_{ur}$ is not of interest it can be eliminated by differencing (5) for different values of index (k) to get so called double difference observable equation $$\phi_{ur}^{(kl)} = \lambda^{-1} \cdot r_{ur}^{(kl)} + N_{ur}^{(kl)} + \epsilon_{ur}^{(kl)} \quad (6)$$

where $(\bullet)_{ur}^{(kl)} = (\bullet)_{ur}^{(k)} - (\bullet)_{ur}^{(l)}$.

Equation (6) then is an equation in the unknown user position $p_u$ through $r_{ur}^{(kl)}$ as $$r_{ur}^{(kl)} = (r_u^{(k)} - r_r^{(k)}) - (r_u^{(l)} - r_r^{(l)}) = \|p_u - p^{(k)}\| - \|p_u - p^{(l)}\| - \gamma \quad (7)$$

where $$\gamma^{(kl)} = \|p_r - p^{(k)}\| - \|p_r - p^{(l)}\| \quad (8)$$

Typically transmitter l used in double differencing is one of the transmitters and labeling it as 1 for convenience leads to equation in the matrix form as $$\begin{bmatrix} \phi_{ur}^{(21)} \\ \phi_{ur}^{(31)} \\ \vdots \\ \phi_{ur}^{(n1)} \end{bmatrix} = \lambda^{-1} \cdot \begin{bmatrix} \|p_u - p^{(2)}\| - \|p_u - p^{(1)}\| - \gamma^{(21)} \\ \|p_u - p^{(3)}\| - \|p_u - p^{(1)}\| - \gamma^{(31)} \\ \vdots \\ \|p_u - p^{(n)}\| - \|p_u - p^{(1)}\| - \gamma^{(n1)} \end{bmatrix} + \begin{bmatrix} N_{ur}^{(21)} \\ N_{ur}^{(31)} \\ \vdots \\ N_{ur}^{(n1)} \end{bmatrix} + \begin{bmatrix} \varepsilon_{ur}^{(21)} \\ \varepsilon_{ur}^{(31)} \\ \vdots \\ \varepsilon_{ur}^{(n1)} \end{bmatrix} \quad (9)$$

or $$\phi = \lambda^{-1} \cdot f(p_u) + N + \epsilon \quad (10)$$

Equation (10) is a nonlinear equation in unknown user position $p_u$. Local minima search algorithm works on linear equations and so (10) is linearized and solved iteratively as follows. Let at iteration m, approximation to $p_u$ is $p_u^m$ where $$p_u = p_u^m + \Delta p_u \quad (11)$$

and $$f(p_u) = f(p_u^m + \Delta p_u) \approx f(p_u^m) + \frac{\partial f}{\partial p_u}(p_u^m) \cdot \Delta p_u \quad (12)$$

where $$\frac{\partial f}{\partial p_u}(p_u) = \begin{bmatrix} l^{(2)} - l^{(1)} \\ l^{(3)} - l^{(1)} \\ \vdots \\ l^{(n)} - l^{(1)} \end{bmatrix}, \quad (13)$$

where $l^{(k)}$ is line-of-sight row vector $$l^{(k)} = \frac{p_u - p^{(k)}}{\|p_u - p^{(k)}\|}$$

Then equation (10) is written as, $$y = G \cdot x + N + \epsilon \quad (13)$$

where $y = \phi - \lambda^{-1} \cdot f(p_u^m)$, $$G = \lambda^{-1} \cdot \frac{\partial f}{\partial p_u}(p_u^m),$$

and $x = \Delta p_u$

Equation (13) is linear in $x = \Delta p_u$ and is solved for $\Delta p_u$ using local minima search algorithm given below. Using so obtained solution of $\Delta p_u$ equation (11) is used to get $p_u$ at iteration m and then so obtained $p_u$ is used as $p_u^{m+1}$ at the next iteration (m+1). The iterations are continued till $\Delta p_u$ becomes small enough to decide convergence. At the beginning of iterations $p_u^0$ can be taken from code phase based solution.

Now consider solving equation (13). Let $Q_{dd}$ be covariance matrix of double difference carrier phase error vector. It is obtained as follows. Variance of error in single difference observable is $\phi_{ur}^{(k)} = \phi_u^{(k)} - \phi_r^{(k)}$ is $Q_u + Q_r$ where $Q_u$ and $Q_r$ are respective carrier phase error variances which are assumed to be independent of transmitter k. Variance of $\phi_{ur}^{(kl)} = \phi_{ur}^{(k)} - \phi_{ur}^{(l)}$ is $2 \cdot (Q_u + Q_r)$ and cross-variance between $\phi_{ur}^{(jl)} = \phi_{ur}^{(j)} - \phi_{ur}^{(l)}$ and $\phi_{ur}^{(kl)} = \phi_{ur}^{(k)} - \phi_{ur}^{(l)}$, $j \neq k$ is $Q_u + Q_r$ which is variance of the common term $\phi_{ur}^{(l)}$. So, $$Q_{dd} = (Q_u + Q_r) \cdot \begin{bmatrix} 2 & 1 & \cdots & 1 \\ 1 & 2 & \cdots & 1 \\ \vdots & \vdots & \ddots & \vdots \\ 1 & 1 & \cdots & 2 \end{bmatrix} \quad (14)$$

Weighted least squares solution of (13) is:

$$\hat{x} = G^L \cdot (y - N) \quad (15)$$

where $G^L$ is left inverse of G, $G^L = (G^T \cdot Q_{dd}^{-1} \cdot G)^{-1} \cdot G^T \cdot Q_{dd}^{-1}$
Vector of residuals is then $$(Y - N) - G \cdot \hat{x} = (y - N) - G \cdot G^L (y - N) = (I - G \cdot G^L)(y - N) = S(y - N) \quad (16)$$

which is a function of N and local minima search tries to minimize weighted norm square of residuals with respect to N as $$\min c(N) = (y - N)^T \cdot W \cdot (y - N), \quad (17)$$

where $W = S^T \cdot Q_{dd}^{-1} \cdot S$ and $S = I - G \cdot G^L$
To solve (17) consider solving $$W \cdot N \approx W \cdot y \quad (18)$$

under the constraint that N is integer. Then $W \cdot (y - N) \approx 0$ and $(y - N)^T \cdot W^T \cdot W \cdot (y - N) = (y - N)^T \cdot W \cdot (y - N) = c(N) \approx 0$ because W is idempotent ($W^T = W$ and $W \cdot W = W$). Thus search for N is limited to those N which satisfy (18).

Once N is solved for estimate of $x = \Delta p_u$ is obtained from equation (15). Matrices G and $G^L$, of dimensions $(n-1) \times 3$ and $3 \times (n-1)$ respectively have rank 3 each since $(n-1) > 3$ and so $(n-1) \times (n-1)$ matrices S and W will fall short from full rank of $(n-1)$ by 3.

Using QR decomposition of W (LU decomposition could also be used) on equation (18), $$R \cdot N = Q^T \cdot W \cdot y \quad (19)$$

where Q is ortho-normal matrix ($Q^{-1} = Q^T$) and R is upper triangular so that $$\begin{bmatrix} R_{11} & R_{12} \\ 0 & 0 \end{bmatrix} \cdot \begin{bmatrix} N_1 \\ N_2 \end{bmatrix} = \begin{bmatrix} (Q^T \cdot W \cdot y)_{11} \\ \approx 0 \end{bmatrix} \quad (20)$$

and then $$N_1 = \text{round}\{R_{11}^{-1} \cdot ((Q^T \cdot W \cdot y)_{11} - R_{12} \cdot N_2)\} \quad (21)$$

Thus solution of $$N = \begin{bmatrix} N_1 \\ N_2 \end{bmatrix}$$

is obtained by searching for $N_2$ in 3 dimensional box with integer values, obtaining $N_1$ from (21), and picking that N which minimizes c(N) in (17). Search for $N_2$ is centered on the value of $N_2$ from the previous iteration. At the zero-th iteration $N_2$ latter part of N which is obtained as fractional part of $\lambda^{-1} \cdot f(p_u^0)$; $p_u^0$ being the code phase based solution. The size of the 3 dimensional search box depends on the uncertainty in the code phase based solution. This box can be divided into smaller sub-boxes and center of each smaller size sub-box can be tried as initial $p_u^0$.

The above method used a single epoch (instant) of measurement to determine position. The description below explains an extension to the single epoch method. Multiple epoch measurements are taken close enough in time wherein user receiver movement is negligible. Further, integer ambiguities of the initial epoch remain the same for subsequent epochs so that no new unknown integer ambiguities are introduced at subsequent epochs. Multiple epoch measurements do not give independent equations because transmitter locations are fixed (unlike in the GNSS case where motion of satellite transmitters change line-of-sight and thus give independent equations). So multiple epoch measurements do not help in solving for integer ambiguities as float ambiguities (unlike in GNSS case when number of independent equations become greater than number of unknown ambiguities plus three position coordinates). However, multiple epoch measurements allow more carrier phase measurement errors and still allow successful ambiguity resolution. In the multiple epoch case equation (13) becomes $$y = \begin{bmatrix} y_1 \\ y_2 \\ \vdots \\ y_m \end{bmatrix} = \begin{bmatrix} G \\ G \\ \vdots \\ G \end{bmatrix} \cdot x + \begin{bmatrix} N \\ N \\ \vdots \\ N \end{bmatrix} + \begin{bmatrix} \varepsilon_1 \\ \varepsilon_2 \\ \vdots \\ \varepsilon_m \end{bmatrix} \quad (22)$$

Following development for single epoch case as above equation, the problem reduces to problem of finding N such that $$\min c(N) = \left(y - \begin{bmatrix} N \\ N \\ \vdots \\ N \end{bmatrix}\right)^T \cdot \overline{W} \cdot \left(y - \begin{bmatrix} N \\ N \\ \vdots \\ N \end{bmatrix}\right), \quad (23)$$

where $\overline{W} = \overline{S}^T \cdot \overline{Q}_{dd}^{-1} \cdot \overline{S}$, $\overline{S} = I - \overline{G} \cdot \overline{G}^L$, $\overline{G}^L = (\overline{G}^T \cdot \overline{Q}_{dd}^{-1} \cdot \overline{G})^{-1} \cdot \overline{G}^T \cdot \overline{Q}_{dd}^{-1}$ $$\overline{G} = \begin{bmatrix} G \\ G \\ \vdots \\ G \end{bmatrix} \quad \overline{Q}_{dd}^{-1} = \begin{bmatrix} Q_{dd}^{-1} & 0 & \cdots & 0 \\ 0 & Q_{dd}^{-1} & \cdots & 0 \\ \vdots & \vdots & \ddots & \vdots \\ 0 & 0 & \cdots & Q_{dd}^{-1} \end{bmatrix}$$

And to solve (23) for N consider solving $$\overline{W} \cdot \overline{I} \cdot N \approx \overline{W} \cdot y \quad (24)$$

where $$\overline{I} = \begin{bmatrix} I \\ I \\ \vdots \\ I \end{bmatrix}$$

using QR decomposition of $\overline{W} \cdot \overline{I}$ (LU decomposition could also be used) and following equations of (19) to (21) as above. Again, once N is solved for estimate of $x = \Delta p_u$ is obtained from equation (15). If this estimate of $x = \Delta p_u$ is small then iterations in equation (11) are stopped to obtain user position $p_u$. Typically if each component of x is less than 1e-6 in magnitude then convergence is declared and iterations are stopped.

The next step is to verify whether the converged user position $p_u$ is the right one. This is done based on residuals obtained from (10) as $\mod(\phi - \lambda^{-1} \cdot f(p_u) - N, \lambda)$. If maximum of absolute values of residuals for each epoch is less than $\kappa \cdot \sqrt{Q_r}$ then converged solution is accepted as a solution otherwise the search is continued by selecting a new sub-box. Typically scale factor $\kappa$ in the verification test can be chosen to be 5. Once the solution is verified, the differential WAPS system described above can achieve accuracy close to or better than 1 m.

This differential WAPS carrier phase system may be overlaid on top of the traditional WAPS system through the addition of reference receivers or can be standalone. The differential WAPS carrier phase system can be used to deliver high accuracy positioning in certain localized target areas (such as malls, warehouses etc.).

In W-CDMA systems, two receive chains are used to improve the receive diversity. When WAPS co-exists with W-CDMA, one of the receive chains can be used temporarily for receiving and processing the WAPS signal. In certain cases of W-CDMA and CDMA architectures, the entire receive chain can be reused to receive WAPS signal by tuning the receiver to WAPS band and processing the WAPS signal while temporarily suspending the processing of the W-CDMA/CDMA signals. In certain other embodiments where the GSM receive chain is multiplexed with the W-CDMA receive chain, the receiver can be further time-shared to be used for WAPS reception.

Once it is determined which signals are used from which towers for position determination in WAPS or any other TDMA system, in order to save power, most of the receiver of an embodiment is turned off during the slots at which either signal is not detected and/or signals from towers that radiate in those slots are not used for position determination. In case of detection of motion or change in position or change in signal conditions, then the receiver of an embodiment is turned ON for all the slots to determine which slots can be used for next set of position calculations.

Embodiments described herein include a position location system comprising a transmitter network including a plurality of transmitters that broadcast a plurality of positioning signals. Each positioning signal of the plurality of positioning signals comprises a pseudorandom ranging signal. The system includes a remote receiver that acquires and measures the time of arrival of the plurality of positioning signals received at the remote receiver. During an interval of time at least two positioning signals are transmitted concurrently, each by a different member of the plurality of transmitters, and received concurrently at the remote receiver. The at least two positioning signals have different carrier frequencies. The different carrier frequencies are offset from one another by an amount that is at least one of less than and equal to twenty-five percent of the bandwidth of each positioning signal of the at least two positioning signals.

Embodiments described herein include a position location system comprising: a transmitter network comprising a plurality of transmitters that broadcast a plurality of positioning signals, wherein each positioning signal of the plurality of positioning signals comprises a pseudorandom ranging signal; and a remote receiver that acquires and measures the time of arrival of the plurality of positioning signals received at the remote receiver; wherein during an interval of time at least two positioning signals are transmitted concurrently, each by a different member of the plurality of transmitters, and received concurrently at the remote receiver, wherein the at least two positioning signals have different carrier frequencies, the different carrier frequencies offset from one another by an amount that is at least one of less than and equal to twenty-five percent of the bandwidth of each positioning signal of the at least two positioning signals.

The offset of an embodiment is a multiple of a sum of a frame rate of the pseudorandom ranging signals and a fraction 1/n of the frame rate, where n is an integer.

The at least two positioning signals of an embodiment have different pseudorandom codes.

The at least two positioning signals of an embodiment have the same pseudorandom codes.

The pseudorandom ranging signal of an embodiment is repeated a plurality of times in succession.

During the interval of time of an embodiment at least two additional positioning signals are transmitted non-concurrently by the plurality of transmitters.

The at least two additional positioning signals of an embodiment have a same pseudorandom code.

The plurality of transmitters of an embodiment is arranged in a geometric pattern and uses a plurality of time slots to broadcast the plurality of positioning signals.

The plurality of transmitters of an embodiment comprises at least m transmitters using n time slots in a time multiplexing frame to broadcast the plurality of positioning signals, where m and n are positive integers.

The variable m of an embodiment is greater than n.

The variable m of an embodiment is at least one of less than and equal to n.

At least one of the at least m transmitters of an embodiment transmits in more than one slot in a time multiplexing frame.

Each of the at least m transmitters of an embodiment use a pseudorandom code selected among a set of k pseudorandom codes to transmit their pseudorandom ranging signal, wherein k is a number greater than 1.

The variable k of an embodiment is at least one of greater than and equal to n.

At least one transmitter of the plurality of transmitters of an embodiment transmits a positioning signal in at least two successive time multiplexing frames of a positioning signal.

The at least two successive time multiplexing frames of an embodiment comprise a primary frame and a secondary frame, wherein positioning data is transmitted in the primary frame.

Auxiliary data of an embodiment is transmitted in the secondary frame, where the auxiliary data comprises at least one of security data and authentication data.

Positioning data of an embodiment is transmitted in the secondary frame.

The at least two positioning signals of an embodiment are transmitted concurrently by at least two transmitters in a vicinity of one another, wherein the at least two positioning signals have at least one common parameter.

The at least one common parameter of an embodiment is at least one of a pseudorandom code, and positioning signal data.

The pseudorandom code of an embodiment is a maximal length pseudorandom code.

The pseudorandom code of an embodiment is a Gold Code.

The plurality of transmitters of an embodiment comprises a supergroup of transmitters, wherein the supergroup includes a plurality of groups of transmitters arranged in a geometric pattern, and each group includes a plurality of transmitters arranged in a geometric pattern.

The plurality of groups of a supergroup of an embodiment comprises an n-group repeat pattern, wherein n is an integer.

The geometric pattern of the supergroup of an embodiment comprises a hexagonal pattern of groups.

The plurality of groups of a supergroup of an embodiment comprises seven (7) groups.

Each group of an embodiment comprises seven (7) transmitters.

The supergroup of an embodiment comprises at least one of a time division multiplexing (TDMA) communication network, a code division multiplexing (CDMA) communication network, and a frequency offset multiplexing (FOM) network.

The at least two positioning signals of an embodiment are transmitted concurrently by at least two transmitters of a group of the plurality of groups.

The at least two positioning signals of an embodiment are transmitted concurrently by at least two transmitters that are in different groups.

The plurality of positioning signals of an embodiment comprises a set of pseudorandom codes, wherein each group in the plurality of groups of transmitters utilizes a permutation of the set of pseudorandom codes.

The permutation of the set of pseudorandom codes of an embodiment is cyclic with respect to a slot number of the transmitter.

The permutation of an embodiment associates each pseudorandom code in the set to a geographical position of each transmitter in a group.

A position of a transmitter in each group of an embodiment is associated with a transmit time slot.

Each group of the plurality of groups of an embodiment uses a plurality of time slots to broadcast the plurality of positioning signals.

Each group of the plurality of groups of an embodiment comprises n transmitters using n time slots to broadcast the plurality of positioning signals, where n is an integer.

Each group of the plurality of groups of an embodiment uses a same set of time slots to broadcast the plurality of positioning signals.

Each transmitter of a group of an embodiment broadcasts in a different time slot from any other transmitter of the group.

Each group of the plurality of groups of a supergroup of an embodiment uses at least one pseudorandom code that is different from the pseudorandom code of any other group.

The at least one pseudorandom code of an embodiment comprises a Gold Code.

Each group of the plurality of groups of the supergroup of an embodiment uses an offset in frequency that is different than the offset of any other group.

Each group of the plurality of groups of the supergroup of an embodiment uses an offset in frequency that is different than the offset of from any other group.

The plurality of transmitters of the plurality of groups of a supergroup of an embodiment uses a common pseudorandom code for a least a portion of their transmissions.

The pseudorandom code of an embodiment comprises a Gold Code.

The pseudorandom code of an embodiment comprises a maximal length pseudorandom sequence.

The maximal length pseudorandom sequence of an embodiment comprises a first of two maximal length sequences forming a Gold Code.

Each transmitter of a group of an embodiment broadcasts using a different pseudorandom code from any other transmitter of the group.

Each group of the plurality of groups of a supergroup of an embodiment uses a set of pseudorandom codes that is the same as every other group of the plurality of groups.

Each group of the plurality of groups of the supergroup of an embodiment uses an offset in frequency that is different than the offset from any other group.

Each transmitter of the supergroup of an embodiment broadcasts using a different pseudorandom code from any other transmitter of the supergroup.

Each group of the plurality of groups of the supergroup of an embodiment uses an offset in frequency that is different than the offset of from any other group.

Each group of the plurality of groups of a supergroup of an embodiment uses at least one pseudorandom code in accordance with a maximal length pseudorandom sequence.

The at least one pseudorandom code of each group of the supergroup of an embodiment is different from the pseudorandom code of any other group of the supergroup.

Each group of the plurality of groups of the supergroup of an embodiment uses an offset in frequency that is different than the offset of any other group of the supergroup.

Each group of the plurality of groups of the supergroup of an embodiment uses an offset in frequency that is different than the offset of from any other group.

Each group of the supergroup of an embodiment uses a pseudorandom code different from that of a pseudorandom code used by any other group of the supergroup.

Each group of the plurality of groups of a supergroup of an embodiment uses a same set of pseudorandom codes, wherein the pseudorandom codes of each group are permuted relative to slot numbers of every other group of the plurality of groups.

Each group of the plurality of groups of the supergroup of an embodiment uses an offset in frequency that is different than the offset of from any other group.

The plurality of transmitters of an embodiment comprises a plurality of supergroups of transmitters, wherein each supergroup of the plurality of supergroups comprises a plurality of groups of transmitters arranged in a geometric pattern.

Each transmitter of a group of an embodiment broadcasts using a different pseudorandom code from any other transmitter of the group.

Each supergroup of the plurality of supergroups of an embodiment uses a same set of pseudorandom codes as every other supergroup of the plurality of supergroups, wherein the pseudorandom codes of each supergroup are permuted relative to slot numbers of every other supergroup of the plurality of supergroups.

Each group of the plurality of groups of a supergroup of an embodiment uses an offset in frequency that is different than the offset in frequency of any other group of that same supergroup.

In each supergroup of the plurality of supergroups of an embodiment, each transmitter broadcasts using a different pseudorandom code from any other transmitter of that same supergroup.

Each supergroup of an embodiment uses a same set of pseudorandom codes as used by every other supergroup, wherein the pseudorandom codes of a supergroup are permuted relative to slot numbers of every other supergroup.

A measure of performance corresponding to the geometric pattern of an embodiment is a ratio of distance between transmitters using identical transmission parameters and a transmitter radius.

A measure of performance corresponding to the geometric pattern of an embodiment is correlation rejection associated with the multiplexing protocol used by the supergroup.

Each carrier frequency of an embodiment is the sum of a base frequency plus an element of a set of offsets, and each offset in the set of offsets is a multiple of a minimum nonzero offset.

The set of offsets of an embodiment corresponds to $$0, k_0R+R/Q, 2k_0R+2R/Q, 3k_0R+3R/Q \ldots, (Q-1)k_0R+(Q-1)R/Q,$$

where R represents PN frame rate, $k_0$ represents a nonzero integer, and Q represents an integer equal to a number of offsets.

The integer $k_0$ of an embodiment has magnitude that is at least one of equal to and greater than two (2).

Quantity Q of an embodiment equals a number of PN frames of the positioning signal coherently integrated by said remote receiver.

The number of PN frames of the positioning signal coherently integrated by the remote receiver of an embodiment is equal to an integer multiple of Q.

The quantity Q of an embodiment equals the number of groups of transmitters in the supergroup, and a number of PN frames of the positioning signal coherently integrated by said receiver is greater than the number of groups of transmitters in the supergroup.

The position location system of an embodiment comprises a set of carrier frequency offsets from a base frequency, wherein each offset in the set is at least one of equal to and less than twenty-five percent of the bandwidth of each of the plurality of positioning signals.

Embodiments described herein include a position location system comprising a transmitter network including a plurality of transmitters that broadcast a plurality of positioning signals comprising ranging data. The system includes a remote receiver that acquires and measures the time of arrival of the plurality of positioning signals received at the remote receiver. During an interval of time at least two positioning signals are transmitted concurrently, each by a different member of the plurality of transmitters, and received concurrently at the remote receiver. The at least two positioning signals have different carrier frequencies. The carrier frequencies are offset from one another by an amount that is less than 50% of an instantaneous bandwidth of each positioning signal of the at least two positioning signals.

Embodiments described herein include a position location system comprising: a transmitter network comprising a plurality of transmitters that broadcast a plurality of positioning signals comprising ranging data; and a remote receiver that acquires and measures the time of arrival of the plurality of positioning signals received at the remote receiver; wherein during an interval of time at least two positioning signals are transmitted concurrently, each by a different member of the plurality of transmitters, and received concurrently at the remote receiver, wherein the at least two positioning signals have different carrier frequencies, the carrier frequencies offset from one another by an amount that is less than 50% of an instantaneous bandwidth of each positioning signal of the at least two positioning signals.

The remote receiver of an embodiment tunes to a frequency of a selected positioning signal of the at least two positioning signals, and correlates the selected positioning signal with a reference pseudorandom ranging signal matched to a transmitted pseudorandom ranging signal of the selected positioning signal, wherein the correlation reduces the cross-interference to the selected positioning signal produced by nonselected signals.

Embodiments described herein include a transmitter in a position location system comprising a plurality of transmitters broadcasting a plurality of positioning signals. The plurality of positioning signals includes wideband pseudorandom ranging signals. The transmitter comprises a processor coupled to a memory and running at least one application that selects a first frequency from a sum of a base frequency plus a first offset that belongs to a set of offsets. The application generates a first positioning signal comprising a carrier at the first frequency. The application transmits the first positioning signal concurrently with transmission of a second positioning signal from a second transmitter of the plurality of transmitters. The second positioning signal has a carrier at a second frequency that is the sum of the base frequency plus a second offset belonging to the set of offsets. The first and second offsets are different by an amount that is at least one of equal to and less than 25 percent of the bandwidth of each of the plurality of positioning signals.

Embodiments described herein include a transmitter in a position location system comprising a plurality of transmitters broadcasting a plurality of positioning signals, wherein the plurality of positioning signals includes wideband pseudorandom ranging signals, the transmitter comprising: a processor coupled to a memory and running at least one application that, selects a first frequency from a sum of a base frequency plus a first offset that belongs to a set of offsets; generates a first positioning signal comprising a carrier at the first frequency; and transmits the first positioning signal concurrently with transmission of a second positioning signal from a second transmitter of the plurality of transmitters, wherein the second positioning signal has a carrier at a second frequency that is the sum of the base frequency plus a second offset belonging to the set of offsets, and wherein the first and second offsets are different by an amount that is at least one of equal to and less than 25 percent of the bandwidth of each of the plurality of positioning signals.

The first positioning signal and the second positioning signal of an embodiment comprise different pseudorandom codes.

The first positioning signal and the second positioning signal of an embodiment comprise the same pseudorandom codes.

The wideband pseudorandom ranging signals of an embodiment are repeated a plurality of times in succession.

The at least one application of an embodiment transmits a positioning signal in at least two successive time multiplexing frames of the first positioning signal.

The at least two successive time multiplexing frames of an embodiment comprise a primary frame and a secondary frame, wherein positioning data is transmitted in the primary frame.

Auxiliary data of an embodiment is transmitted in the secondary frame, where the auxiliary data comprises at least one of security data and authentication data.

Positioning data of an embodiment is transmitted in the secondary frame.

The second transmitter of an embodiment is in a vicinity of the transmitter and the first positioning signal and the second positioning signal have at least one common parameter.

The at least one common parameter of an embodiment is at least one of a pseudorandom code, and positioning signal data.

The pseudorandom code of an embodiment is a maximal length pseudorandom code.

The maximal length pseudorandom code of an embodiment comprises a first of two maximal length sequences forming a Gold Code.

The pseudorandom code of an embodiment is a Gold Code.

The transmitter and the second transmitter of an embodiment belong to a same group of transmitters geographically adjacent to one another.

The transmitter and the second transmitter of an embodiment belong to different groups of transmitters, wherein each of the different groups have transmitters that are geographically adjacent to one another.

The set of offsets of an embodiment comprises offsets that are each a multiple of a sum of a frame rate of the wideband pseudorandom ranging signals and a fraction 1/n of the frame rate, where n is an integer.

Each offset of the set of offsets of an embodiment is a multiple of a minimum nonzero offset.

The set of offsets of an embodiment corresponds to $$0, k_0R+R/Q, 2k_0R+2R/Q, 3k_0R+3R/Q \ldots, (Q-1)k_0R+(Q-1)R/Q,$$

where R represents PN frame rate, $k_0$ represents a nonzero integer, and Q represents an integer equal to the number of offsets.

The integer $k_0$ of an embodiment has magnitude that is at least one of equal to and greater than two (2).

Quantity Q of an embodiment equals a number of PN frames of the positioning signal coherently integrated by said remote receiver.

Cross-interference of the second positioning signal upon the first positioning signal of an embodiment is reduced at a remote receiver by tuning the remote receiver to a frequency of the first positioning signal and correlating the signal received by the receiver with a reference pseudorandom ranging signal matched to a transmitted pseudorandom ranging signal of the first positioning signal.

Embodiments described herein include a receiver in a position location system. The receiver comprises a processor coupled to a memory and running at least one application that receives during an interval of time at least two positioning signals, each transmitted concurrently by different transmitters of a plurality of transmitters. The at least two positioning signals comprise wideband pseudorandom ranging signals having carrier frequencies different from each other. The carrier frequencies are offset from one another by an amount that is at least one of equal to and less than twenty-five percent of a bandwidth of each positioning signal of the at least two positioning signals. The application tunes to a frequency of a selected positioning signal of the at least two positioning signals. The application correlates the selected positioning signal with a reference pseudorandom ranging signal matched to a transmitted pseudorandom ranging signal of the selected positioning signal. The correlation reduces the cross-interference to the selected positioning signal produced by nonselected signals.

Embodiments described herein include a receiver in a position location system, the receiver comprising: a processor coupled to a memory and running at least one application that, receives during an interval of time at least two positioning signals, each transmitted concurrently by different transmitters of a plurality of transmitters, the at least two positioning signals comprising wideband pseudorandom ranging signals having carrier frequencies different from each other, the carrier frequencies offset from one another by an amount that is at least one of equal to and less than twenty-five percent of a bandwidth of each positioning signal of the at least two positioning signals; tunes to a frequency of a selected positioning signal of the at least two positioning signals; and correlates the selected positioning signal with a reference pseudorandom ranging signal matched to a transmitted pseudorandom ranging signal of the selected positioning signal, wherein the correlation reduces the cross-interference to the selected positioning signal produced by nonselected signals.

The offset of an embodiment is a multiple of a sum of a frame rate of the wideband pseudorandom ranging signals and a fraction 1/n of the frame rate, where n is an integer.

The at least two positioning signals of an embodiment comprise different pseudorandom codes.

The at least two positioning signals of an embodiment comprise the same pseudorandom codes.

The wideband pseudorandom ranging signals of an embodiment are repeated a plurality of times in succession.

During the interval of time of an embodiment at least two additional positioning signals are received, wherein the at least two additional positioning signals are transmitted non-concurrently by the plurality of transmitters.

The at least two additional positioning signals of an embodiment comprise a same pseudorandom code.

A plurality of time slots of an embodiment are used to broadcast a plurality of positioning signals comprising the at least two positioning signals.

Each of the at least two positioning signals of an embodiment comprise a positioning signal transmitted in at least two successive time multiplexing frames of a positioning signal.

The at least two successive time multiplexing frames of an embodiment comprise a primary frame and a secondary frame, wherein positioning data is transmitted in the primary frame.

Auxiliary data of an embodiment is transmitted in the secondary frame, where the auxiliary data comprises at least one of security data and authentication data.

Positioning data of an embodiment is transmitted in the secondary frame.

The at least two positioning signals of an embodiment are transmitted concurrently by at least two transmitters in a vicinity of one another, wherein the at least two positioning signals have at least one common parameter.

The at least one common parameter of an embodiment is at least one of a pseudorandom code, and positioning signal data.

The pseudorandom code of an embodiment is a maximal length pseudorandom code.

The maximal length pseudorandom code of an embodiment comprises a first of two maximal length sequences forming a Gold Code.

The pseudorandom code of an embodiment is a Gold Code.

Each carrier frequency of an embodiment is the sum of a base frequency plus an element of a set of offsets, and each offset is a multiple of a minimum nonzero offset.

The set of offsets of an embodiment corresponds to $$0, k_0R+R/Q, 2k_0R+2R/Q, 3k_0R+3R/Q \ldots, (Q-1)k_0R+(Q-1)R/Q,$$

where R represents PN frame rate, $k_0$ represents a nonzero integer, and Q represents an integer equal to a number of offsets.

The integer $k_0$ of an embodiment has magnitude that is at least one of equal to and greater than two (2).

Quantity Q of an embodiment equals a number of PN frames of the positioning signal coherently integrated by said remote receiver.

The at least one application of an embodiment coherently integrates a number of PN frames of a received positioning signal, wherein the number of PN frames is equal to an integer multiple of Q.

Embodiments described herein include a method of reducing cross-interference in a position location system. The method comprises broadcasting from a plurality of transmitters of a transmitter network a plurality of positioning signals comprising pseudorandom ranging signals. During an interval of time at least two positioning signals are transmitted concurrently, each by a different member of the plurality of transmitters. The at least two positioning signals comprise a first signal transmitted from a first member and a second signal transmitted from a second member. The at least two positioning signals have different carrier frequencies. The carrier frequencies are offset from one another by an amount that is at least one of equal to and less than twenty-five percent of the bandwidth of each positioning signal of the at least two positioning signals. The method receives in a remote receiver the at least two positioning signals. The method reduces the cross-interference of the second signal upon the first by tuning the remote receiver to a frequency of the first signal and correlating the received signal with a reference pseudorandom ranging signal matched to a transmitted pseudorandom ranging signal of the first signal.

Embodiments described herein include a method of reducing cross-interference in a position location system, the method comprising: broadcasting from a plurality of transmitters of a transmitter network a plurality of positioning signals comprising pseudorandom ranging signals, wherein during an interval of time at least two positioning signals are transmitted concurrently, each by a different member of the plurality of transmitters, wherein the at least two positioning signals comprise a first signal transmitted from a first member and a second signal transmitted from a second member, wherein the at least two positioning signals have different carrier frequencies, the carrier frequencies offset from one another by an amount that is at least one of equal to and less than twenty-five percent of the bandwidth of each positioning signal of the at least two positioning signals; receiving in a remote receiver the at least two positioning signals; and reducing the cross-interference of the second signal upon the first by tuning the remote receiver to a frequency of the first signal and correlating the received signal with a reference pseudorandom ranging signal matched to a transmitted pseudorandom ranging signal of the first signal.

The offset of an embodiment is a multiple of a sum of a frame rate of the pseudorandom ranging signals and a fraction 1/n of the frame rate, where n is an integer.

The method of an embodiment comprises generating the at least two positioning signals to have different pseudorandom codes.

The method of an embodiment comprises generating the at least two positioning signals to have the same pseudorandom codes.

The method of an embodiment comprises repeating the pseudorandom ranging signals a plurality of times in succession.

The method of an embodiment comprises non-concurrently transmitting by the plurality of transmitters at least two additional positioning signals.

The method of an embodiment comprises generating the at least two additional positioning signals to have a same pseudorandom code.

The method of an embodiment comprises arranging the plurality of transmitters in a geometric pattern and using a plurality of time slots to broadcast the plurality of positioning signals.

The plurality of transmitters of an embodiment comprises at least m transmitters using n time slots in a time multiplexing frame to broadcast the plurality of positioning signals, where m and n are positive integers.

The variable m of an embodiment is greater than n.

The variable m of an embodiment is at least one of less than and equal to n.

The method of an embodiment comprises at least one of the at least m transmitters transmitting in more than one slot in a time multiplexing frame.

The method of an embodiment comprises transmitting the pseudorandom ranging signal from each of the at least m transmitters using a pseudorandom code selected among a set of k pseudorandom codes, wherein k is a number greater than 1.

The variable k of an embodiment is at least one of greater than and equal to n.

The method of an embodiment comprises transmitting from at least one transmitter of the plurality of transmitters a positioning signal in at least two successive time multiplexing frames of a positioning signal.

The at least two successive time multiplexing frames of an embodiment comprise a primary frame and a secondary frame, wherein positioning data is transmitted in the primary frame.

The method of an embodiment comprises transmitting auxiliary data in the secondary frame, where the auxiliary data comprises at least one of security data and authentication data.

The method of an embodiment comprises transmitting positioning data in the secondary frame.

The method of an embodiment comprises transmitting the at least two positioning signals concurrently by at least two transmitters in a vicinity of one another, wherein the at least two positioning signals have at least one common parameter.

The at least one common parameter of an embodiment is at least one of a pseudorandom code, and positioning signal data.

The pseudorandom code of an embodiment is a maximal length pseudorandom code.

The pseudorandom code of an embodiment is a Gold Code.

The plurality of transmitters of an embodiment comprises a supergroup of transmitters, wherein the supergroup includes a plurality of groups of transmitters arranged in a geometric pattern, and each group includes a plurality of transmitters arranged in a geometric pattern.

The plurality of groups of a supergroup of an embodiment comprises an n-group repeat pattern, wherein n is an integer.

The geometric pattern of the supergroup of an embodiment comprises a hexagonal pattern of groups.

The plurality of groups of a supergroup of an embodiment comprises seven (7) groups.

Each group of an embodiment comprises seven (7) transmitters.

The supergroup of an embodiment comprises at least one of a time division multiplexing (TDMA) communication network, a code division multiplexing (CDMA) communication network, and a frequency offset multiplexing (FOM) network.

The method of an embodiment comprises transmitting the at least two positioning signals concurrently by at least two transmitters of a group of the plurality of groups.

The method of an embodiment comprises transmitting the at least two positioning signals concurrently by at least two transmitters that are in different groups.

The plurality of positioning signals of an embodiment comprises a set of pseudorandom codes, wherein each group in the plurality of groups of transmitters utilizes a permutation of the set of pseudorandom codes.

The permutation of the set of pseudorandom codes of an embodiment is cyclic with respect to a slot number of the transmitter.

The permutation of an embodiment associates each pseudorandom code in the set to a geographical position of each transmitter in a group.

The method of an embodiment comprises associating a position of a transmitter in each group with a transmit time slot.

The method of an embodiment comprises each group of the plurality of groups using a plurality of time slots to broadcast the plurality of positioning signals.

Each group of the plurality of groups of an embodiment comprises n transmitters using n time slots to broadcast the plurality of positioning signals, where n is an integer.

The method of an embodiment comprises each group of the plurality of groups using a same set of time slots to broadcast the plurality of positioning signals.

The method of an embodiment comprises each transmitter of a group broadcasting in a different time slot from any other transmitter of the group.

The method of an embodiment comprises each group of the plurality of groups of a supergroup using at least one pseudorandom code that is different from the pseudorandom codes of any other group.

The at least one pseudorandom code of an embodiment comprises a Gold Code.

The method of an embodiment comprises each group of the plurality of groups of the supergroup using an offset in frequency that is different than the offset of any other group.

The method of an embodiment comprises each group of the plurality of groups of the supergroup using an offset in frequency that is different than the offset of from any other group.

The method of an embodiment comprises the plurality of transmitters of the plurality of groups of a supergroup using a common pseudorandom code for a least a portion of their transmissions.

The pseudorandom code of an embodiment comprises a Gold Code.

The pseudorandom code of an embodiment comprises a maximal length pseudorandom sequence.

The maximal length pseudorandom sequence of an embodiment comprises a first of two maximal length sequences forming a Gold Code.

The method of an embodiment comprises each transmitter of a group broadcasts using a different pseudorandom code from any other transmitter of the group.

The method of an embodiment comprises each group of the plurality of groups of a supergroup using a set of pseudorandom codes that is the same as every other group of the plurality of groups.

The method of an embodiment comprises each group of the plurality of groups of the supergroup using an offset in frequency that is different than the offset from any other group.

The method of an embodiment comprises each transmitter of the supergroup broadcasting using a different pseudorandom code from any other transmitter of the supergroup.

The method of an embodiment comprises each group of the plurality of groups of the supergroup using an offset in frequency that is different than the offset of from any other group.

The method of an embodiment comprises each group of the plurality of groups of a supergroup using at least one pseudorandom code in accordance with a maximal length pseudorandom sequence.

The at least one pseudorandom code of each group of the supergroup of an embodiment is different from the pseudorandom codes of any other group of the supergroup.

The method of an embodiment comprises each group of the plurality of groups of the supergroup using an offset in frequency that is different than the offset of any other group of the supergroup.

The method of an embodiment comprises each group of the plurality of groups of the supergroup using an offset in frequency that is different than the offset of from any other group.

The method of an embodiment comprises each group of the supergroup using a pseudorandom code different from that of a pseudorandom code used by any other group of the supergroup.

The method of an embodiment comprises each group of the plurality of groups of a supergroup using a same set of pseudorandom codes, and permuting the pseudorandom codes of each group relative to slot numbers of every other group of the plurality of groups.

The method of an embodiment comprises each group of the plurality of groups of the supergroup using an offset in frequency that is different than the offset of from any other group.

The plurality of transmitters of an embodiment comprises a plurality of supergroups of transmitters, wherein each supergroup of the plurality of supergroups comprises a plurality of groups of transmitters arranged in a geometric pattern.

The method of an embodiment comprises each transmitter of a group broadcasting using a different pseudorandom code from any other transmitter of the group.

The method of an embodiment comprises each supergroup of the plurality of supergroups using a same set of pseudorandom codes as every other supergroup of the plurality of supergroups, and permuting the pseudorandom codes of each supergroup relative to slot numbers of every other supergroup of the plurality of supergroups.

The method of an embodiment comprises each group of the plurality of groups of a supergroup using an offset in frequency that is different than the offset in frequency of any other group of that same supergroup The method of an embodiment comprises, in each supergroup of the plurality of supergroups, each transmitter broadcasting using a different pseudorandom code from any other transmitter of that same supergroup.

The method of an embodiment comprises each supergroup using a same set of pseudorandom codes as used by every other supergroup, and permuting the pseudorandom codes of a supergroup relative to slot numbers of every other supergroup.

The method of an embodiment comprises measuring performance corresponding to the geometric pattern using a ratio of distance between transmitters having identical transmission parameters and a transmitter radius.

The method of an embodiment comprises measuring performance corresponding to the geometric pattern using correlation rejection associated with the multiplexing protocol used by the supergroup.

The method of an embodiment comprises generating each carrier frequency as a sum of a base frequency plus an element of a set of offsets, wherein each offset in the set of offsets is a multiple of a minimum nonzero offset.

The set of offsets of an embodiment corresponds to $$0, k_0R+R/Q, 2k_0R+2R/Q, 3k_0R+3R/Q \ldots, (Q-1)k_0R+(Q-1)R/Q,$$

where R represents PN frame rate, $k_0$ represents a nonzero integer, and Q represents an integer equal to a number of offsets.

The integer $k_0$ of an embodiment has magnitude that is at least one of equal to and greater than two (2).

Quantity Q of an embodiment equals a number of PN frames of the positioning signal coherently integrated by said remote receiver.

The number of PN frames of the positioning signal coherently integrated by the remote receiver of an embodiment is equal to an integer multiple of Q.

The quantity Q of an embodiment equals the number of groups of transmitters in the supergroup, and a number of PN frames of the positioning signal coherently integrated by said receiver is greater than the number of groups of transmitters in the supergroup.

The method of an embodiment comprises a set of carrier frequency offsets from a base frequency, wherein each offset in such set is no greater than twenty-five percent of the bandwidth of each of the plurality of positioning signals.

The components described herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory (such as electronically erasable programmable read only memory (EEPROM)), embedded microprocessors, firmware, software, etc. Furthermore, aspects of the systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods is not intended to be exhaustive or to limit the systems and methods to the precise forms disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above. The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all systems and methods that operate under the claims. Accordingly, the systems and methods are not limited by the disclosure, but instead the scope is to be determined entirely by the claims. While certain aspects of the systems and methods are presented below in certain claim forms, the inventors contemplate the various aspects of the systems and methods in any number of claim forms. Accordingly, the inventors reserve the right to add additional claims after filing the application to pursue such additional claim forms for other aspects of the systems and methods.

What is claimed is:

1. A position location system comprising:
a plurality of transmitters,
each of the plurality of transmitters are at different locations and are operable to transmit a positioning signal that includes a pseudorandom ranging signal modulated on a carrier having one carrier frequency selected from a finite set of values,
the plurality of transmitters including two transmitters that are operable to concurrently transmit two positioning signals,
a first of the two transmitters operable to transmit a first of the two positioning signals that includes a pseudorandom ranging signal modulated on one carrier having a first carrier frequency, and
a second of the two transmitters operable to transmit a second of the two positioning signals that includes a pseudorandom ranging signal modulated on one carrier having a second carrier frequency that is offset from the first carrier frequency by an offset that is less than or equal to twenty-five percent of the bandwidth of each positioning signal of the two positioning signals.

2. The position location system of claim 1, wherein the offset is a multiple of a sum of (i) a frame rate of the pseudorandom ranging signals included in the two positioning signals and (ii) a fraction 1/n of the frame rate, where n is an integer.

3. The position location system of claim 1, wherein the two positioning signals have different pseudorandom codes.

4. The position location system of claim 1, wherein the two positioning signals have the same pseudorandom codes.

5. The position location system of claim 1, wherein at least one transmitter of the plurality of transmitters is operable to repeat the pseudorandom ranging signal of its positioning signal a plurality of times in succession.

6. The position location system of claim 1, wherein the plurality of transmitters include two additional transmitters that are operable to non-concurrently transmit two additional positioning signals.

7. The position location system of claim 1, wherein the plurality of transmitters are arranged in a geometric pattern, and the plurality of transmitters comprises at least m transmitters operable to use n time slots in a time multiplexing frame to transmit their positioning signals, where m and n are positive integers.

8. The position location system of claim 7, wherein m is greater than n.

9. The position location system of claim 7, wherein m is less than or equal to n.

10. The position location system of claim 7, wherein at least one transmitter of the at least m transmitters is operable to transmit in more than one slot in a time multiplexing frame.

11. The position location system of claim 1, wherein at least one transmitter of the plurality of transmitters is operable to transmit its positioning signal in at least two successive time multiplexing frames.

12. The position location system of claim 11, wherein the at least one transmitter is operable to transmit positioning data in a primary frame of the at least two successive time multiplexing frames, and further operable to transmit auxiliary data comprising security data, authentication data, or both the security data and the authentication data, in a secondary frame of the at least two successive time multiplexing frames.

13. The position location system of claim 1, wherein the two transmitters are in a vicinity of one another, wherein the two positioning signals have at least one common parameter that is a pseudorandom code, positioning signal data, or both the pseudorandom code and the positioning signal data.

14. The position location system of claim 1, wherein the plurality of transmitters comprises a supergroup of transmitters, wherein the supergroup includes a plurality of groups of transmitters arranged in a geometric pattern, and each group includes a plurality of transmitters arranged in a geometric pattern.

15. The position location system of claim 14, wherein the plurality of groups of a supergroup comprises an n-group repeat pattern, wherein n is an integer.

16. The position location system of claim 14, wherein the two transmitters are in a first group from the plurality of groups.

17. The position location system of claim 14, wherein a first of the two transmitters is in a first group from the plurality of groups, and a second of the two transmitters is in a second group from the plurality of groups.

18. The position location system of claim 14, wherein the positioning signals comprise a set of pseudorandom codes, and wherein each group in the plurality of groups of transmitters is operable to utilize a permutation of the set of pseudorandom codes.

19. The position location system of claim 14, wherein the permutation of the set of pseudorandom codes is cyclic with respect to a transmit time slot number assigned to a transmitter.

20. The position location system of claim 18, wherein the permutation associates each pseudorandom code in the set to a geographical position of each transmitter in a group, wherein a position of a transmitter in each group is associated with a transmit time slot.

21. The position location system of claim 14, wherein each group of the plurality of groups is operable to use a plurality of time slots to transmit positioning signals.

22. The position location system of claim 21, wherein each group of the plurality of groups comprises n transmitters that are operable to use the same n time slots to transmit positioning signals, where n is an integer.

23. The position location system of claim 21, wherein each group of the plurality of groups of a supergroup is operable to use at least one pseudorandom code that is different from the pseudorandom code of any other group.

24. The position location system of claim 21, wherein each of the plurality of transmitters of the plurality of groups of a supergroup is operable to use a common pseudorandom code constructed using a maximal length pseudorandom sequence for a least a portion of its transmissions.

25. The position location system of claim 21, wherein each transmitter of a group is operable to transmit its positioning signal using a different pseudorandom code from any other transmitter of the group, and wherein each group of the plurality of groups of a supergroup is operable to use the same set of pseudorandom codes.

26. The position location system of claim 21, wherein each transmitter of the supergroup is operable to transmit its positioning signal using a different pseudorandom code from any other transmitter of the supergroup.

27. The position location system of claim 21, wherein each group of the plurality of groups of a supergroup is operable to use a different pseudorandom code that is constructed using a maximal length pseudorandom sequence.

28. The position location system of claim 21, wherein each group of the plurality of groups of the supergroup is operable to use an offset in frequency that is different than the offset of any other group.

29. The position location system of claim 21, wherein each group of the plurality of groups of a supergroup is operable to use a set of pseudorandom codes that are permuted relative to slot numbers of every other group of the plurality of groups.

30. The position location system of claim 1, wherein each value of the carrier frequencies differs from another value of the carrier frequencies by less than twenty-five percent of the bandwidth of each of the positioning signals.

31. A method for transmitting positioning signals from a plurality of transmitters residing at different locations, the method comprising:
   transmitting, using the plurality of transmitters, a plurality of positioning signals that each include a pseudorandom ranging signal modulated on one carrier having a carrier frequency selected from a finite set of values; and
   concurrently transmitting two positioning signals of the plurality of positioning signals using two transmitters of the plurality of transmitters,
   wherein a first positioning signal of the two positioning signals includes a pseudorandom ranging signal modulated on one carrier having a first carrier frequency,
   wherein a second positioning signal of the two positioning signals includes a pseudorandom ranging signal modulated on one carrier having a second carrier frequency, and
   wherein the first carrier frequency and the second carrier frequency are offset from one another by an offset that is less than or equal to twenty-five percent of the bandwidth of each positioning signal of the two positioning signals.

32. The method of claim 31, wherein the offset is a multiple of a sum of (i) a frame rate of the pseudorandom ranging signals included in the two positioning signals and (ii) a fraction 1/n of the frame rate, where n is an integer.

33. The method of claim 31, wherein the two positioning signals have different pseudorandom codes.

34. The method of claim 31, wherein the two positioning signals have the same pseudorandom codes.

35. The method of claim 31, wherein two additional positioning signals are transmitted non-concurrently by two additional transmitters of the plurality of transmitters.

36. The method of claim 31, wherein the plurality of transmitters are arranged in a geometric pattern and use a plurality of time slots to transmit the plurality of positioning signals, wherein the plurality of transmitters comprises at least m transmitters using n time slots in a time multiplexing frame to transmit the plurality of positioning signals, where m and n are positive integers.

37. The method of claim 31, wherein at least one transmitter of the plurality of transmitters transmits a positioning signal in at least two successive time multiplexing frames.

38. The method of claim 31, wherein the plurality of transmitters comprises a supergroup of transmitters, wherein the supergroup includes a plurality of groups of transmitters arranged in a geometric pattern, and each group includes a plurality of transmitters arranged in a geometric pattern, and wherein each group of the plurality of groups uses a plurality of time slots to transmit the plurality of positioning signals.

39. The method of claim 38, wherein each group of the plurality of groups of a supergroup uses at least one pseudorandom code that is different from the pseudorandom code of any other group.

40. The method of claim 38, wherein the plurality of transmitters of the plurality of groups of a supergroup uses a common pseudorandom code for a least a portion of their transmissions, wherein the pseudorandom code is constructed using a maximal length pseudorandom sequence.

41. The method of claim 38, wherein each transmitter of a group broadcasts using a different pseudorandom code from any other transmitter of the group, wherein each group of the plurality of groups of a supergroup uses a set of pseudorandom codes that is the same as every other group of the plurality of groups.

42. The method of claim 38, wherein each transmitter of the supergroup broadcasts using a different pseudorandom code from any other transmitter of the supergroup.

43. The method of claim 38, wherein each group of the plurality of groups of the supergroup uses an offset in frequency that is different than the offset of any other group.

44. The method of claim 31, wherein each carrier frequency is the sum of a base frequency plus an element of a set of frequency offsets, and each of the frequency offsets in the set of frequency offsets is a multiple of a minimum nonzero offset, and wherein the set of frequency offsets corresponds to $0, k_0R+R/Q, 2k_0R+2R/Q, 3k_0R+3R/Q \ldots, (Q-1)k_0R+(Q-1)R/Q$, where R represents PN frame rate, $k_0$ represents a nonzero integer, and Q represents an integer equal to the number of frequency offsets in the set of frequency offsets.

45. The method of claim 31, wherein each value of the carrier frequencies differs from another value of the carrier frequencies by less than twenty-five percent of the bandwidth of each of the positioning signals.

* * * * *